US009769810B2

(12) United States Patent
Imamura et al.

(10) Patent No.: US 9,769,810 B2
(45) Date of Patent: Sep. 19, 2017

(54) BASE STATION DEVICE, MOBILE STATION DEVICE, COMMUNICATION METHOD, AND INTEGRATED CIRCUIT

(71) Applicant: Sharp Kabushiki Kaisha, Osaka-shi, Osaka (JP)

(72) Inventors: Kimihiko Imamura, Osaka (JP); Toshizo Nogami, Osaka (JP); Daiichiro Nakashima, Osaka (JP); Kazuyuki Shimezawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/418,312

(22) PCT Filed: Jul. 29, 2013

(86) PCT No.: PCT/JP2013/070440
§ 371 (c)(1),
(2) Date: Jan. 29, 2015

(87) PCT Pub. No.: WO2014/021247
PCT Pub. Date: Feb. 6, 2014

(65) Prior Publication Data
US 2015/0208389 A1 Jul. 23, 2015

(30) Foreign Application Priority Data
Jul. 30, 2012 (JP) .................................. 2012-168059

(51) Int. Cl.
*H04W 72/04* (2009.01)
*H04J 11/00* (2006.01)
(Continued)

(52) U.S. Cl.
CPC ........ *H04W 72/042* (2013.01); *H04B 7/0452* (2013.01); *H04B 7/0602* (2013.01);
(Continued)

(58) Field of Classification Search
CPC .... H04B 7/0452; H04B 7/0602; H04B 7/024; H04W 72/04; H04W 72/0406;
(Continued)

(56) References Cited

U.S. PATENT DOCUMENTS

| 8,982,693 | B2 * | 3/2015 | Krishnamurthy | ..... H04W 52/50 370/216 |
| 9,001,798 | B2 * | 4/2015 | Papasakellariou | H04W 72/0406 370/336 |

(Continued)

OTHER PUBLICATIONS

Alcatel-Lucent Shanghai Bell et al., 3GPP TSG RAN WG1 Meeting #69, R1-122493, May 21-25, 2012, 3 pages.
(Continued)

*Primary Examiner* — Bunjob Jaroenchonwanit
(74) *Attorney, Agent, or Firm* — Keating & Bennett, LLP

(57) ABSTRACT

A signal including control information is enabled to be transmitted and received efficiently between a base station device and a mobile station device. A plurality of physical resource block pairs are configured as control channel regions which are regions in which there is a probability of the control channels being mapped. First components are configured by resources divided from one of the physical resource block pair. The control channel is configured from an aggregation of one or more first components. An antenna port used to transmit the first component is selected from a plurality of kinds of combinations. When one combination is selected from the plurality of kinds of combinations, there is provided a second radio network resource control unit that selects the combination on the basis of at least one of parameters for determining a C-RNTI number assigned to the mobile station device, $N_1$ which is a parameter unique for a terminal, and an initial value $C_{init}$ of a series of UE-specific RSs used for a second PDCCH.

8 Claims, 24 Drawing Sheets

(51) Int. Cl.
*H04B 7/0452* (2017.01)
*H04B 7/06* (2006.01)
*H04L 5/00* (2006.01)
*H04W 72/12* (2009.01)
*H04B 7/024* (2017.01)

(52) U.S. Cl.
CPC ............ *H04J 11/00* (2013.01); *H04L 5/0023* (2013.01); *H04B 7/024* (2013.01); *H04J 11/0053* (2013.01); *H04L 5/0051* (2013.01); *H04L 5/0053* (2013.01); *H04W 72/12* (2013.01)

(58) Field of Classification Search
CPC .. H04W 72/042; H04W 72/12; H04L 1/0061; H04L 1/1812; H04L 1/1861; H04L 5/0023; H04L 5/0053; H04J 11/00; H04J 11/0053
See application file for complete search history.

(56) References Cited

U.S. PATENT DOCUMENTS

| | | | |
|---|---|---|---|
| 9,072,086 B2* | 6/2015 | Papasakellariou | H04W 72/0406 |
| 2013/0039299 A1* | 2/2013 | Papasakellariou | H04L 1/0073 370/329 |
| 2013/0194931 A1* | 8/2013 | Lee | H04L 5/0053 370/241 |
| 2013/0215842 A1* | 8/2013 | Han | H04W 72/042 370/329 |
| 2013/0286980 A1* | 10/2013 | Liao | H04W 72/042 370/329 |
| 2013/0301561 A1* | 11/2013 | Sartori | H04W 72/04 370/329 |
| 2014/0003375 A1* | 1/2014 | Nam | H04W 72/0406 370/329 |
| 2015/0139104 A1* | 5/2015 | Seo | H04W 72/042 370/329 |
| 2015/0208389 A1* | 7/2015 | Imamura | H04J 11/00 370/329 |
| 2015/0245322 A1* | 8/2015 | Shimezawa | H04L 5/0053 370/329 |
| 2015/0271788 A1* | 9/2015 | Kim | H04L 5/0053 370/329 |
| 2015/0296488 A1* | 10/2015 | Shimezawa | H04W 72/04 370/329 |
| 2015/0296491 A1* | 10/2015 | Nam | H04W 72/0406 370/329 |
| 2016/0020879 A1* | 1/2016 | Shimezawa | H04W 16/32 370/329 |
| 2016/0020882 A1* | 1/2016 | Shimezawa | H04L 5/0051 370/330 |
| 2016/0028521 A1* | 1/2016 | Shimezawa | H04J 11/005 370/329 |
| 2016/0029351 A1* | 1/2016 | Shimezawa | H04L 5/0053 370/329 |

OTHER PUBLICATIONS

Ericsson et al., "Way Forward on downlink control channel enhancements by UE-specific RS AI 7.5.3.2", 3GPP TSG-RAN WG1 #66bis, R1-113589, Oct. 10-14, 2011, 2 pages.
Samsung, "Association Between Antenna Ports and ePDCCH Transmissions", 3GPP TSG RAN WG1 #69, R1-122249, May 12, 2012, pp. 1-6.

* cited by examiner

BASE STATION DEVICE, MOBILE STATION DEVICE, COMMUNICATION METHOD, AND INTEGRATED CIRCUIT

TECHNICAL FIELD

The present invention relates to a radio network signal transmission scheme, a radio network signal reception scheme, a base station device, a mobile station device, an integrated circuit, a communication system, and a communication method in which in the communication system configured to include a plurality of the mobile station devices and the base station device, regions in which there is a probability of signals with control information being mapped are efficiently set, the base station device can efficiently transmit the signals including the control information to the mobile station devices, and the mobile station devices can efficiently receive the signals including the control information from the base station device.

BACKGROUND ART

Evolution of radio access schemes and radio networks of cellular mobile communication (hereinafter, referred to as "Long Term Evolution (LTE) or "Evolved Universal Terrestrial Radio Access (EUTRA)) has been standardized in 3rd Generation Partnership Project (3GPP). In LTE, an Orthogonal Frequency Division Multiplexing (OFDM) scheme which is multi-carrier transmission is used as a communication scheme of radio network communication from a base station device to a mobile station device (a downlink: referred to as a DL). In LTE, a Single Carrier-Frequency Division Multiple Access (SC-FDMA) scheme which is single carrier transmission is used as a communication scheme of radio network communication from a mobile station device to a base station device (an uplink: referred to as an UL). In LTE, a Discrete Fourier Transform-Spread OFDM (DFT-Spread OFDM) scheme is used as the SC-FDMA scheme.

With development of LTE, LTE-Advanced (LTE-A) to which new technologies are applied has been examined. In LTE-A, supporting at least the same channel configuration as that of LTE has been examined. A channel means a medium used to transmit a signal. A channel used in the physical layer is referred to as a physical channel and a channel used in the Medium Access Control (MAC) layer is referred to as a logical channel. The types of physical channel include a Physical Downlink Shared CHannel (PDSCH) used to transmit and receive data and control information of the downlink, a Physical Downlink Control CHannel (PDCCH) used to transmit and receive control information of the downlink, a Physical Uplink Shared CHannel (PUSCH) used to transmit and receive data and control information of the uplink, a Physical Uplink Control CHannel (PUCCH) used to transmit and receive control information, a Synchronization CHannel (SCH) used to establish downlink synchronization, a Physical Random Access CHannel (PRACH) used to establish uplink synchronization, and a Physical Broadcast CHannel (PBCH) used to transmit system information of the downlink. A mobile station device or a base station device maps a signal generated from control information, data, or the like to each physical channel to transmit the signal. Data transmitted with the physical downlink shared channel or the physical uplink shared channel is referred to as a transport block.

Control information mapped in a physical uplink control channel is referred to as uplink control information (UCI). The uplink control information is control information (reception confirmation acknowledgement: ACK/NACK) indicating positive acknowledgement (ACK) or negative acknowledgement (NACK) to data received and mapped in Physical Downlink Shared Channel, control information (Scheduling Request: SR) indicating a request to assign uplink resources, or control information (Channel Quality Indicator: CQI) indicating reception quality (also referred to as channel quality) of the downlink.

<Cooperative Communication>

In LTE-A, inter-cell cooperative communication (Cooperative Multipoint: CoMP communication) in which communication is performed cooperatively between neighboring cells has been examined in order to reduce or suppress interference to a mobile station device at a cell end region or in order to increase reception signal power. For example, a form in which a base station device performs communication using any one frequency band is referred to as a "cell." For example, a method (also referred to as Joint Processing or Joint Transmission) in which weighting signal processing (precoding process) different in a plurality of cells is applied to signals and a plurality of base station devices cooperate with each other to transmit the signal to the same mobile station device has been examined as the inter-cell cooperative communication. In this method, a ratio of signal power to interference noise power of a mobile station device can be improved, and thus reception characteristics of the mobile station device can be improved. For example, a method (Coordinated Scheduling: CS) of performing scheduling on a mobile station device cooperatively between a plurality of cells has been examined as the inter-cell cooperative communication. In this method, the ratio of signal power to interference noise power of the mobile station device can be improved. For example, a method (Coordinated beamforming: CB) of transmitting a signal to a mobile station device by applying beamforming cooperatively between a plurality of cells has been examined as the inter-cell cooperative communication. In this method, a ratio of signal power to interference noise power of the mobile station device can be improved. For example, a method (Blanking, Muting) in which only one cell transmits a signal using a predetermined resource and the other cell does not transmit a signal using the predetermined source has been examined as the inter-cell cooperative communication. In this method, a ratio of signal power to interference noise power of the mobile station device can be improved.

In a plurality of cells used in the cooperative communication, different cells may be configured by different base station devices, different cells may be configured by different Remote Radio Heads (RRHs: outdoor type radio network units smaller than a base station device in size, also referred to as a Remote Radio Unit (RRU)) managed by the same base station device, different cells may be configured by a base station device and an RRH managed by the base station device, or different cells may be configured by a base station device and an RRH managed by a base station device different from the base station device.

A base station device with a broad coverage is generally referred to as a macro base station device. A base station device with a narrow coverage is generally referred to as a pico base station device or a femto base station device. Generally operating the RRH in an area with a coverage narrower than the macro base station device has been examined. Development as in a communication system configured by macro base station devices and RRHs and configured such that coverages supported by the macro base station devices include some or all of the coverages supported by the RRHs is referred to as heterogeneous network development. In a communication system of the heterogeneous network development, a method in which the macro base station devices and the RRHs cooperate with each other to transmit a signal to mobile station devices located within the mutually overlapping coverages has been examined. Here, the RRHs are managed by the macro base station devices such that transmission and reception is controlled. The macro base station devices and the RRHs are connected by wired lines such as optical fibers or a wireless lines using relay technologies. Thus, when some or all of the macro base station devices and the RRHs perform the cooperative communication using the same radio network resources, it is possible to improve comprehensive frequency efficiency (transmission capacity) within areas of the coverages constructed by the macro base station devices.

When a mobile station device is located near the macro base station device or the RRH, single cell communication with the macro base station device or the RRH can be performed. That is, a certain mobile station device performs communication with the macro base station device or the RRH to transmit or receive a signal without using the cooperative communication. For example, the macro base station device receives a signal of the uplink from a mobile station device located to be close to the macro base station device itself. For example, the RRH receives a signal of the uplink from a mobile station device located to be close to the RRH itself. When the mobile station device is located near an end (cell edge) of the coverage constructed by the RRH, countermeasures against the same channel interference from the macro base station device are necessary. A method of reducing or suppressing interference to a mobile station device in a cell edge region by using a CoMP scheme in which neighboring base station devices cooperate to each other as multi-cell communication (cooperative communication) with the macro base station device and the RRH has been examined.

The fact that a mobile station device receives signals transmitted from both of a macro base station device and an RRH using cooperative communication with a downlink and transmits a signal to either of the macro base station device and the RRH in an appropriate form with an uplink has been examined. For example, the mobile station device transmits an uplink signal with transmission power appropriate for reception of a signal to the macro base station device. For example, the mobile station device transmits an uplink signal with transmission power appropriate for reception of a signal by the RRH. Thus, it is possible to reduce unnecessary interference in an uplink and improve frequency efficiency.

The mobile station device needs to acquire control information indicating a modulation scheme used for a data signal, a coding rate, a spatial multiplexing number, a transmission power adjustment value, assignment of resources, or the like in regard to a data signal reception process. In LTE-A, introducing a new control channel transmitting control information regarding a data signal has been examined (see NPL 1). For example, improving the capacity of all of the control channels has been examined. For example, supporting interference coordination in a frequency domain in the new control channel has been examined. For example, supporting spatial multiplexing in the new control channel has been examined. For example, supporting beamforming in the new control channel has been examined. For example, supporting diversity in the new control channel has been examined. For example, using the new control channel with a new type of carrier has been examined. For example, performing no transmission of a reference signal common to all of the mobile station devices in a cell in the new type of carrier has been examined. For example, reducing transmission frequency of the reference signal common to the mobile station devices in a cell further than that in the related art in the new type of carrier has been examined. For example, demodulating a signal such as control information using a reference signal unique to a mobile station device in the new type of carrier has been examined.

For example, applying cooperative communication or transmission of a plurality of antennas to the new control channel as application of beamforming has been examined. Specifically, the fact that a plurality of base station devices and a plurality of RRHs corresponding to LTE-A apply a precoding process to a signal of the new control channel and also apply the same precoding process to a reference signal (RS) for demodulating the signal of the new control channel has been examined. Specifically, the fact that a plurality of base station devices and a plurality of RRHs corresponding to LTE-A map the signals and the RSs of the new control channel to which the same precoding process is applied to regions of resources in which the PDSCH is mapped in LTE and transmit the signal and the RSs has been examined. The fact that a mobile station device corresponding to LTE-A demodulates the signal of the new control channel subjected to the same precoding process using the RS which is the received RS and is subjected to the precoding process and acquires control information has been examined. In this method, it is not necessary to exchange information regarding the precoding process applied to the signal of the new control channel between the base station device and the mobile station device.

For example, as application of the diversity, a method of configuring the signal of the new control channel using a resource distant from a frequency domain and obtaining the advantageous effects of frequency diversity has been examined. On the other hand, when the beamforming is applied to the new control channel, a method of configuring the signal of the new control channel using a resource not distant from a frequency domain has been examined.

For example, as the support of the spatial multiplexing, it has been examined that Multi User-Multi Input Multi Output (MU-MIMO) of multiplexing control channels for different mobile station devices with the same resource is applied. Specifically, it has been examined that the base station device transmits reference signals orthogonal between different mobile station devices and performs spatial multiplexing on signals of new different control channels to common resources to transmit the signals. For example, the spatial multiplexing on the signals of the new different control channels is realized by applying beamforming (precoding process) suitable for the signals of the new different control channels.

CITATION LIST

Non Patent Literature

NPL 1: "Way Forward on downlink control channel enhancements by UE-specific RS" Zhuhai, China, 3GPP TSG RAN1 #66 bis, 10 to 14, October, 2011, R1-113589

SUMMARY OF INVENTION

Technical Problem

It is desirable to transmit and receive a control channel using resources efficiently. An amount of resource satisfying a requirement condition for each mobile station device is necessary for the control channel. When the resources are not efficiently used for the control channels, the capacity of the control channels may not be increased and the number of mobile station devices to which the control channels are assigned may not be increased.

For example, it is preferable that the base station device can efficiently control an improvement in the capacity of all of the control channels through the spatial multiplexing on the new control channels with application of the MU-MIMO and an improvement in the capacity of all of the control channels by applying the beamforming without application of the MU-MIMO and achieving an improvement in the characteristics of the new control channels.

The present invention is devised in light of the foregoing circumstances and an object of the present invention is to provide a radio network signal transmission scheme, a radio network signal reception scheme, a base station device, a mobile station device, an integrated circuit, a communication system, and a communication method in which in the communication system configured to include the plurality of mobile station devices and the base station device, regions in which there is a probability of signals with control information being mapped are efficiently set, the base station device can efficiently transmit the signals including the control information to the mobile station devices, and the mobile station devices can efficiently receive the signals including the control information from the base station device.

Solution to Problem (1) According to an aspect of the present invention, in order to achieve the foregoing object, the following means are provided. A base station device communicates with a mobile station device. An EPDCCH is configured using one ECCE or a plurality of ECCEs. The base station device includes a control unit that is configured to be able to select one antenna port used to transmit the EPDCCH on the basis of a remainder obtained by dividing a C-RNTI number of the mobile station device by the number of ECCEs used for the EPDCCH when the EPDCCH is transmitted using localized transmission; and a transmission processing unit that is able to transmit the EPDCCH using the selected one antenna port.

(2) In the base station device according to the aspect of the present invention, the number of ECCEs used for the EPDCCH may be able to be set to one of at least 1, 2, and 4.

(3) In the base station device according to the aspect of the present invention, the EPDCCH may be able to be configured using one ECCE or the plurality of ECCEs in one resource block pair.

(4) In the base station device according to the aspect of the present invention, the control unit may be configured to be able to select the antenna port used to transmit the EPDCCH from a combination of two antenna ports on the basis of at least a remainder obtained by dividing a C-RNTI number of the mobile station device by 2 when the number of ECCEs used for the EPDCCH is 2, and the control unit may be configured to be able to select the antenna port used to transmit the EPDCCH from a combination of four antenna ports on the basis of at least a remainder obtained by dividing the C-RNTI number of the mobile station device by 4 when the number of ECCEs used for the EPDCCH is 4.

(5) In the base station device according to the aspect of the present invention, the combination of the antenna ports may be one aggregation of the antenna ports assumed to be used to transmit the EPDCCH when each of the ECCEs configures one EPDCCH.

(6) In the base station device according to the aspect of the present invention, a plurality of EREGs may be configured in one resource block pair. One of the ECCEs may be configured by four or eight EREGs.

(7) In the base station device according to the aspect of the present invention, numbers 0 to 15 may be given to sixteen EREGs configured in one resource block pair. When one of the ECCEs is configured from four EREGs, the one ECCE may be able to be configured on the basis of a remainder obtained by dividing the EREG number by 4.

(8) In the base station device according to the aspect of the present invention, when one EPDCCH is configured by each of the ECCEs, one antenna port assumed to be used to transmit the EPDCCH may be antenna port 107 in a case in which one EPDCCH is assumed to be configured by the ECCE configured from EREG 0, 4, 8, and 12, may be antenna port 108 in a case in which one EPDCCH is assumed to be configured by the ECCE configured from EREG 1, 5, 9, and 13, may be antenna port 109 in a case in which one EPDCCH is assumed to be configured by the ECCE configured from EREG 2, 6, 10, and 14, and may be antenna port 110 in a case in which one EPDCCH is assumed to be configured by the ECCE configured from EREG 3, 7, 11, and 15.

(9) In the base station device according to the aspect of the present invention, the control unit may be configured to be able to set two antenna ports used to transmit the EPDCCH when the EPDCCH is transmitted using distributed transmission.

(10) According to another aspect of the present invention, a mobile station device communicates with a base station device. An EPDCCH is configured using one ECCE or a plurality of ECCEs. The mobile station device includes a control unit that is configured to be able to select one antenna port assumed to be used to transmit the EPDCCH from the base station device on the basis of a remainder obtained by dividing a C-RNTI number of the mobile station device by the number of ECCEs used for the EPDCCH when the EPDCCH is transmitted from the base station device using localized transmission; and a reception processing unit that is able to demodulate the EPDCCH using a reference signal transmitted from the selected one antenna port as a reference at a time of the demodulation of the EPDCCH.

(11) In the mobile station device according to the aspect of the present invention, the number of ECCEs used for the EPDCCH may be able to be set to one of at least 1, 2, and 4.

(12) In the mobile station device according to the aspect of the present invention, the EPDCCH may be able to be configured using one ECCE or the plurality of ECCEs in one resource block pair.

(13) In the mobile station device according to the aspect of the present invention, the control unit may be configured to be able to select one antenna port assumed to be used to transmit the EPDCCH from the base station device from a combination of two antenna ports on the basis of at least a remainder obtained by dividing a C-RNTI number of the mobile station device by 2 when the number of ECCEs used for the EPDCCH is 2, and the control unit may be configured to be able to select one antenna port assumed to be used to transmit the EPDCCH from the base station device from a combination of four antenna ports on the basis of at least a remainder obtained by dividing the C-RNTI number of the mobile station device by 4 when the number of ECCEs used for the EPDCCH is 4.

(14) In the mobile station device according to the aspect of the present invention, the combination of the antenna ports may be one aggregation of the antenna ports assumed to be used to transmit the EPDCCH when each of the ECCEs configures one EPDCCH.

(15) In the mobile station device according to the aspect of the present invention, a plurality of EGEGs may be configured in one resource block pair. One of the ECCEs may be configured by four or eight EREGs.

(16) In the mobile station device according to the aspect of the present invention, numbers 0 to 15 may be given to sixteen EREGs configured in one resource block pair. When one of the ECCEs is configured from four EREGs, the one ECCE may be able to be configured on the basis of a remainder obtained by dividing the EREG number by 4.

(17) In the mobile station device according to the aspect of the present invention, when one EPDCCH is configured by each of the ECCEs, one antenna port assumed to be used to transmit the EPDCCH may be antenna port 107 in a case in which one EPDCCH is assumed to be configured by the ECCE configured from EREG 0, 4, 8, and 12, may be antenna port 108 in a case in which one EPDCCH is assumed to be configured by the ECCE configured from EREG 1, 5, 9, and 13, may be antenna port 109 in a case in which one EPDCCH is assumed to be configured by the ECCE configured from EREG 2, 6, 10, and 14, and may be antenna port 110 in a case in which one EPDCCH is assumed to be configured by the ECCE configured from EREG 3, 7, 11, and 15.

(18) In the mobile station device according to the aspect of the present invention, the control unit may be configured to be able to assume that the number of antenna ports used to transmit the EPDCCH from the base station device is 2 when the EPDCCH is transmitted using distributed transmission from the base station device.

(19) According to a still another aspect of the present invention, a communication method is performed by a base station device communicating with a mobile station device. An EPDCCH is configured using one ECCE or a plurality of ECCEs. The communication method includes selecting one antenna port used to transmit the EPDCCH on the basis of a remainder obtained by dividing a C-RNTI number of the mobile station device by the number of ECCEs used for the EPDCCH when the EPDCCH is transmitted using localized transmission; and transmitting the EPDCCH using the selected one antenna port.

(20) In the communication method according to the aspect of the present invention, the number of ECCEs used for the EPDCCH may be able to be set to one of at least 1, 2, and 4.

(21) In the communication method according to the aspect of the present invention, the EPDCCH may be able to be configured using one ECCE or the plurality of ECCEs in one resource block pair.

(22) The communication method according to the aspect of the present invention may further include selecting the antenna port used to transmit the EPDCCH from a combination of two antenna ports on the basis of at least a remainder obtained by dividing a C-RNTI number of the mobile station device by 2 when the number of ECCEs used for the EPDCCH is 2, and selecting the antenna port used to transmit the EPDCCH from a combination of four antenna ports on the basis of at least a remainder obtained by dividing the C-RNTI number of the mobile station device by 4 when the number of ECCEs used for the EPDCCH is 4.

(23) In the communication method according to the aspect of the present invention, numbers 0 to 15 may be given to sixteen EREGs configured in one resource block pair. When one of the ECCEs is configured from four EREGs, the one ECCE may be able to be configured on the basis of a remainder obtained by dividing the EREG number by 4. The combination of the antenna ports may be one aggregation of the antenna ports assumed to be used to transmit the EPDCCH when each of the ECCEs configures one EPDCCH. When one EPDCCH is configured by each of the ECCEs, one antenna port assumed to be used to transmit the EPDCCH may be antenna port 107 in a case in which one EPDCCH is assumed to be configured by the ECCE configured from EREG 0, 4, 8, and 12, may be antenna port 108 in a case in which one EPDCCH is assumed to be configured by the ECCE configured from EREG 1, 5, 9, and 13, may be antenna port 109 in a case in which one EPDCCH is assumed to be configured by the ECCE configured from EREG 2, 6, 10, and 14, and may be antenna port 110 in a case in which one EPDCCH is assumed to be configured by the ECCE configured from EREG 3, 7, 11, and 15.

(24) According to further still another aspect of the present invention, a communication method is performed by a mobile station device communicating with a base station device. An EPDCCH is configured using one ECCE or a plurality of ECCEs. The communication method includes selecting one antenna port assumed to be used to transmit the EPDCCH from the base station device on the basis of a remainder obtained by dividing a C-RNTI number of the mobile station device by the number of ECCEs used for the EPDCCH when the EPDCCH is transmitted from the base station device using localized transmission; and demodulating the EPDCCH using a reference signal transmitted from the selected one antenna port as a reference at a time of the demodulation of the EPDCCH.

(25) In the communication method according to the aspect of the present invention, the number of ECCEs used for the EPDCCH may be able to be set to one of at least 1, 2, and 4.

(26) In the communication method according to the aspect of the present invention, the EPDCCH may be able to be configured using one ECCE or the plurality of ECCEs in one resource block pair.

(27) The communication method according to the aspect of the present invention may further include selecting one antenna port assumed to be used to transmit the EPDCCH from the base station device from a combination of two antenna ports on the basis of at least a remainder obtained by dividing a C-RNTI number of the mobile station device by 2 when the number of ECCEs used for the EPDCCH is 2, and selecting one antenna port used to transmit the EPDCCH from the base station device from a combination of four antenna ports on the basis of at least a remainder obtained by dividing the C-RNTI number of the mobile station device by 4 when the number of ECCEs used for the EPDCCH is 4.

(28) In the communication method according to the aspect of the present invention, numbers 0 to 15 may be given to sixteen EREGs configured in one resource block pair. When one of the ECCEs is configured from four EREGs, the one ECCE may be able to be configured on the basis of a remainder obtained by dividing the EREG number by 4. The combination of the antenna ports may be one aggregation of the antenna ports assumed to be used to transmit the EPDCCH when each of the ECCEs configures one EPDCCH.

When one EPDCCH is configured by each of the ECCEs, one antenna port assumed to be used to transmit the EPDCCH may be antenna port 107 in a case in which one EPDCCH is assumed to be configured by the ECCE configured from EREG 0, 4, 8, and 12, may be antenna port 108 in a case in which one EPDCCH is assumed to be configured by the ECCE configured from EREG 1, 5, 9, and 13, may be antenna port 109 in a case in which one EPDCCH is assumed to be configured by the ECCE configured from EREG 2, 6, 10, and 14, and may be antenna port 110 in a case in which one EPDCCH is assumed to be configured by the ECCE configured from EREG 3, 7, 11, and 15.

(29) According to further still another aspect of the present invention, an integrated circuit is mounted on a base station device communicating with a mobile station device. An EPDCCH is configured using one ECCE or a plurality of ECCEs. The integrated circuit causes the base station device to realize a series of functions including a function of selecting one antenna port used to transmit the EPDCCH on the basis of a remainder obtained by dividing a C-RNTI number of the mobile station device by the number of ECCEs used for the EPDCCH when the EPDCCH is transmitted using localized transmission and a function of transmitting the EPDCCH using the selected one antenna port.

(30) According to further still another aspect of the present invention, an integrated circuit is mounted on a mobile station device communicating with a base station device. An EPDCCH is configured using one ECCE or a plurality of ECCEs. The integrated circuit causes the base station device to realize a series of functions including a function of selecting one antenna port assumed to be used to transmit the EPDCCH from the base station device on the basis of a remainder obtained by dividing a C-RNTI number of the mobile station device by the number of ECCEs used for the EPDCCH when the EPDCCH is transmitted from the base station device using localized transmission and a function of demodulating the EPDCCH using a reference signal transmitted from the selected one antenna port as a reference at a time of the demodulation of the EPDCCH.

In the present specification, the present invention is disclosed from the viewpoint of an improvement in the radio network signal transmission scheme, the radio network signal reception scheme, the base station device, the mobile station device, the integrated circuit, the communication system, and the communication method in which the base station device sets the regions in which there is a probability of the control channels being mapped for the mobile station devices, but the communication scheme to which the present invention can be applied is not limited to communication schemes upward compatible with the LTE as in LTE or LTE-A. For example, the present invention can also be applied to Universal Mobile Telecommunications System (UMTS).

Advantageous Effects of Invention

According to the present invention, the base station device can efficiently transmit the signals including control information to the mobile station devices and the mobile station devices can efficiently receive the signals including the control information from the base station device, and thus it is possible to realize the more efficient communication system.

DESCRIPTION OF EMBODIMENTS

A technology described in the present specification can be used for various radio network communication systems such as a Code Division Multiple Access (CDMA) system, a Time Division Multiple Access (TDMA) system, a Frequency Division Multiple Access (FDMA) system, an orthogonal FDMA (OFDMA) system, a single carrier FDMA (SC-FDMA) system, and other systems. The terms a "system" and a "network" can be often used synonymously. Radio network technologies (standards) such as universal terrestrial radio access (UTRA) or cdma2000 (registered trademark) can be mounted on the CDMA system. UTRA includes other improved Wide CDMA (WCDMA (registered trademark)) and CDMA. Here, cdma2000 covers the IS-2000, IS-95, and IS-856 standards. A radio network technology such as Global System for Mobile Communications (GSM (registered trademark)) can be mounted on the TDMA system. Radio network technologies such as Evolved UTRA (E-UTRA), Ultra Mobile Broadband (UMB), IEEE 802.11 (Wi-Fi), IEEE 802.16 (WiMAX), IEEE 802.20, and Flash-OFDM (registered trademark) can be mounted on the OFDMA system. UTRA and E-UTRA are parts of a general mobile communication system (UMTS). Here, 3GPP Long Term Evolution (LTE) is a UMTS that uses E-UTRA adopting OFDMA on a downlink and adopting SC-FDMA on an uplink. LTE-A is a system, a radio network technology, and a standard improved from LTE. UTRA, E-UTRA, UMTS, LTE, LTE-A, and GSM are described in documents from the organization named 3rd Generation Partnership Project (3GPP). Here, cdma2000 and UMB are described in documents from the organization named 3rd Generation Partnership Project 2 (3GPP2). For clarity, data communication in LTE and LTE-A will be described below according to some aspects of the present technology and the LTE terms and LTE-A terms are used in most of the following description.

Hereinafter, an embodiment of the present invention will be described in detail with reference to the drawings. The perspective of a communication system, the configuration of a radio network frame, and the like according to the embodiment will be described with reference to FIGS. 9 to 24. The configuration of the communication system according to the embodiment will be described with reference to FIGS. 1 to 6. An operation process of the communication system according to the embodiment will be described with reference to FIGS. 7 and 8.

Figure 9:
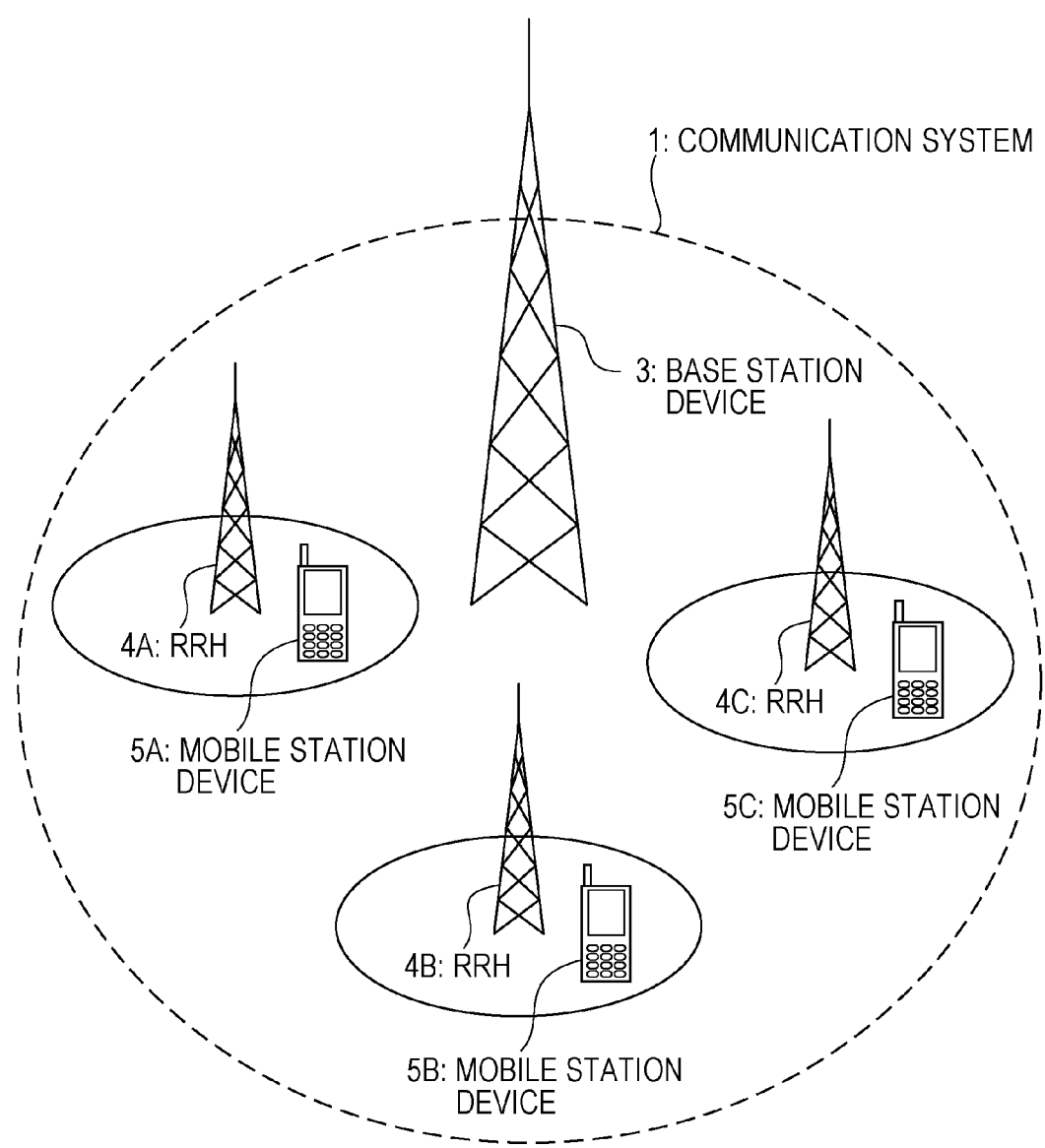
FIG. 9 is a diagram for schematically describing the perspective of the communication system according to the embodiment of the present invention.

FIG. 9 is a diagram for schematically describing the perspective of the communication system according to the embodiment of the present invention. In the communication system 1 illustrated in the drawing, a base station device (also referred to as an eNodeB, a NobeB, a base station (BS), an access point (AP), or a macro base station) 3, and a plurality of remote radio heads (also referred to as RRHs, devices including an outdoor radio network unit with a small size than the base station device, or remote radio units (RRUs)) (also referred to as remote antennas or distributed antennas) 4A, 4B, and 4C, and a plurality of mobile station devices (also referred to as user equipment (UE), mobile stations (MSs), mobile terminals (MTs), terminals, terminal devices, or mobile terminals) 5A, 5B, and 5C perform communication. Hereinafter, in the embodiment, the RRHs 4A, 4B, and 4C are referred to as RRHs 4 and the mobile station devices 5A, 5B, and 5C are referred to as the mobile station devices 5 to allow appropriate description. In the communication system 1, the base station device 3 and the RRHs 4 cooperate with each other to communicate with the mobile station devices 5. In FIG. 9, the base station device 3 and the RRH 4A perform cooperative communication with the mobile station device 5A. The base station device 3 and the RRH 4B perform cooperative communication with the mobile station device 5B. The base station device 3 and the RRH 4C perform cooperative communication with the mobile station device 5C.

The RRH can be said to be a special form of a base station device. For example, the RRH can be said to be a base station device that includes only a signal processing unit and for which setting of parameters used in the RRH, determination of scheduling, and the like are performed by another base station device. Accordingly, in the following description, note that the expression of the base station device 3 appropriately includes the RRH 4.

<Cooperative Communication>

In the communication system 1 according to the embodiment of the present invention, cooperative communication (Cooperative Multipoint: CoMP communication) in which signals are transmitted and received cooperatively using a plurality of cells can be used. For example, a form in which the base station device performs communication using any one frequency band is referred to as a "cell." For example, as the cooperative communication, different weighting signal processing (precoding process) is applied to a signal with a plurality of cells (the base station device 3 and the RRH 4) and the base station device 3 and the RRH 4 cooperate with each other to transmit the signal to the same mobile station device 5 (Joint Processing or Joint Transmission). For example, as the cooperative communication, the plurality of cells (the base station device 3 and the RRH 4) cooperate with each other to perform scheduling on the mobile station device 5 (Coordinated Scheduling: CS). For example, as the cooperative communication, the plurality of cells (the base station device 3 and the RRH 4) cooperate with each other and apply beamforming to transmit the signal to the mobile station device 5 (Coordinated Beamforming: CB). For example, as the cooperative communication, only one of the cells (the base station device 3 or the RRH 4) transmits the signal using a predetermined resource and the other cell (the base station device 3 or the RRH4) does not transmit the signal using the predetermined resource (Blanking, Muting).

In the embodiment of the present invention, while the description is omitted, in terms of the plurality of cells used for the cooperative communication, the different cells may be configured by the different base station devices 3, the different cells may be configured by the different RRHs 4 managed by the same base station device 3, or the different cells may be configured by the base station device 3 and the RRH 4 managed by the base station device 3 different from this base station device.

The plurality of cells may be used as physically different cells, but may be used as logically the same cells. Specifically, a common cell identifier (physical cell ID) may be configured to be used in each cell. A configuration in which a plurality of transmission devices (the base station device 3 and the RRH 4) use the same frequency band to transmit a common signal to the same reception device is referred to as a single frequency network (SFN).

Heterogeneous network development is assumed as development of the communication system 1 according to the embodiment of the present invention. The communication system 1 is configured to include the base station device 3 and the RRHs 4 and a coverage supported by the base station device 3 is configured to include some or all of the coverages supported by the RRHs 4. Here, the coverage means an area in which communication can be realized satisfying requirements. In the communication system 1, the base station device 3 and the RRH 4 cooperate with each other to transmit a signal to the mobile station device 5 located within the mutually overlapping coverage. Here, the RRH 4 is managed by the base station device 3 such that transmission and reception are controlled. The base station device 3 and the RRH 4 are connected by a wired line such as an optical fiber or a wireless line using a relay technology.

When the mobile station device 5 is located near the base station device 3 or the RRH 4, the base station device 3 or the RRH 4 may use single cell communication. That is, the certain mobile station device 5 performs communication with the base station device 3 or the RRH 4 without using the cooperative communication to transmit and receive a signal. For example, the base station device 3 may receive a signal of the uplink from the mobile station device 5 located to be close to the self-base station device. For example, the RRH 4 may receive a signal of the uplink from the mobile station device 5 located to be close to the RRH itself. For example, both of the base station device 3 and the RRH 4 may receive a signal of the uplink from the mobile station device 5 located near an end of the coverage (cell edge) constructed by the RRH 4.

The mobile station device 5 may receive signals transmitted from both of the base station device 3 and the RRH 4 using the cooperative communication with a downlink and may transmit a signal to either of the base station device 3 and the RRH 4 in an appropriate form with an uplink. For example, the mobile station device 5 transmits a signal of the uplink with transmission power appropriate for reception of a signal by the base station device 3. For example, the mobile station device 5 transmits a signal of the uplink with transmission power appropriate for reception of a signal by the RRH 4.

In the embodiment of the present invention, Multi-User (MU)-MIMO can be applied inside one base station device 3. For example, MU-MIMO is a technology for performing maintenance of mutual orthogonality of signals or reduction in the same channel interference between the mobile station devices 5 even at the time of use of the same resource in frequency domain and time domain by controlling beams of the signals regarding the mobile station devices 5 using a precoding technology or the like in the plurality of mobile station devices 5 present in different positions (for example, areas A and B) in the area of the base station device 3 using a plurality of transmit antennas. MU-MIMO is also referred to as Space Division Multiple Access (SDMA) in terms of the fact that signals between the mobile station devices 5 are spatially demultiplexed.

In MU-MIMO, the base station device 3 transmits UE-specific RSs orthogonal to each other between the different mobile station devices 5 and performs spatial multiplexing on a signal of a second different PDCCH to a common resource to transmit the signal. In MU-MIMO, signals are subjected to spatial multiplexing and different precoding processes are applied to the mobile station devices 5. The different precoding processes can be performed on the second PDCCHs and the UE-specific RSs of the mobile station devices 5 located in the area A and the mobile station device 5 located in the area B in the area of the base station device 3. For regions in which there is a probability of the second PDCCH being mapped, the regions are independently set in the mobile station device 5 located in the area A and the mobile station device 5 located in the area B and the precoding processes can be independently applied.

In the communication system 1, a downlink (also referred to as a DL) which is a communication direction from the base station device 3 or the RRH 4 to the mobile station device 5 is configured to include a downlink pilot channel, a Physical Downlink Control CHannel (also referred to as a PDCCH), and a Physical Downlink Shared CHannel (also referred to as a PDSCH). The PDSCH is applied or is not applied to the cooperative communication. The PDCCH is configured by a first PDCCH and a second PDCCH (ePDCCH: Enhanced-PDCCH). The downlink pilot channel is configured to include a first type of reference signal (a CRS to be described below) used to demodulate the PDSCH and the first PDCCH, a second type of reference signal (a UE-specific RS to be described below) used to demodulate the PDSCH and the second PDCCH, and a third type of reference signal (a CSI-RS to be described below).

From one point of view, the first PDCCH is a physical channel used by the same transmission port (an antenna port or a transmit antenna) as that of the first type of reference signal. The second PDCCH is a physical channel used by the same transmission port as that of the second type of reference signal. The mobile station device 5 demodulates the signal mapped to the first PDCCH using the first type of reference signal and demodulates the signal mapped to the second PDCCH using the second type of reference signal. The first type of reference signal is a common reference signal to all of the mobile station devices 5 in the cell and is a reference signal which can be used by any mobile station device 5 since the reference signal is inserted into almost all of the resource blocks. Therefore, the first PDCCH can be demodulated by any mobile station device 5. On the other hand, the second type of reference signal is a reference signal which can be basically inserted into only an assigned resource block. The precoding process can be adaptively applied to the second type of reference signal, as in data.

From one point of view, the first PDCCH is a control channel which is mapped in an OFDM symbol in which the PDSCH is not mapped. The second PDCCH is a control channel which is mapped in an OFDM symbol in which the PDSCH is mapped. From one point of view, the first PDCCH is a control channel in which a signal is basically mapped throughout all of the PRBs (PRBs of the first slot) of a downlink system band and the second PDCCH is a control channel in which a signal is mapped throughout PRB pairs (PRBs) configured from the base station device 3 in the downlink system band. As will be described below in detail, from one point of view, different signal configurations are used for the first PDCCH and the second PDCCH. For the first PDCCH, a CCE configuration to be described below is used for a signal configuration. For the second PDCCH, the configuration of an enhanced-CCE (eCCE) (first component) to be described below is used for a signal configuration. In other words, minimum units (components) of resources used for the configuration of one control channel differ between the first PDCCH and the second PDCCH. Each control channel is configured to include one or more minimum units.

In the communication system 1, an uplink (also referred to as a UL) which is a communication direction from the mobile station device 5 to the base station device 3 or the RRH 4 is configured to include a Physical Uplink Shared CHannel (also referred to as a PUSCH), an uplink pilot channel (uplink reference signal; UL RS: Uplink Reference Signal, SRS: Sounding Reference Signal, DM RS: Demodulation Reference Signal), and a Physical Uplink Control CHannel (also referred to as a PDCCH). The channel means a medium used to transmit a signal. A channel used in the physical layer is referred to as a physical channel and a channel used in the Medium Access Control (MAC) layer is referred to as a logical channel.

When the cooperative communication is applied to a downlink, for example, the present invention can be applied to a communication system, for example, in a case in which transmission of a plurality of antennas is applied to the downlink. To simplify the description, a case in which the cooperative communication is not applied to an uplink and a case in which the transmission of a plurality of antennas is not applied to the uplink will be described. However, the present invention is not limited to these cases.

The PDSCH is a physical channel used to transmit and receive downlink data and control information (which is different from control information transmitted with the PDSCH). The PDSCH is a physical channel used to transmit and receive control information (which is different from control information transmitted and received with the PDSCH) of the downlink. The PUSCH is a physical channel used to transmit and receive data and control information of the uplink (which is different from control information transmitted with a downlink). The PUCCH is a physical channel used to transmit and receive control information of an uplink (Uplink Control Information (UCI)). As the types of UCIs, a reception confirmation acknowledgement (ACK/NACK) indicating a positive acknowledgement (ACK) or a negative acknowledgement (NACK) to data of the downlink of the PDSCH, a scheduling request (SR) indicating whether a request to assign a resource is made, and the like are used. As other types of physical channels, a Synchronization CHannel (SCH) used to establish downlink synchronization, a Physical Random Access CHannel (PRACH) used to establish uplink synchronization, a Physical Broadcast Channel (PBCH) used to transmit system information (also referred to as a System Information Block (SIB)) of the downlink, and the like are used. The PDSCH is also used to transmit the system information of the downlink.

The mobile station device 5, the base station device 3, or the RRH 4 map a signal generated from data, control information, or the like to each physical channel to transmit the signal. Data transmitted with the PDSCH or the PDSCH is referred to as a transport block. An area controlled by the base station device 3 or the RRH 4 is referred to as a cell.

<Configuration of Time Frame of Downlink>

Figure 10:
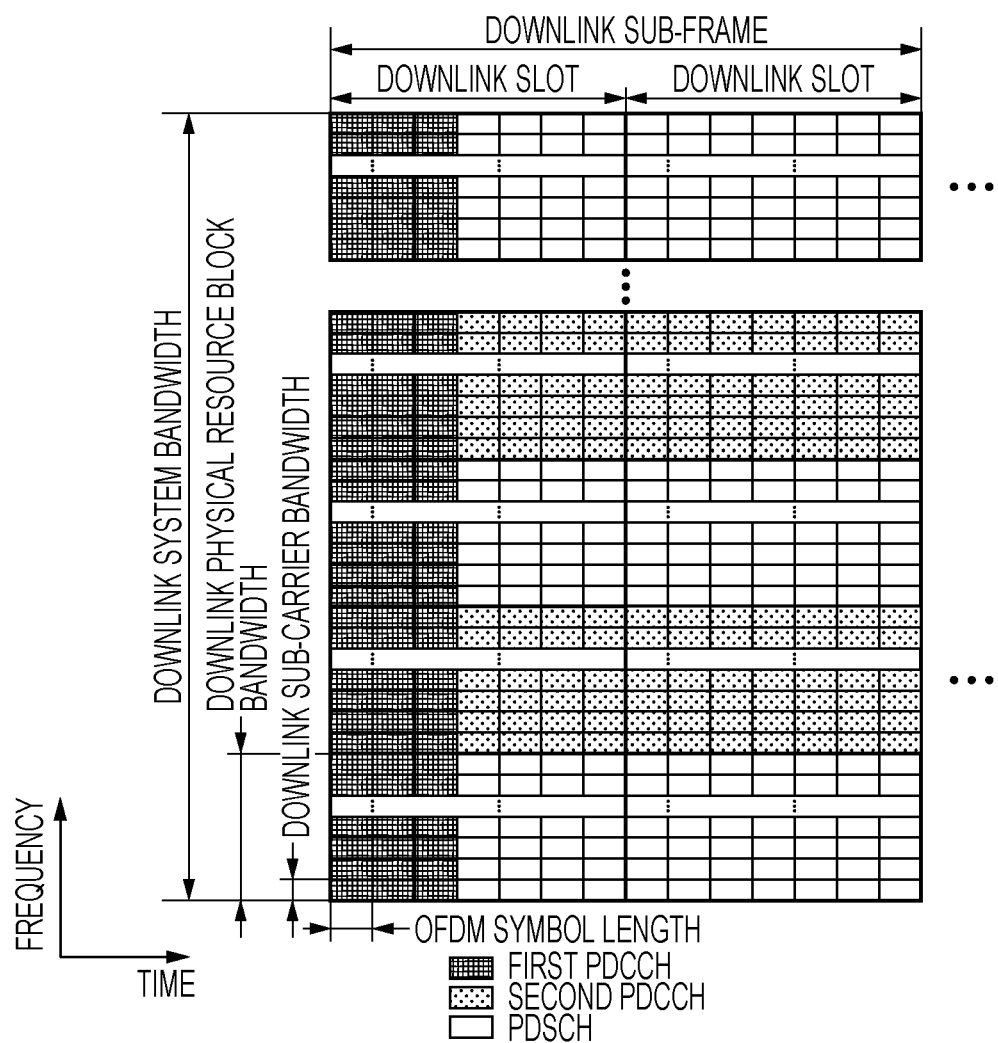
FIG. 10 is a diagram illustrating the overall configuration of a time frame of a downlink from the base station device 3 or an RRH 4 to the mobile station device 5 according to the embodiment of the present invention.

FIG. 10 is a diagram illustrating the overall configuration of a time frame of a downlink from the base station device 3 or the RRH 4 to the mobile station device 5 according to the embodiment of the present invention. In the drawing, the horizontal axis represents the time domain and the vertical axis represents the frequency domain. The time frame of the downlink is a unit of resource assignment and is configured by a pair of resource blocks (RB) (also referred to as Physical Resource Blocks (PRB)) (also referred to a Physical Resource Block pair (PRB pair)) formed by a frequency band and a time band of the width of the downlink determined in advance. One PRB pair of the downlink (also referred to as a downlink physical resource block pair (DL PRB pair)) is configured by two PRBs (referred to as downlink physical resource blocks (DL PRBs)) of the downlink that continue in the time domain of the downlink.

In the drawing, one DL PRB is configured by twelve subcarriers (referred to as downlink subcarriers) in the frequency domain of the downlink and is configured by seven Orthogonal Frequency Division Multiplexing (OFDM) symbols in the time domain. A system band of the downlink (referred to as a downlink system band) is a communication band of the downlink of the base station device 3 or the RRH 4. For example, a system bandwidth of the downlink (referred to as a downlink system bandwidth) is configured by a frequency bandwidth of 20 MHz.

In the downlink system band, a plurality of DL PRBs (DL PRB pairs) are mapped according to the downlink system bandwidth. For example, the downlink system band of the frequency bandwidth of 20 MHz is configured by 110 DL PRBs (DL PRB pairs).

In the time domain illustrated in the drawing, there are a slot (referred to as a downlink slot) configured by seven OFDM symbols, a subframe (referred to as a downlink subframe) configured by two downlink slots, and a radio frame (referred to as a downlink radio frame) configured by ten subframes. A unit formed by one downlink subcarrier and one OFDM symbol is referred to as a Resource Element (RE) (downlink resource element). At least the PDSCH used to transmit information data (also referred to as a transport block), the first PDCCH used to transmit the control information for the PDSCH, and the second PDCCH are mapped in each downlink subframe. In the drawing, the first PDCCH is configured by the first to third OFDM symbols of the downlink subframe and the PDSCH or the second PDCCH is configured by the fourth to fourteenth OFDM symbols of the downlink subframe. The PDSCH and the second PDCCH are mapped to different DL PRB pairs. The number of OFDM symbols configuring the first PDCCH, the PDSCH, and the number of OFDM symbols configuring the second PDCCH may be changed for each downlink subframe. The number of OFDM symbols configuring the second PDCCH may be fixed. For example, irrespective of the number of OFDM symbols configuring the first PDCCH or the number of OFDM symbols configuring the PDSCH, the second PDCCH may be configured by the fourth to fourteenth OFDM symbols of the downlink subframe.

Although not illustrated in the drawing, downlink pilot channels used to transmit a Reference Signal (RS) (also referred to as a downlink reference signal) of the downlink are distributed and mapped to the plurality of downlink resource elements. Here, the downlink reference signal is configured by at least different types of reference signals, that is, a first type of reference signal, a second type of reference signal, and a third type of reference signal. For example, the downlink reference signal is used to estimate a change in channels of the PDSCH and the PDCCHs (the first PDCCH and the second PDCCH). The first type of reference signal is used to demodulate the PDSCH and the first PDCCH and also referred to as a Cell specific RS (CRS). The second type of reference signal is used to demodulate the PDSCH and the second PDCCH and is also referred to as a UE-specific RS. For example, the third type of reference signal is used only to estimate a change in the channel and is also referred to as a Channel State Information RS (CSI-RS). The downlink reference signal is a signal known in the communication system 1. The number of downlink resource elements configuring the downlink reference signal may depend on the number of transmit antennas (antenna ports) used for communication of the base station device 3 or the RRH 4 with the mobile station device 5. In the following description, a case in which the CRS is used as the first type of reference signal, the UE-specific RS is used as the second type of reference signal, and the CSI-RS is used as the third type of reference signal will be described. The UE-specific RS can also be used to demodulate the PDSCH to which the cooperative communication is applied and the PDSCH to which the cooperative communication is not applied. The UE-specific RS can also be used to demodulate the second PDCCH to which the cooperative communication (precoding process) is applied and the second PDCCH to which the cooperative communication is not applied.

In the PDCCH (the first PDCCH or the second PDCCH), signals are mapped which are generated from control information such as information indicating assignment of the DL PRB pair to the PDSCH, information indicating assignment of the UL PRB pair to the PUSCH, and information indicating a mobile station identifier (referred to as a Radio Network Temporary Identifier (RNTI)), a modulation scheme, a coding rate, a retransmission parameter, the number of spatial multiplexings, and a precoding matrix and a transmission power control command (TPC command). The control information included in the PDCCH is referred to as downlink control information (DCI). The DCI that includes information indicating assignment of the DL PRB pair to the PDSCH is referred to as downlink assignment (also referred to as DL assignment or downlink grant) and the DCI that includes information indicating assignment of the UL PRB pair to the PUSCH is referred to as uplink grant (referred to as UL grant). The downlink assignment includes a transmission power control command for the PUSCH. The uplink assignment includes a transmission power control command for the PUSCH. One PDCCH includes only information indicating assignment of a resource of one PDSCH or information indicating assignment of a resource of one PUSCH and does not include information indicating assignment of resources of the plurality of PDSCHs or assignment of resources of the plurality of PUSCHs.

As information transmitted with the PDCCH, there is a Cyclic Redundancy Check (CRC) code. A relation between the DCI, the RNTI, and the CRC transmitted with the PDCCH will be described in detail. The CRC code is generated from the DCI using a generation polynomial determined in advance. An exclusive OR (also referred to as scrambling) process is performed on the generated CRC code using the RNTI. A signal modulated from bits indicating the DCI and bits (referred to as CRC masked by UE ID) generated by performing the exclusive OR process on the CRC code using the RNTI is actually transmitted with the PDCCH.

In the time domain, the resource of the PDSCH is mapped in the same downlink subframe as the downlink subframe in which the resource of the PDCCH including the downlink assignment used to assign the resource of the PDSCH is mapped.

Figure 11:
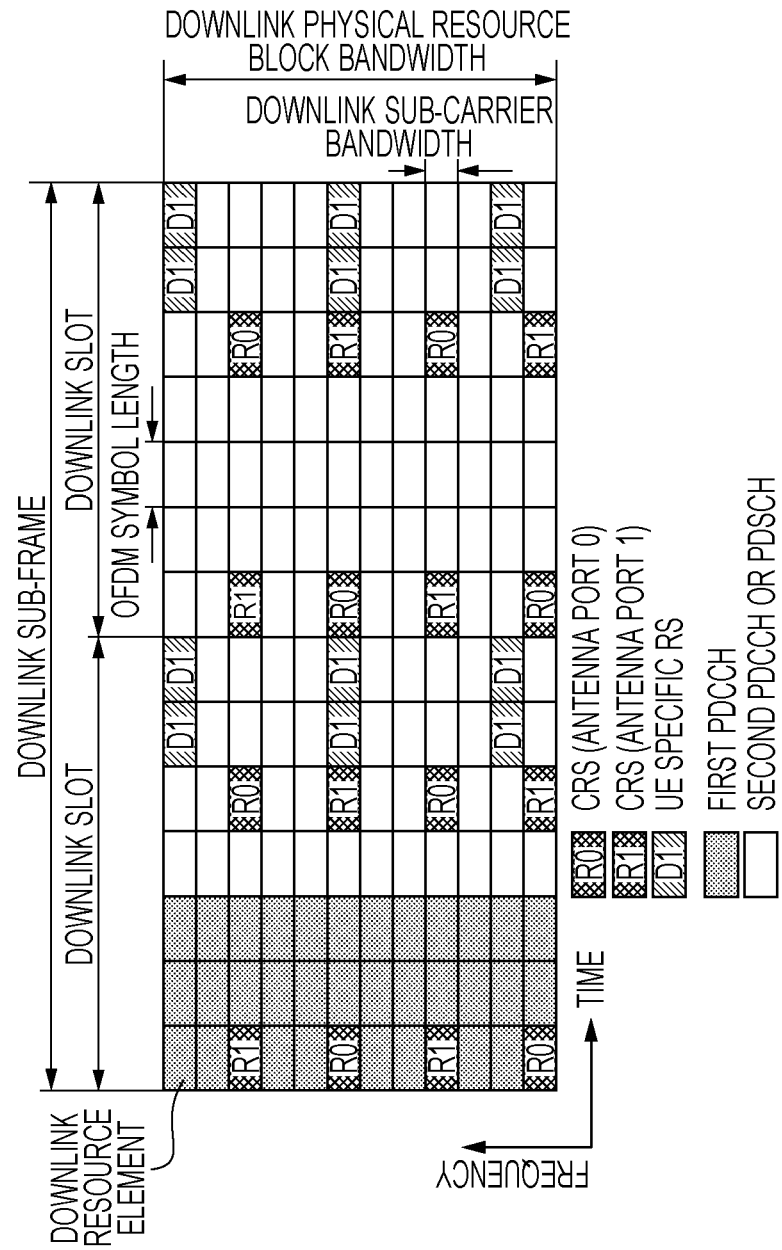
FIG. 11 is a diagram illustrating an example of the mapping of downlink reference signals in the downlink subframe of a communication system 1 according to the embodiment of the present invention.

The mapping of the downlink reference signal will be described. FIG. 11 is a diagram illustrating an example of the mapping of the downlink reference signals in the downlink subframe of the communication system 1 according to the embodiment of the present invention. To simplify the description, the mapping of the downlink reference signals in a one certain DL PRB pair will be described in FIG. 11. However, a common mapping method is used in the plurality of DL PRB pairs in the downlink system band.

Of the shaded downlink resource elements, R0 to R1 represent the CRSs of antenna ports 0 and 1. Here, the antenna ports mean logical antennas used for signal processing. One antenna port may be configured by a plurality of physical antennas. The plurality of physical antennas configuring the same antenna port transmit the same signal. In the same antenna port, delay diversity or Cyclic Delay Diversity (CDD) can be applied using the plurality of physical antennas, but other signal processing is not available. Here, a case in which the CRSs correspond to two antenna ports is illustrated in FIG. 11. However, the communication system according to the embodiment may correspond to a different number of antenna ports. For example, the CRSs for one antenna port or four antenna ports may be mapped to the resources of the downlink. The CRS can be mapped in all of the DL PRB pairs in the downlink system band.

Of the shaded downlink resource elements, D1 represents the UE-specific RS. When the UE-specific RSs are transmitted using the plurality of antenna ports, different codes are used with the respective antenna ports. That is, Code Division Multiplexing (CDM) is applied to the UE-specific RSs. Here, the UE-specific RS may change the length of the code used for the CDM or the number of mapped downlink resource elements according to a type of signal processing (the number of antenna ports) used for the data signal or the control signal mapped to the DL PRB pair. FIG. 11 illustrates an example of the mapping of the UE-specific RSs when the number of antenna ports used to transmit the UE-specific RSs is 1 (the antenna port 7 or the antenna port 107) or 2 (the antenna ports 7 and 8 or the antenna ports 107 and 108). For example, in the base station device 3 or the RRH 4, when the number of antenna ports used to transmit the UE-specific RSs is 2, the UE-specific RSs are multiplexed and mapped using two downlink resource elements as one unit (units of the CDM) of the time domain (the OFDM symbols) that continue in the same frequency domain (subcarrier) by using the code with a code length of 2. In other words, in this case, the CDM is applied to the multiplexing of the UE-specific RSs. In FIG. 11, the UE-specific RSs of the antenna port 7 (or the antenna port 107) and the antenna port 8 (or the antenna port 108) are multiplexed to D1 by the CDM.

Figure 12:
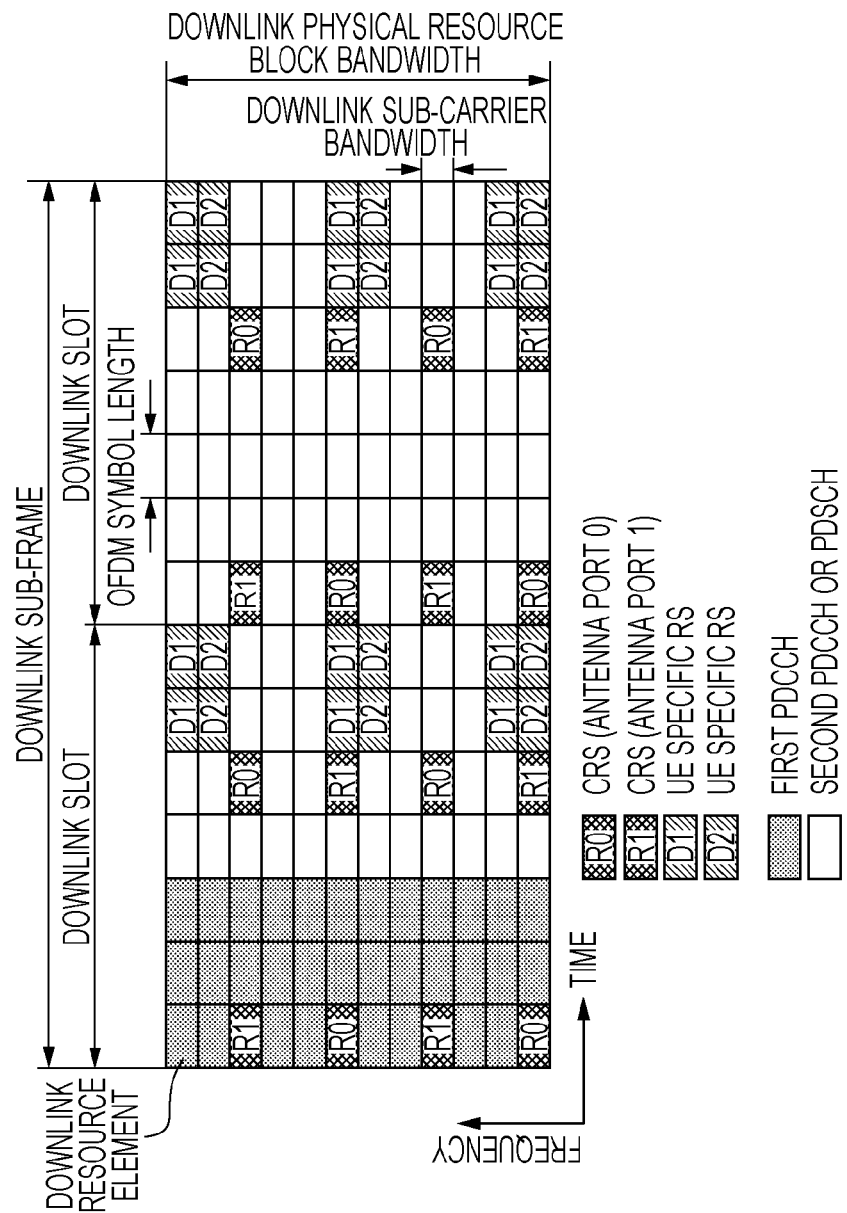
FIG. 12 is a diagram illustrating an example of the mapping of the downlink reference signal in the downlink subframe of the communication system 1 according to the embodiment of the present invention.

FIG. 12 is a diagram illustrating an example of the mapping of the downlink reference signal in the downlink subframe of the communication system 1 according to the embodiment of the present invention. Of the shaded downlink resource elements, D1 and D2 represent the UE-specific RSs. FIG. 12 illustrates an example of the mapping of the UE-specific RSs when the number of antenna ports used to transmit the UE-specific RSs is 3 (the antenna ports 7, 8, and 9 or the antenna ports 107, 108, and 109) or 4 (the antenna ports 7, 8, 9, and 10 or the antenna ports 107, 108, 109, and 110). For example, when the number of antenna ports used to transmit the UE-specific RS in the base station device 3 or the RRH 4 is 4, the number of downlink resource elements to which the UE-specific RSs are mapped can be changed to be doubled and the UE-specific RSs are multiplexed and mapped in the different downlink resource elements at intervals of two antenna ports. In other words, in this case, the CDM and Frequency Division Multiplexing (FDM) are applied to the multiplexing of the UE-specific RSs. In FIG. 12, the UE-specific RSs of the antenna port 7 (or the antenna port 107) and the antenna port 8 (or the antenna port 108) are multiplexed to D1 by the CDM and the UE-specific RSs of the antenna port 9 (or the antenna port 109) and the antenna port 10 (or the antenna port 110) are multiplexed to D2 by the CDM.

For example, when the number of antenna ports used to transmit the UE-specific RS is 8 in the base station device 3 or the RRH 4, the number of downlink resource elements to which the UE-specific RSs are mapped can be changed to be doubled and the UE-specific RSs are multiplexed and mapped using a code with a code length of 4 and setting four downlink resource elements as one unit. In other words, in this case, the CDM of a different code length is applied to the multiplexing of the UE-specific RSs.

In the UE-specific RS, a scramble code is further superimposed on the code of each antenna port. The scramble code is generated on the basis of cell IDs and scramble IDs notified from the base station device 3 and the RRH 4. For example, the scramble code is generated from a pseudo-random sequence generated on the basis of the cell IDs and the scramble IDs notified from the base station device 3 and the RRH 4. For example, the scramble ID is a value indicating 0 or 1. The scramble ID and the antenna port to be used are subjected to joint coding and information indicating the scramble ID and the antenna port can also be indexed. In the generation of the scramble code used for the UE-specific RS, a parameter individually notified from each mobile station device 5 may be used. The UE-specific RSs are mapped in the DL PRB pair of the second PDCCH and the PDSCH assigned to the mobile station device 5 in which the use of the UE-specific RS is set.

The base station device 3 and the RRH 4 may assign the signals of the CRSs to different downlink resource elements or may assign the signals of the CRSs to the same downlink resource element. For example, when the cell IDs notified from the base station device 3 and the RRH 4 are different, the signals of the CRS may be assigned to different downlink resource elements. In another example, only the base station device 3 may assign the signals of the CRSs to some of the downlink resource elements and the RRH 4 may not assign the signals of the CRSs to any downlink resource element. For example, when the cell ID is notified from only the base station device 3, as described above, only the base station device 3 may assign the signals of the CRSs to some of the downlink resource elements and the RRH 4 may not assign the signals of the CRSs to any downlink resource element. In further another example, the base station device 3 and the RRH 4 may assign the signals of the CRSs to the same downlink resource element and the same sequence may be transmitted from the base station device 3 and the RRH 4. For example, when the cell IDs notified from the base station device 3 and the RRH 4 are the same, the signals of the CRSs may be assigned in the above-described way.

Figure 13:
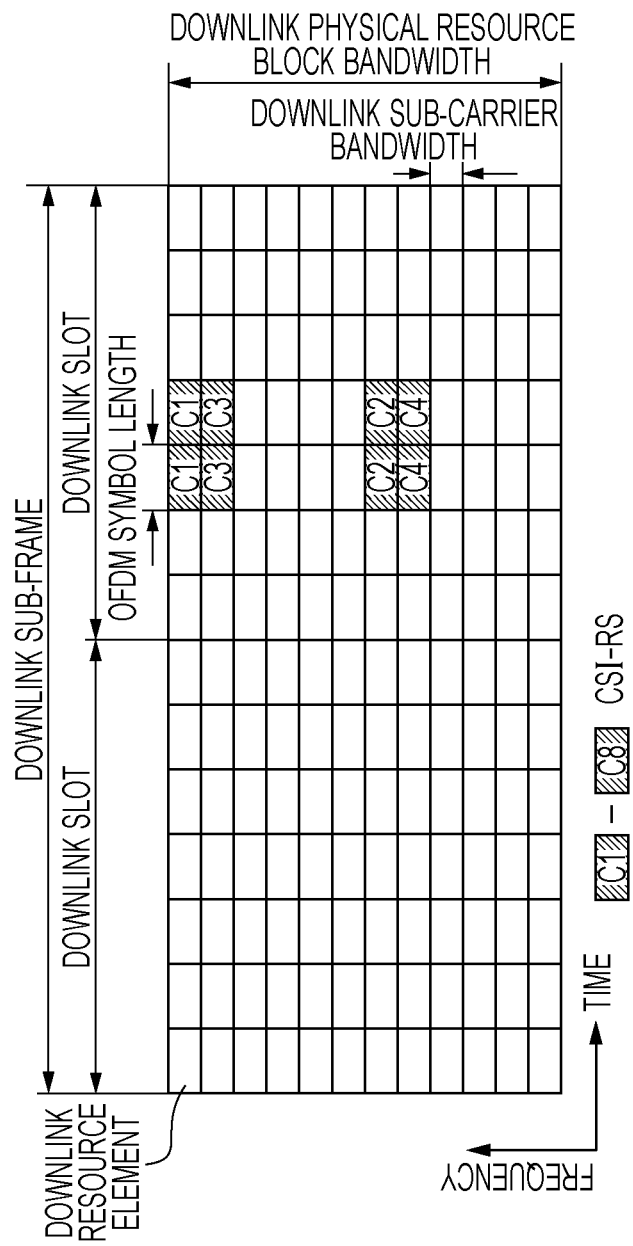
FIG. 13 is a diagram illustrating the DL PRB pair in which a CSI-RS (reference signal for transmission path situation measurement) for 8 antenna ports is mapped.

FIG. 13 is a diagram illustrating the DL PRB pair in which the CSI-RS (reference signal for transmission path situation measurement) for 8 antenna ports is mapped. FIG. 13 illustrates a case in which the CSI-RSs are mapped when the number of antenna ports (the number of CSI ports) used in the base station device 3 and the RRH 4 is 8. In FIG. 13, the description of the CRS, the UE-specific RS, the PDCCH, the PDSCH, and the like is omitted to simplify the description.

For the CSI-RS, 2-chip orthogonal codes (Walsh codes) are used in each CDM group, the CSI port (the port (an antenna port or a resource grid) of the CSI-RS) is assigned to each orthogonal code, and the code division multiplexing is performed at intervals of two CSI ports. Each CDM group is subjected to the frequency division multiplexing. The CSI-RSs of the eight antenna ports of CSI ports 1 to 8 (antenna ports 15 to 22), are mapped using four CDM groups. For example, in a CDM group C1 of the CSI-RSs, the CSI-RSs of the CSI ports 1 and 2 (antenna ports 15 and 16) are subjected to the code division multiplexing and mapped. In a CDM group C2 of the CSI-RSs, the CSI-RSs of the CSI ports 3 and 4 (antenna ports 17 and 18) are subjected to the code division multiplexing and mapped. In a CDM group C3 of the CSI-RSs, the CSI-RSs of the CSI ports 5 and 6 (antenna ports 19 and 20) are subjected to the code division multiplexing and mapped. In a CDM group C4 of the CSI-RSs, the CSI-RSs of the CSI ports 7 and 8 (antenna ports 21 and 22) are subjected to the code division multiplexing and mapped.

When the number of antenna ports of the CSI-RSs of the base station device 3 and the RRH 4 is 8, the base station device 3 and the RRH 4 can set 8 as the maximum number of layers (the number of ranks or the number of spatial multiplexings) applied to the PDSCH. The base station device 3 and the RRH 4 can transmit the CSI-RSs when the number of antenna ports of the CSI-RSs is 1, 2, or 4. The base station device 3 and the RRH 4 can transmit the CSI-RSs for one antenna port or two antenna ports using the CDM group C1 of the CSI-RSs illustrated in FIG. 13. The base station device 3 and the RRH 4 can transmit the CSI-RSs for four antenna ports using the CDM groups C1 and C2 of the CSI-RSs illustrated in FIG. 13.

The base station device 3 and the RRH 4 assign the signals of the CSI-RS to the different downlink resource elements in some cases and assign the signals of the CSI-RSs to the same downlink resource element in some cases. For example, the base station device 3 and the RRH 4 assign different downlink resource elements and/or different signal sequences to the CSI-RSs in some cases. In the mobile station device 5, the CSI-RSs transmitted from the base station device 3 and the CSI-RSs transmitted from the RRH 4 are recognized as the CSI-RS corresponding to the different antenna ports. For example, the base station device 3 and the RRH 4 assign the same downlink resource element to the CSI-RSs and the same sequence is transmitted from the base station device 3 and the RRH 4 in some cases.

The base station device 3 and the RRH 4 notify the mobile station device 5 of the configuration of the CSI-RS (the CSI-RS-Config-r10). The configuration of the CSI-RS includes at least information (antennaPortsCount-r10) indicating the number of antenna ports set in the CSI-RS, information (subframeConfig-r10) indicating the downlink subframe in which the CSI-RS is mapped, and information (ResourceConfig-r10) indicating the frequency domain in which the CSI-RS is mapped. For example, one of the values 1, 2, 4, and 8 is used as the number of antenna ports of the CSI-RS. As information indicating a frequency domain in which the CSI-RS corresponding to the antenna port 15 (CSI port 1) is mapped, an index indicating the position of the beginning resource element among the resource elements in which the CSI-RSs are mapped is used. When the position of the CSI-RS corresponding to the antenna port 15 is determined, the CSI-RSs corresponding to the other antenna ports are uniquely determined on the basis of a rule decided in advance. As information indicating the downlink subframe in which the CSI-RSs are mapped, the position and period of the downlink subframe in which the CSI-RSs are mapped are indicated by indexes. For example, when the index of subframeConfig-r10 is 5, the index indicates that the CSI-RS is mapped at intervals of ten subframes and indicates that the CSI-RS is mapped in a subframe 0 (which is a subframe number in the radio network frame) in the radio network frame in which ten subframes are set as units. In another example, for example, when the index of subframeConfig-r10 is 1, the index indicates that the CSI-RS is mapped at intervals of five subframes and indicates that the CSI-RSs are mapped in subframes 1 and 6 in the radio network frame in which ten subframes are set as units.

<Configuration of Time Frame of Uplink>

Figure 14:
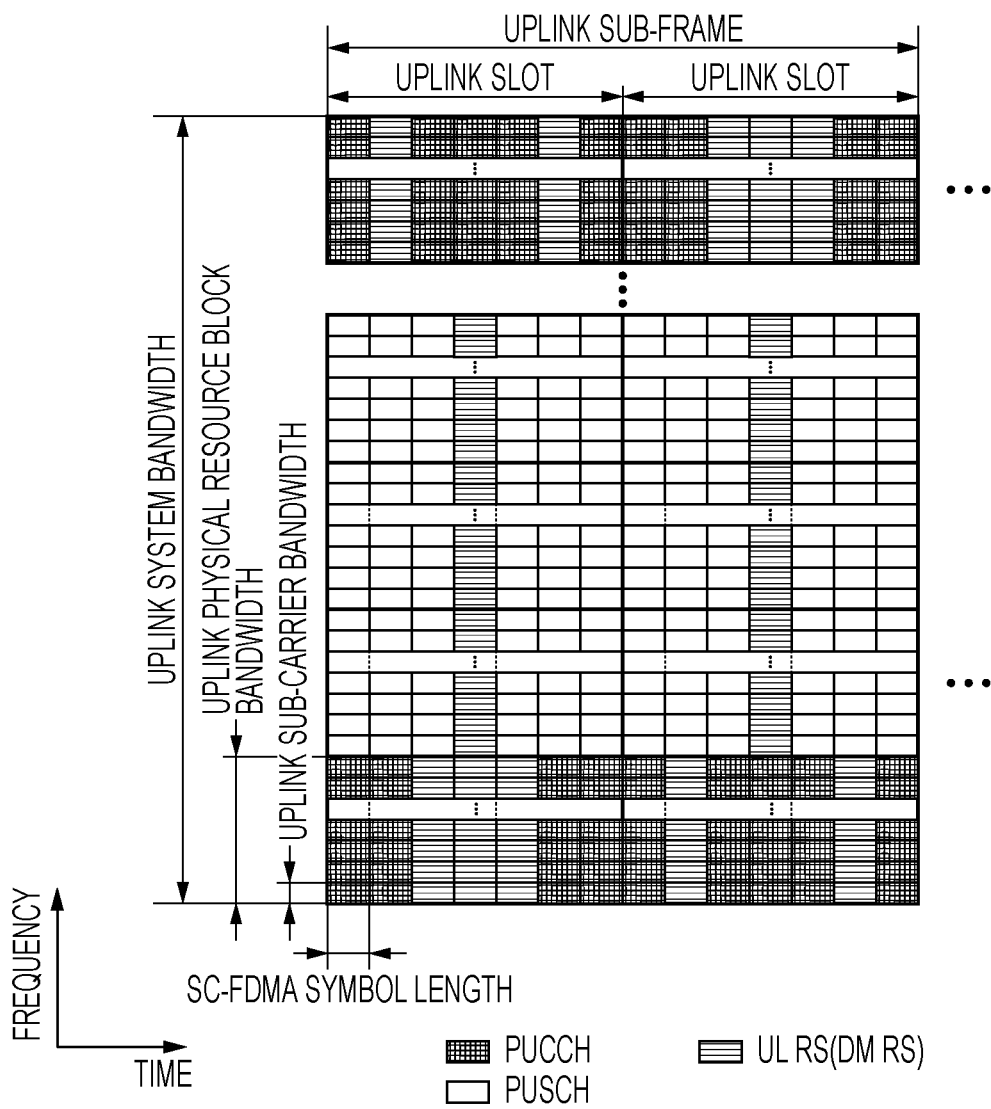
FIG. 14 is a diagram illustrating the overall configuration of an uplink time frame from the mobile station device 5 to the base station device 3 and the RRH 4 according to the embodiment of the present invention.

FIG. 14 is a diagram illustrating the overall configuration of a time frame of an uplink from the mobile station device 5 to the base station device 3 and the RRH 4 according to the embodiment of the present invention. In the drawing, the horizontal axis represents the time domain and the vertical axis represents the frequency domain. The time frame of the uplink is units of resource assignment or the like and is configured by a pair of physical resource blocks (referred to as an uplink physical resource block pair; UL PRB pair) formed by a frequency band and a time band of the width of the uplink determined in advance. One UL PRB pair is configured by two PRB (referred to as uplink physical resource blocks (UL PRB)) of the uplink that continue in the time domain of the uplink.

In the drawing, one UL PRB is configured by twelve subcarriers (referred to as uplink subcarriers) in the frequency domain of the uplink and is configured by seven Single-Carrier Frequency Division Multiplexing Access (SC-FDMA) symbols in the time domain. A system band of the uplink (referred to as an uplink system band) is a communication band of the uplink of the base station device 3 or the RRH 4. For example, a system bandwidth of the uplink (referred to as an uplink system bandwidth) is configured by a frequency bandwidth of 20 MHz.

In the uplink system band, a plurality of UL PRB pairs are mapped according to the uplink system bandwidth. For example, the uplink system band of the frequency bandwidth of 20 MHz is configured by 110 UL PRB pairs). In the time domain illustrated in the drawing, there are a slot (referred to as an uplink slot) configured by seven SC-FDMA symbols, a subframe (referred to as an uplink subframe) configured by two uplink slots, and a radio frame (referred to as an uplink radio frame) configured by ten subframes. A unit formed by one uplink subcarrier and one SC-FDMA symbol is referred to as a Resource Element (referred to as an uplink resource element).

At least the PUSCH used to transmit the information data, the PUCCH used to transmit Uplink Control Information (UCI), and UL RS (DM RS) used to demodulate the PUSCH and the PUCCH (estimate a change in the channel) are mapped in each uplink subframe. Although not illustrated, the PRACH used to establish uplink synchronization is mapped in any uplink subframe. Although not illustrated, the UL RS (SRS) used to measure channel quality and synchronization deviation, for example, is mapped in any uplink subframe. The PUCCH is used to transmit a UCI (ACK/NACK) indicating a positive acknowledgement (ACK) or negative acknowledgement (NACK) to data received using the PDSCH, a UCI (SR: Scheduling Request) indicating at least whether to make a request for assignment of a resource of the uplink, and a UCI (CQI: Channel Quality Indicator) indicating reception quality (also referred to as channel quality) of the downlink.

When the mobile station device 5 indicates that the mobile station device 5 requests the base station device 3 to assign the resource of the uplink, the mobile station device 5 transmits a signal with the PUCCH for transmission of the SR. From the result that the signal is detected with the resource of the PUCCH for the transmission of the SR, the base station device 3 recognizes that the mobile station device 5 makes the request for assigning the resource of the uplink. When the mobile station device 5 indicates that the mobile station device 5 does not request the base station device 3 to assign the resource of the uplink, the mobile station device 5 does not transmit any signal with the resource of the PUCCH for the transmission of the SR assigned in advance. From the result that no signal is detected with the resource of the PUCCH for the transmission of the SR, the base station device 3 recognizes that the mobile station device 5 does not make the request for assigning the resource of the uplink.

For the PUCCH, different types of signal configurations are used when the UCI formed for the ACK/NACK is transmitted, when the UCI formed for the SR is transmitted, and when the UCI formed for the CQI is transmitted. The PUCCH used to transmit the ACK/NACK is referred to as a PUCCH format 1a or a PUCCH format 1b. In the PUCCH format 1a, Binary Phase Shift Keying (BPSK) is used as a demodulation scheme of demodulating information regarding the ACK/NACK. In the PUCCH format 1a, 1-bit information is indicated from a demodulated signal. In the PUCCH format 1b, Quadrature Phase Shift Keying (QPSK) is used as a demodulation scheme of demodulating the information regarding the ACK/NACK. In the PUCCH format 1b, 2-bit information is indicated from a demodulated signal. The PUCCH used to transmit the SR is referred to as a PUCCH format 1. The PUCCH used to transmit the CQI is referred to as a PUCCH format 2. The PUCCH used to simultaneously transmit the CQI and the ACK/NACK is referred to as a PUCCH format 2a or a PUCCH format 2b. In the PUCCH format 2a and the PUCCH format 2b, the reference signal (DM RS) of the uplink pilot channel is multiplied by the demodulated signal generated from the information regarding the ACK/NACK. In the PUCCH format 2a, 1-bit information regarding the ACK/NACK and information regarding the CQI are transmitted. In the PUCCH format 2b, 2-bit information regarding the ACK/NACK and information regarding the CQI are transmitted.

One PUSCH is configured by one or more UL PRB pairs, one PUCCH is configured by two UL PRBs having a symmetric relation in the frequency domain in the uplink system band and located in different uplink slots, and one PRACH is configured by six UL PRB pairs. For example, in FIG. 14, one UL PRB pair used for the PUCCH is configured by the UL PRB with the lowest frequency in the first uplink slot and the UL PRB with the highest frequency in the second uplink slot in the uplink subframe. The mobile station device 5 transmits a signal using only the resource of the PUSCH when the PUSCH and the PUCCH are set not to be simultaneously transmitted or when the resource of the PUCCH and the resource of the PUSCH are assigned to the same uplink subframe. The mobile station device 5 can transmit a signal basically using both of the resource of the PUCCH and the resource of the PUSCH when the PUSCH and the PUCCH are set to be simultaneously transmitted or when the resource of the PUCCH and the resource of the PUSCH are assigned to the same uplink subframe.

The UL RS is a signal used for the uplink pilot channel. The UL RS is configured by a Demodulation Reference Signal (DM RS) that is used to estimate a change in channel of the PUSCH of the RRH 4 and the PUCCH and a Sounding Reference Signal (SRS) that is used to estimate channel quality for frequency scheduling and adaptive modulation of the base station device 3 or the RRH 4 and estimate synchronization deviation between the mobile station device 5 and the base station device 3 or the RRH 4. To simplify the description, the SRS is not illustrated in FIG. 14. The DM RS is mapped to different SC-FDMA symbols depending on a case in which the DM RS is mapped in the same UL PRB as the PUSCH and a case in which the DM RS is mapped in the same UL PRB as the PUCCH. The DM RS is a signal used to estimate the change in the channel of the PUSCH and the PUCCH and known in the communication system 1.

The DM RS is mapped to the fourth SC-FDMA symbol in the uplink slot when the DM RS is mapped in the same UL PRB as the PUSCH. The DM RS is mapped to the third, fourth, and fifth SC-FDMA symbols in the uplink slot when the DM RS is mapped in the same UL PRB as the PUCCH including the ACK/NACK. The DM RS is mapped in the third, fourth, and fifth SC-FDMA symbols in the uplink slot when the DM RS is mapped in the same UL PRB as the PUCCH including the SR. The DM RS is mapped in the second and sixth SC-FDMA symbols in the uplink slot when the DM RS is mapped in the same UL PRB as the PUCCH including the CQI.

The SRS is mapped in the UL PRB determined by the base station device 3 and is mapped to the fourteenth SC-FDMA symbol (the seventh SC-FDMA symbol of the second uplink slot of the uplink subframe) in the uplink subframe. The SRS can be mapped only in the uplink subframe (investigation reference signal subframe: referred to as an SRS subframe) of a period determined by the base station device 3 in the cell. In the SRS subframe, the base station device 3 assigns the period at which the SRS is transmitted and the UL PRB assigned to the SRS to each mobile station device 5.

FIG. 14 illustrates a case in which the PUCCH is mapped to the UL PRB at the outermost end of the frequency domain of the uplink system band. However, for example, the second or third UL PRB from the end of the uplink system band may be used for the PUCCH.

In the PUCCH, code multiplexing is used in the frequency domain and code multiplexing is used in the time domain. For the code multiplexing in the frequency domain, each code of the code sequence is processed by multiplying a modulated signal modulated from the uplink control information in units of subcarriers. For the code multiplexing in the time domain, each code of the code sequence is processed by multiplying a modulated signal modulated from the uplink control information in units of SC-FDMA symbols. The plurality of PUCCHs are mapped to the same UL PRB, different codes are assigned for the respective PUCCHs, and the code multiplexing is realized in the frequency domain or the time domain by the assigned codes. In the PUCCH (referred to as a PUCCH format 1a or a PUCCH format 1b) used to transmit the ACK/NACK, the code multiplexing in the frequency domain and the time domain is used. In the PUCCH (referred to as a PUCCH format 1) used to transmit the SR, the code multiplexing in the frequency domain and the time domain is used. In the PUCCH (referred to as a PUCCH format 2, a PUCCH format 2a, or a PUCCH format 2b) used to transmit the CQI, the code multiplexing in the frequency domain is used. To simplify the description, the description of the content related to the code multiplexing of the PUCCH will be appropriately omitted.

In the time domain, the resource of the PUSCH is mapped to the uplink subframe subsequent by a predetermined number (for example, 4) to the downlink subframe in which the resource of the PDCCH including the uplink grant used to assign the resource of the PUSCH is mapped.

In the time domain, the resource of the PDSCH is mapped to the same downlink subframe as the downlink subframe in which the resource of the PDCCH including the downlink assignment used to assign the resource of the PDSCH is mapped.

<Configuration of First PDCCH>

The first PDCCH is configured by a plurality of Control Channel Elements (CCEs). The number of CCEs used for each downlink system band depends on the number of downlink reference signals of the downlink pilot channels according to the number of transmit antennas of the base station device 3 (or the RRH 4) used for communication, the downlink system bandwidth, and the number of OFDM symbols configuring the first PDCCH. The CCE is configured by the plurality of downlink resource elements, as will be described below.

Figure 15:
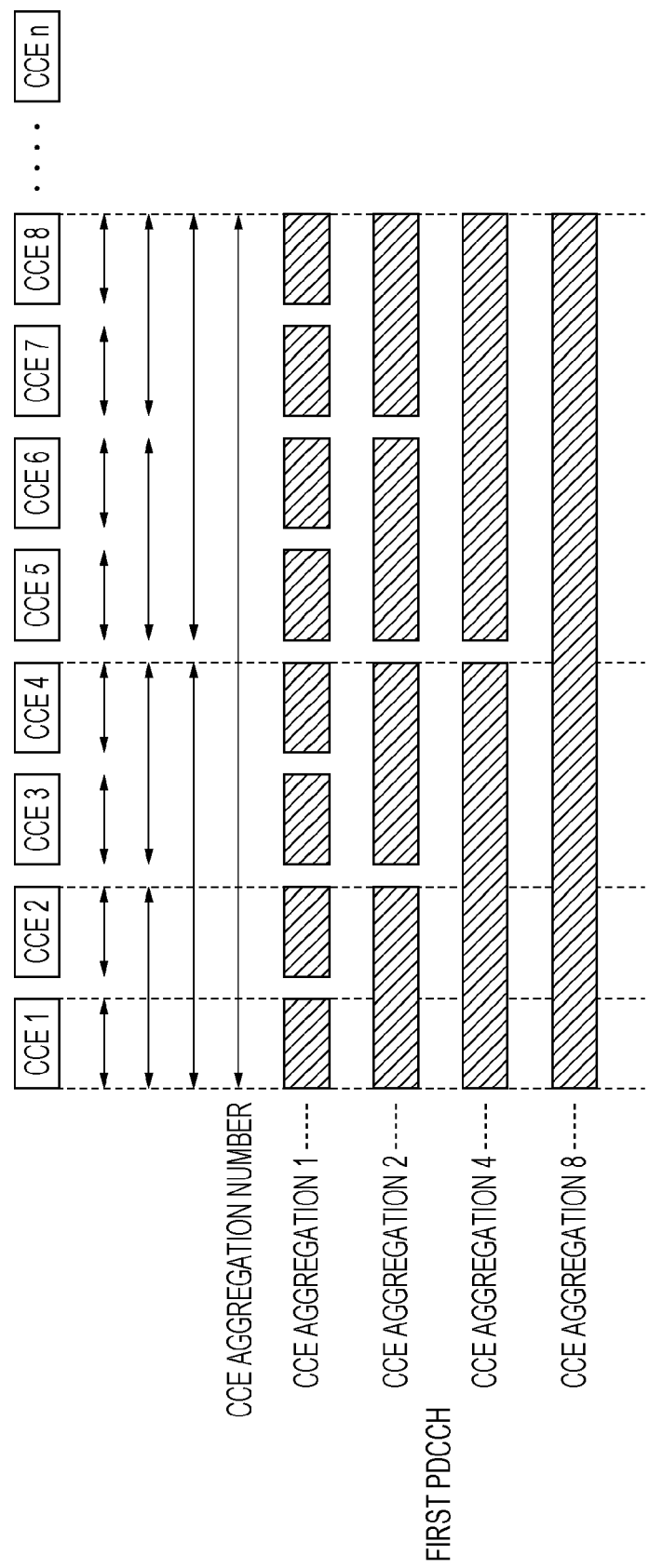
FIG. 15 is a diagram for describing a logical relation between a first PDCCH and a CCE of the communication system 1 according to the embodiment of the present invention.

FIG. 15 is a diagram for describing a logical relation between the first PDCCH and the CCE of the communication system 1 according to the embodiment of the present invention. Numbers used to identify the CCE are given to the CCEs used between the base station device 3 (or the RRH 4) and the mobile station device 5. The numbering of the CCEs is performed on the basis of a rule decided in advance. Here, a CCE t represents the CCE with a CCE number t. The first PDCCH is configured by an aggregation of a plurality of CCEs (eCCE aggregation). The number of CCEs configuring the aggregation is referred to as a "CCE aggregation number" below. The CCE aggregation number configuring the first PDCCH is set in the base station device 3 according to a coding rate set in the first PDCCH and the number of bits of the DCI included in the first PDCCH. Further, an aggregation configured by n CCEs is referred to as a "CCE aggregation n" below.

For example, the base station device 3 configures the first PDCCH using one CCE (CCE aggregation 1), configures the first PDCCH using two CCEs (CCE aggregation 2), configures the first PDCCH using four CCEs (CCE aggregation 4), and configures the first PDCCH using eight CCEs (CCE aggregation 8). For example, the base station device 3 uses the CCE aggregation number in which the number of CCEs configuring the first PDCCH is small in regard to the mobile station device 3 with good channel quality and uses the CCE aggregation number in which the number of CCEs configuring the first PDCCH is large in regard to the mobile station device 3 with poor channel quality. For example, when the base station device 3 transmits the DCI in which the number of bits is small, the CCE aggregation number in which the number of CCEs configuring the first PDCCH is small is used. When the base station device 3 transmits the DCI in which the number of bits is large, the CCE aggregation number in which the number of CCEs configuring the first PDCCH is large is used.

In FIG. 15, first PDCCH candidates are indicated by oblique lines. The first PDCCH candidates (PDCCH candidates) are targets on which the mobile station device 5 performs decoding and detection of the first PDCCH. The first PDCCH candidates are configured independently for each CCE aggregation number. The first PDCCH candidates configured for each CCE aggregation number are each configured by one or more different CCEs. The number of first PDCCH candidates is set independently for each CCE aggregation number. The first PDCCH candidates configured for each CCE aggregation number are configured by the CCEs with continuous numbers. The mobile station device 5 performs the decoding and detection of the first PDCCH on the number of first PDCCH candidates set for each CCE aggregation number. When the mobile station device 5 determines to detect the first PDCCH destined for the self-mobile station device, the decoding and detection of the first PDCCH may not be performed on some of the set first PDCCH candidates (may be stopped).

Figure 16:
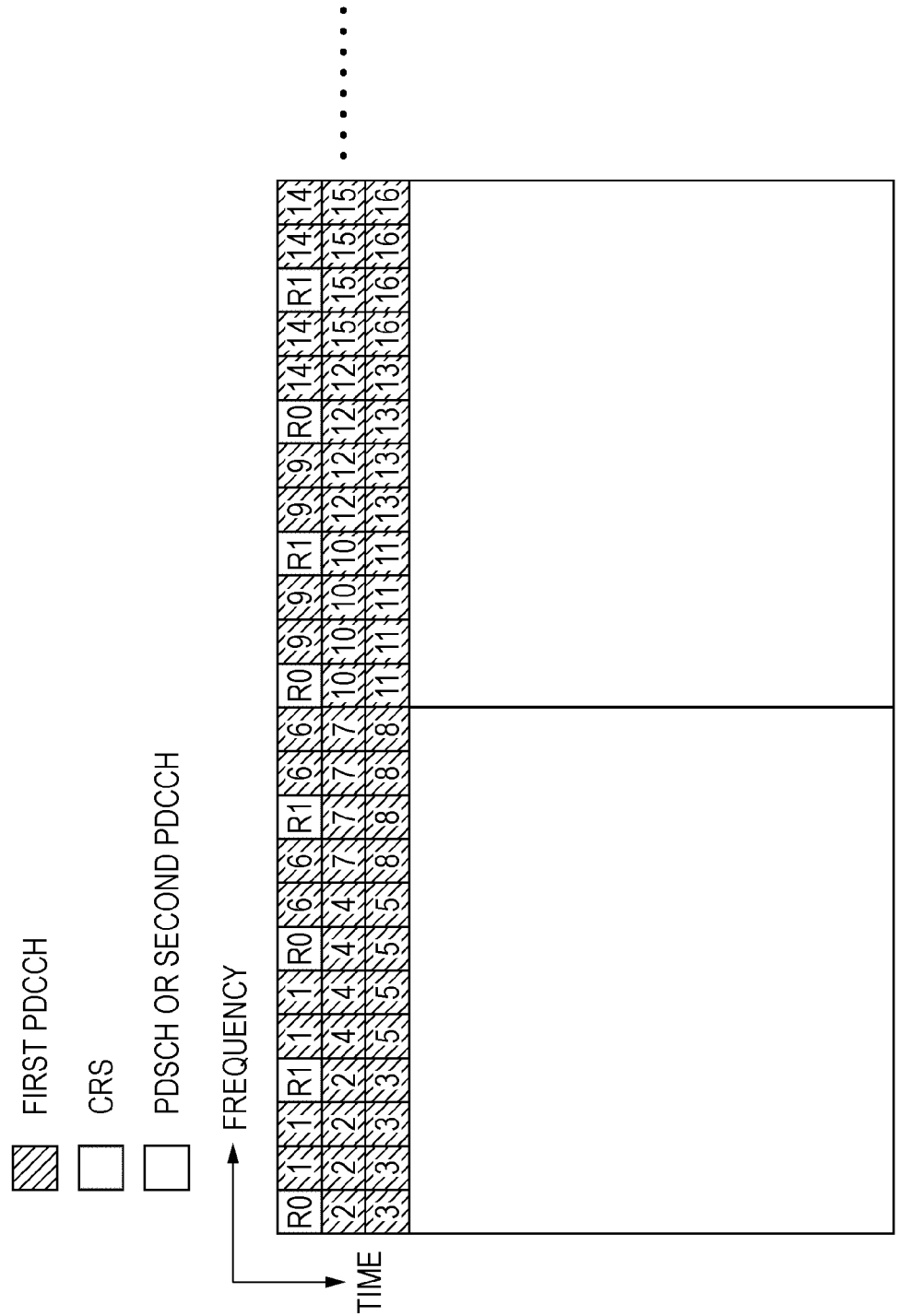
FIG. 16 is a diagram illustrating a mapping example of a resource element group in a downlink radio network frame of the communication system 1 according to the embodiment of the present invention.

The plurality of downlink resource elements configuring the CCE configures a plurality of resource element groups (also referred to as REGs or mini-CCEs). The resource element group is formed by the plurality of downlink resource elements. For example, one resource element group is formed by four downlink resource elements. FIG. 16 is a diagram illustrating a mapping example of the resource element group in a downlink radio network frame of the communication system 1 according to the embodiment of the present invention. Here, the portions (the PDSCH, the second PDCCH, the UE-specific RS, and the CSI-RS) not related to the resource element group used in the first PDCCH are not illustrated and will not be described. Here, a case will be described in which the first PDCCH is configured by the first to third OFDM symbols and downlink reference signals (R0 and R1) corresponding to the CRS of two transmit antennas (antenna ports 0 and 1) are mapped. In the drawing, the vertical axis represents the frequency domain and the horizontal axis represents the time domain.

In a mapping example of FIG. 16, one resource element group is configured by four adjacent downlink resource elements of the frequency domain. In FIG. 16, it is indicated that the downlink resource elements to which the same code of the first PDCCH is appended belong to the same resource element group. Further, resource elements R0 (downlink reference signals of the antenna port 0) and resource elements R1 (downlink reference signals of the antenna port 1) in which the downlink reference signals are mapped scatter to form the resource element group. In FIG. 16, it is indicated that numbering (code "1") is performed from the resource element group of the first OFDM symbol having the lowest frequency, numbering (code "2") is performed on the resource element group of the second OFDM symbol having the next lowest frequency, and numbering (code "3") is performed on the resource element group of the third OFDM symbol having the further next lowest frequency. In FIG. 16, it is indicated that numbering (code "4") is performed subsequently on the resource element group adjacent at frequency to the resource element group on which the numbering (code "2") of the second OFDM symbol in which the downlink reference signal is not mapped is performed, and then numbering (code "5") is performed subsequently on the resource element group adjacent at frequency to the resource element group on which the numbering (code "3") of the third OFDM symbol in which the downlink reference signal is not mapped is performed. In FIG. 16, it is further indicated that numbering (code "6") is performed subsequently on the resource element group adjacent at frequency to the resource element group on which the numbering (code "1") of the first OFDM symbol is performed, numbering (code "7") is performed subsequently on the resource element group adjacent at frequency to the resource element group on which the numbering (code "4") of the second OFDM symbol is performed, and numbering (code "8") is performed subsequently on the resource element group adjacent at frequency to the resource element group on which the numbering (code "5") of the third OFDM symbol is performed. The same numbering is also performed on the subsequent resource element groups.

The CCE is configured by the plurality of resource element groups illustrated in FIG. 16. For example, one CCE is configured by nine different resource element groups dispersed in the frequency domain and the time domain. Specifically, for the CCE used for the first PDCCH, as illustrated in FIG. 16, interleaving is performed on all of the numbered resource element groups in units of the resource element groups using block interleaving bars in all of the downlink system bands, so that one CCE is configured by nine resource element groups with the continuous numbers after the interleaving.

<Configuration of Second PDCCH>

Figure 17:
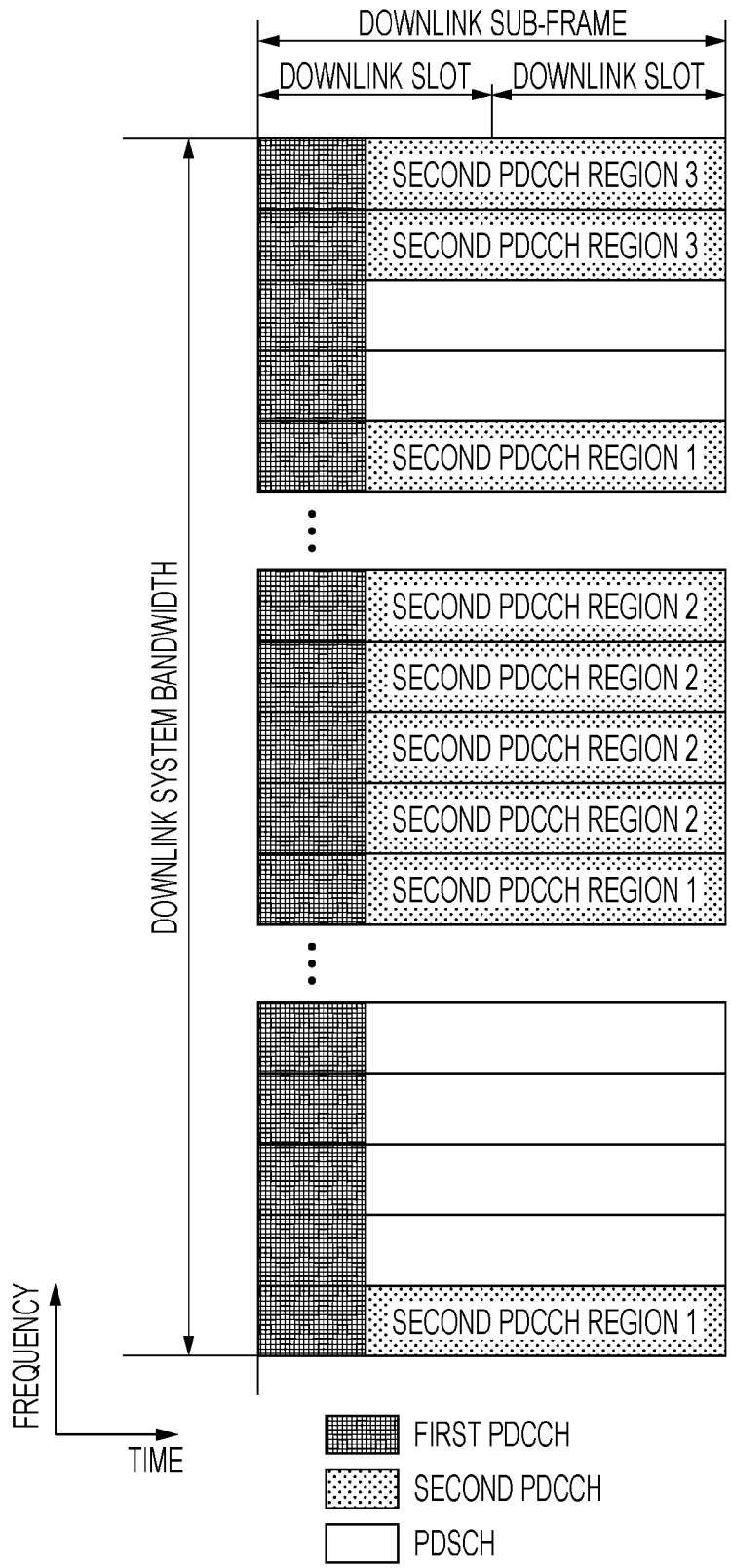
FIG. 17 is a diagram illustrating an example of the overall configurations of the regions in which there is a probability of the second PDCCH being mapped in the communication system 1 according to the embodiment of the present invention.

FIG. 17 is a diagram illustrating an example of the overall configurations of the regions (referred to as second PDCCH regions below to simplify the description) in which there is a probability of the second PDCCH being mapped in the communication system 1 according to the embodiment of the present invention. The base station device 3 can configure (set or map) a plurality of second PDCCH regions (second PDCCH region 1, second PDCCH region 2, and second PDCCH region 3) in the downlink system band. One second PDCCH region is configured by one or more DL PRB pairs. When one second PDCCH region is configured by the plurality of DL PRB pairs, the second PDCCH region may be configured by the DL PRB pairs dispersed in the frequency domain or may be configured by the DL PRB pairs that continue in the frequency domain. For example, the base station device 3 can configure the second PDCCH region at intervals of the plurality of mobile station devices 5.

For the respective second PDCCH regions, different transmission methods are set in signals to be mapped. For example, for the certain second PDCCH region, the precoding process is applied to the signal to be mapped. For example, for the certain second PDCCH region, the precoding process is not applied to the signal mapped. In the second PDCCH regions for which the precoding process is applied to the signals to be mapped, the same precoding process can be applied to the second PDCCH and the UE-specific RS in the DL PRB pair. In the second PDCCH regions for which the precoding process is applied to the signals to be mapped, different precoding processes (precoding vectors to be applied are different) (precoding matrixes to be applied are different) may be applied between the different DL PRB pairs as the precoding processes applied to the second PDCCH and the UE-specific RS.

Figure 18:
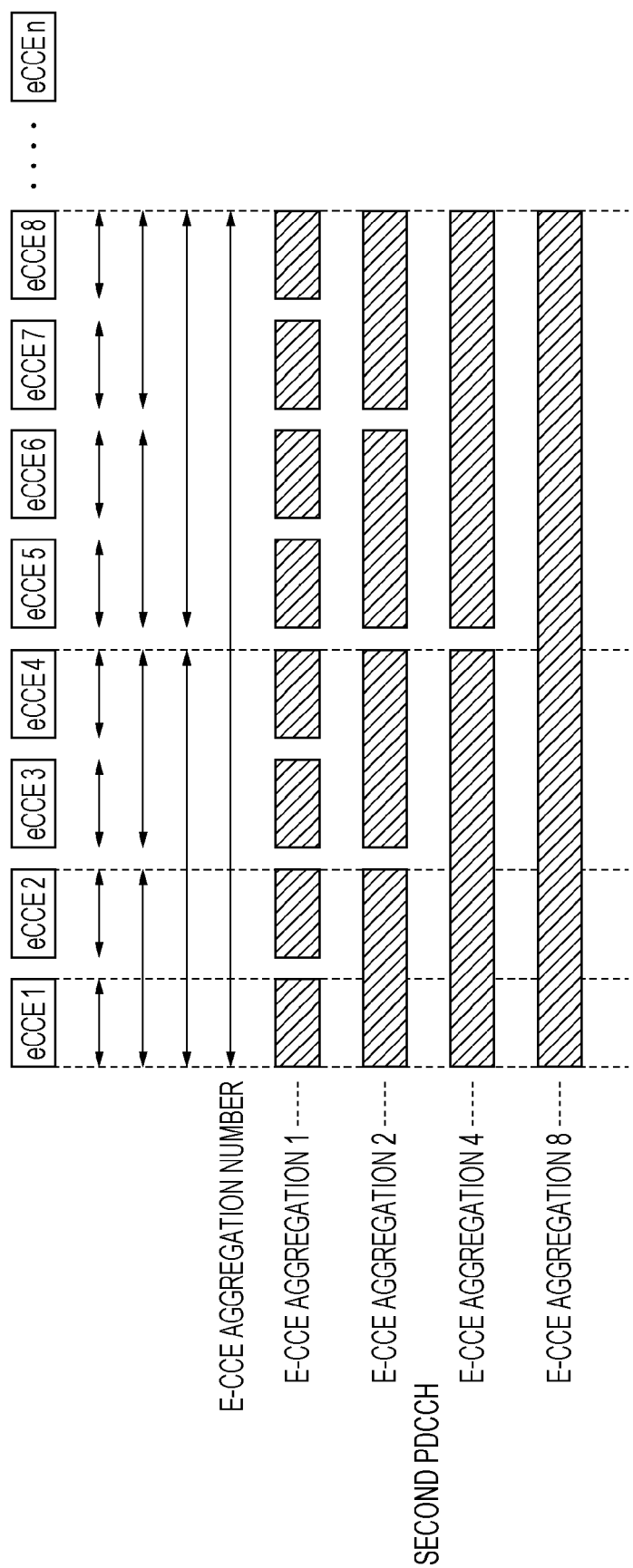
FIG. 18 is a diagram for describing a logical relation between the second PDCCH and eCCEs of the communication system 1 according to the embodiment of the present invention.

One second PDCCH is configured by one or more eCCEs (first components). FIG. 18 is a diagram for describing a logical relation between the second PDCCH and the eCCEs of the communication system 1 according to the embodiment of the present invention. A number used to identify the eCCE is given to the eCCE used between the base station device 3 (or the RRH 4) and the mobile station device 5. The numbering of the eCCE is performed on the basis of a rule decided in advance. Here, an eCCE t represents the eCCE with an eCCE number t. The second PDCCH is configured by an aggregation of a plurality of eCCEs (eCCE aggregation). The number of eCCEs configuring the aggregation is referred to as an "eCCE aggregation number" below. The eCCE aggregation number configuring the second PDCCH is set in the base station device 3 according to a coding rate set in the second PDCCH and the number of bits of the DCI included in the second PDCCH. Further, an aggregation configured by n eCCEs is referred to as an "eCCE aggregation n" below.

For example, the base station device 3 configures the second PDCCH using one eCCE (eCCE aggregation 1), configures the second PDCCH using two eCCEs (eCCE aggregation 2), configures the second PDCCH using four eCCEs (eCCE aggregation 4), and configures the second PDCCH using eight eCCEs (eCCE aggregation 8). For example, the base station device 3 uses the eCCE aggregation number in which the number of eCCEs configuring the second PDCCH is small in regard to the mobile station device 3 with good channel quality and uses the eCCE aggregation number in which the number of eCCEs configuring the second PDCCH is large in regard to the mobile station device 3 with bad channel quality. For example, when the base station device 3 transmits the DCI in which the number of bits is small, the eCCE aggregation number in which the number of eCCEs configuring the second PDCCH is small is used. When the base station device 3 transmits the DCI in which the number of bits is large, the eCCE aggregation number in which the number of eCCEs configuring the second PDCCH is large is used.

In FIG. 18, second PDCCH candidates are indicated by oblique lines. The second PDCCH candidates (ePDCCH candidates) are targets on which the mobile station device 5 performs decoding and detection of the second PDCCH. The second PDCCH candidates are configured independently for each eCCE aggregation number. The second PDCCH candidates configured for each eCCE aggregation number are each configured by one or more different eCCEs. The number of second PDCCH candidates is set independently for each eCCE aggregation number. The second PDCCH candidates configured for each eCCE aggregation number are configured by the eCCEs of which numbers continue or numbers do not continue. The mobile station device 5 performs the decoding and detection of the second PDCCH on the number of second PDCCH candidates set for each eCCE aggregation number. When the mobile station device 5 determines to detect the second PDCCH destined for the self-mobile station device, the decoding and detection of the second PDCCH may not be performed on some of the set second PDCCH candidates (may be stopped).

The number of eCCEs configured in the second PDCCH region depends on the number of DL PRB pairs configuring the second PDCCH region. For example, an amount (the number of resource elements) of resource to which one eCCE corresponds is approximately equivalent to an amount in which the resources (excluding the downlink reference signal and the resource elements used for the first PDCCH) available for the signals of the second PDCCH in one DL PRB pair are divided into four resources. One second PDCCH region may be configured by only one slot of the subframe of the downlink and may be configured by the plurality of PRBs. The second PDCCH region may be configured independently in each of the first and second slots in the downlink subframe. In the embodiment of the present invention, the case in which the second PDCCH region is configured by the plurality of DL PRB pairs in the downlink subframe has been mainly described to simplify the description, but the present invention is not limited to this case.

Figure 19:
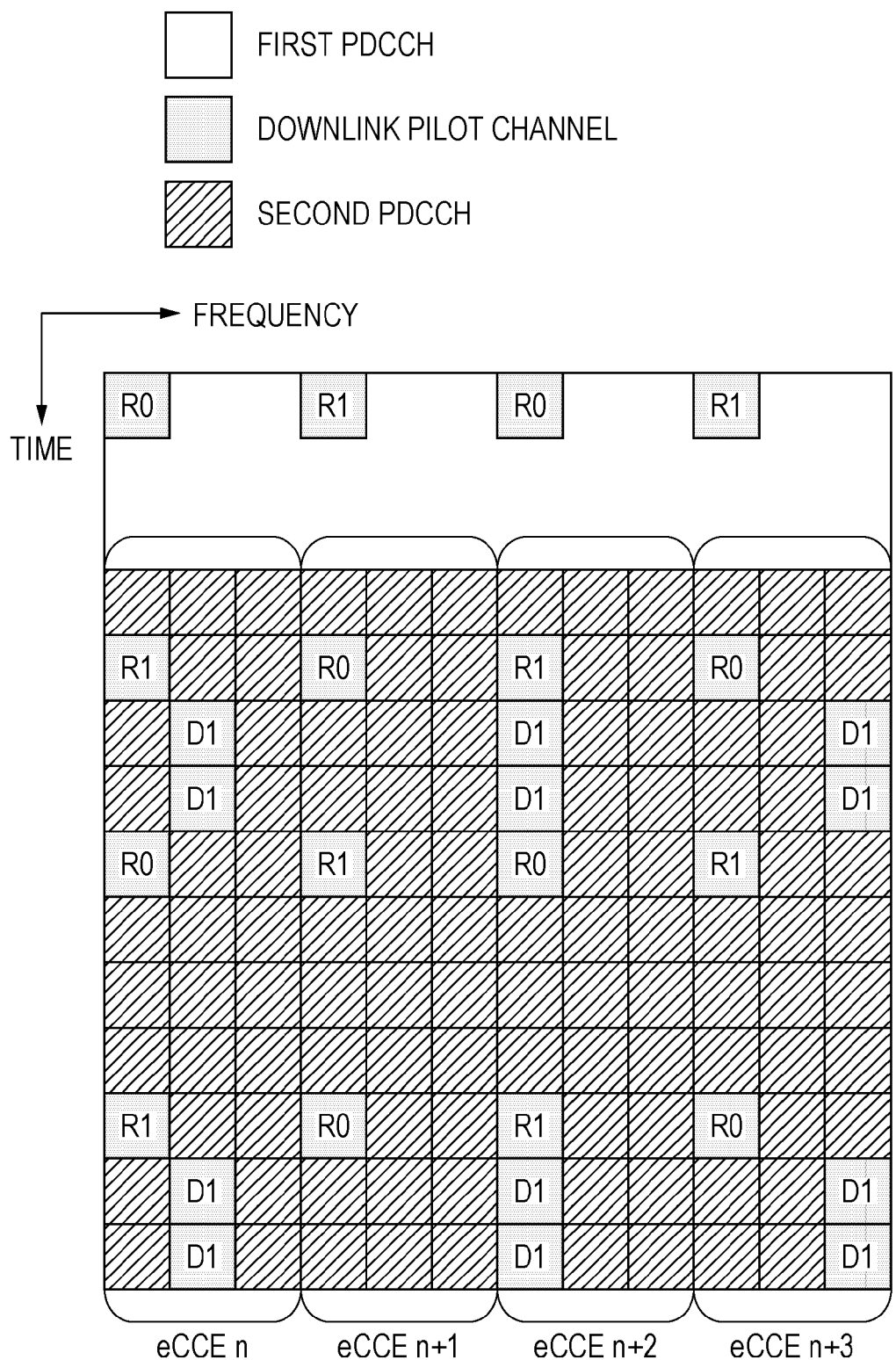
FIG. 19 is a diagram illustrating an example of the configuration of the eCCEs according to the embodiment of the present invention.

FIG. 19 is a diagram illustrating an example of the configuration of the eCCEs according to the embodiment of the present invention. Here, the resources configuring the eCCE are indicated and the unrelated portions (the PDSCH and the first PDCCH) are not illustrated and will not be described. Here, one DL PRB pair is indicated. Here, a case is indicated in which the second PDCCH is configured by the fourth to fourteenth OFDM symbols of the first slot of the downlink subframe, and the CRSs (R0 and R1) for two transmit antennas (the antenna ports 0 and 1) and the UE-specific RS (D1) for one or two transmit antennas (the antenna ports 7 and 8 are not illustrated) (or the antenna ports 107 and 108 are not illustrated) are mapped. In the drawing, the vertical axis represents the frequency domain and the horizontal axis represents the time domain. The four resources divided from the resource available for the signal of the second PDCCH in the DL PRB pair are configured as one eCCE. For example, the four resources divided from the resource of the DL PRB pair in the frequency domain are configured as one eCCE. Specifically, the resources divided at intervals of three subcarriers in the DL PRB pair are configured as one eCCE. For example, for the eCCEs in the DL PRB pair, numbering is performed in ascending order from the eCCE including the low subcarrier in the frequency domain.

Figure 20:
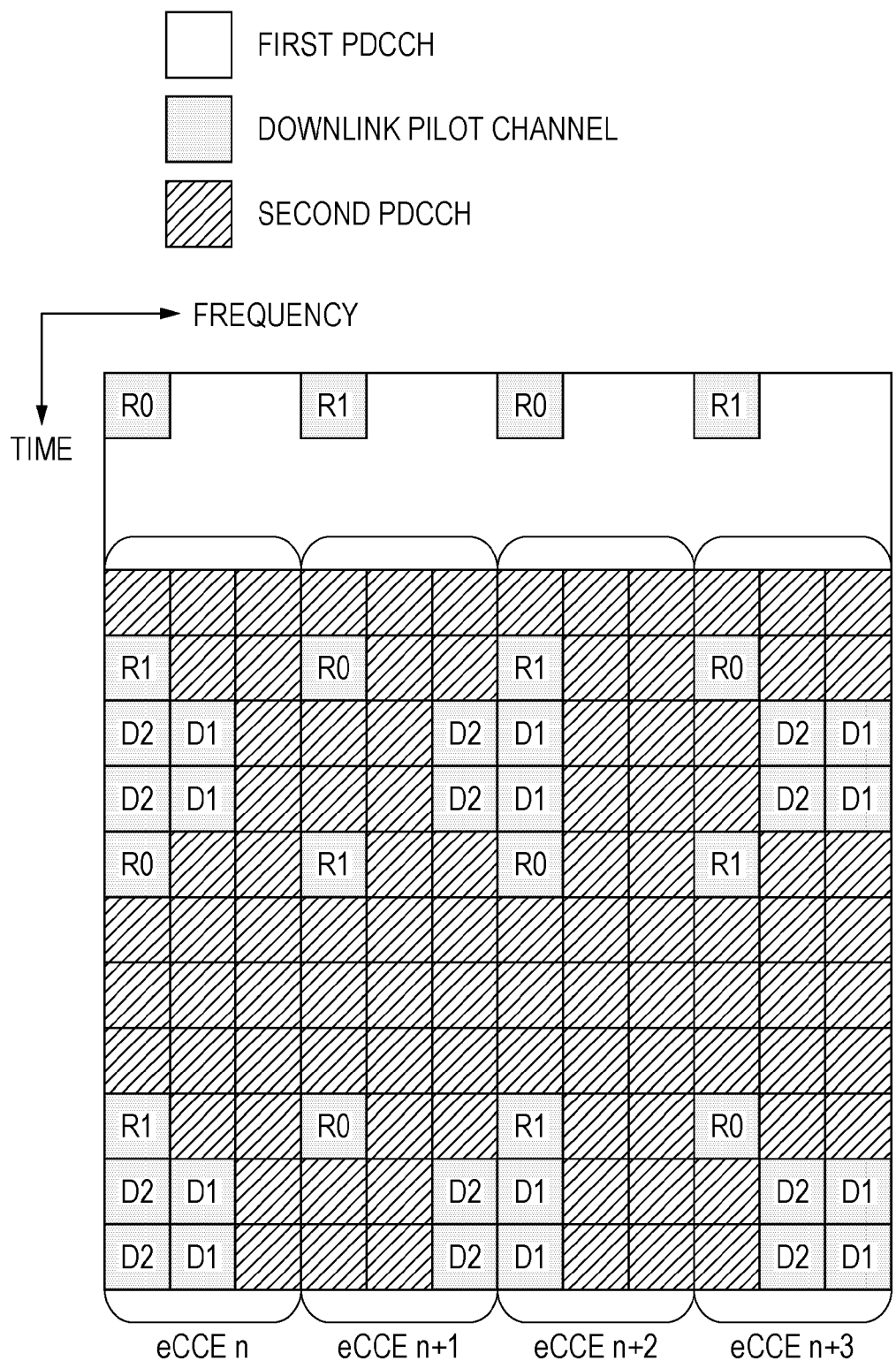
FIG. 20 is a diagram illustrating an example of the configuration of the eCCEs according to the embodiment of the present invention.

FIG. 20 is a diagram illustrating an example of the configuration of the eCCEs according to the embodiment of the present invention. Compared to the example illustrated in FIG. 19, the number of antenna ports of the UE-specific RS is different. A case is indicated in which the UE-specific RS (D1 and D2) for three or four transmit antennas (the antenna ports 7, 8, 9, and 10 are not illustrated) (or the antenna ports 107, 108, 109, and 110 are not illustrated) are mapped.

Different types of physical resource mapping (first physical resource mapping and second physical resource mapping) are applied to the second PDCCH regions. Specifically, the configurations (aggregation methods) of the eCCEs configuring one second PDCCH are different. For example, the second PDCCH to which the first physical resource mapping is applied is referred to as localized ePDCCH. For example, the second PDCCH to which the second physical resource mapping is applied is referred to as distributed ePDCCH. For example, the localized ePDCCH is configured by one eCCE (eCCE aggregation 1), is configured by two eCCEs (eCCE aggregation 2), or is configured by four eCCEs (eCCE aggregation 4). The localized ePDCCH of which the eCCE aggregation number is equal to or greater than 2 is configured by a plurality of eCCEs of which the eCCE numbers continue (continue in the frequency domain). For example, the distributed ePDCCH is configured by four eCCEs (eCCE aggregation 4) or is configured by eight eCCEs (eCCE aggregation 8). The distributed ePDCCH is configured by a plurality of eCCEs of which eCCE numbers do not continue (do not continue in the frequency domain). For example, four eCCEs configuring the distributed ePDCCH of the eCCE aggregation 4 are configured by the eCCEs in the mutually different DL PRB pairs. The eight eCCEs configuring the distributed ePDCCH of the eCCE aggregation 8 may be configured by the eCCEs in the mutually different DL PRB pairs or some of the plurality of eCCEs may be configured by the eCCEs in the same DL PRB pairs. For example, the plurality of eCCEs used for one localized ePDCCH are configured by the eCCEs in one DL PRB pair and the plurality of eCCEs used for one distributed ePDCCH are configured by the eCCEs in the plurality of DL PRB pairs.

Figure 22:
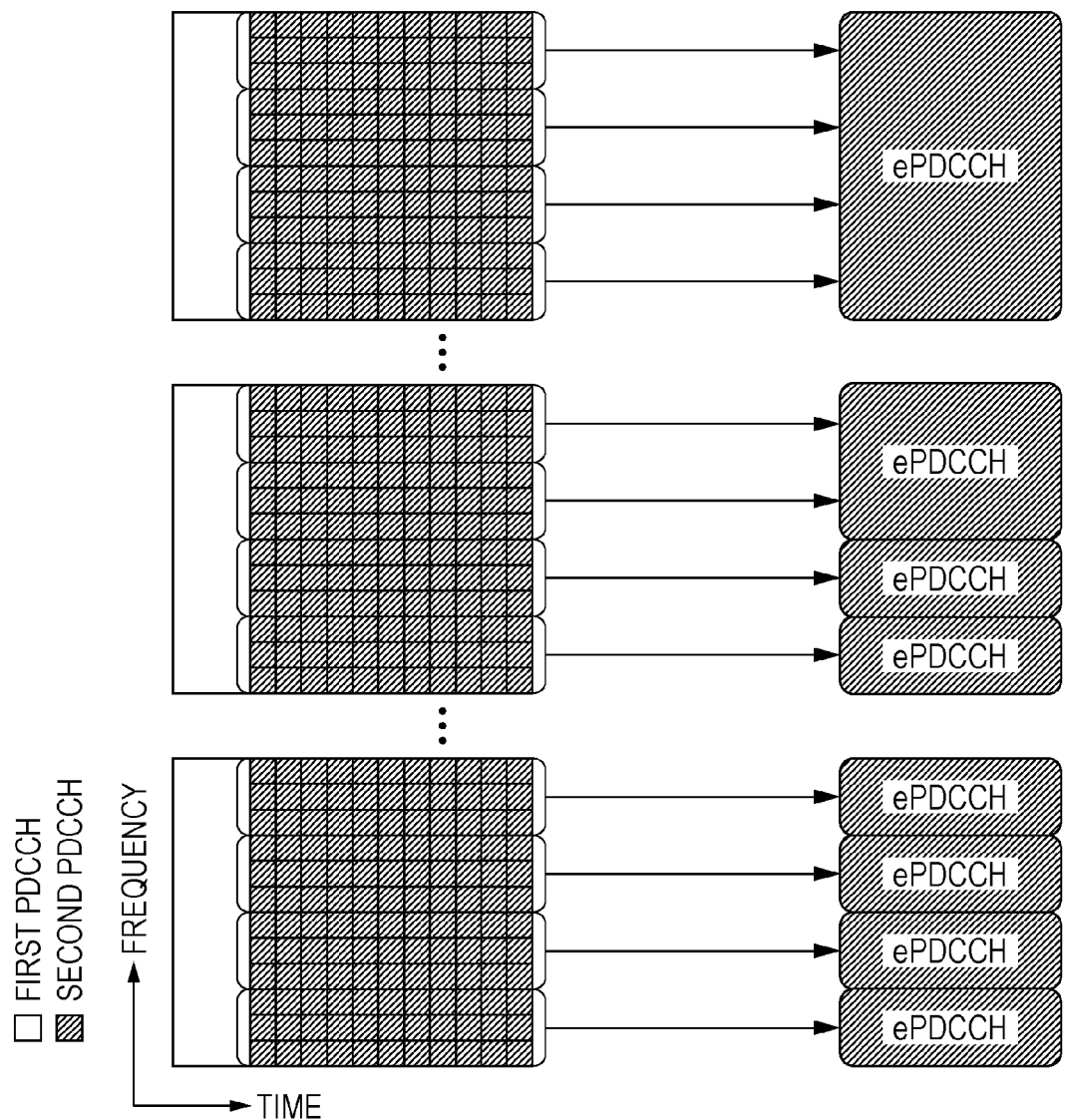
FIG. 22 is a diagram illustrating an example of the configurations of the eCCEs and localized ePDCCHs.

FIG. 22 is a diagram illustrating an example of the configurations of the eCCEs and localized ePDCCHs. Here, a case is indicated in which the second PDCCH is configured by the fourth to fourteenth OFDM symbols of the downlink subframe. In the drawing, the vertical axis represents the frequency domain and the horizontal axis represents the time domain. For example, the localized ePDCCH of the eCCE aggregation 2 is configured by two eCCEs from a small number (a small number in the frequency domain) of the eCCE in a certain DL PRB pair or is configured by two eCCEs from a large number (a large number in the frequency domain) of the eCCE in a certain DL PRB pair. For example, the localized ePDCCH of the eCCE aggregation 4 is configured by four eCCEs in a certain DL PRB pair. For example, in a certain DL PRB pair, a mutually different single eCCE configures a mutually different single localized ePDCCH (eCCE aggregation 1). For example, in a certain DL PRB pair, two eCCEs configure a mutually different single localized ePDCCH (eCCE aggregation 1) and two different eCCEs configure one localized ePDCCH (eCCE aggregation 2).

Figure 23:
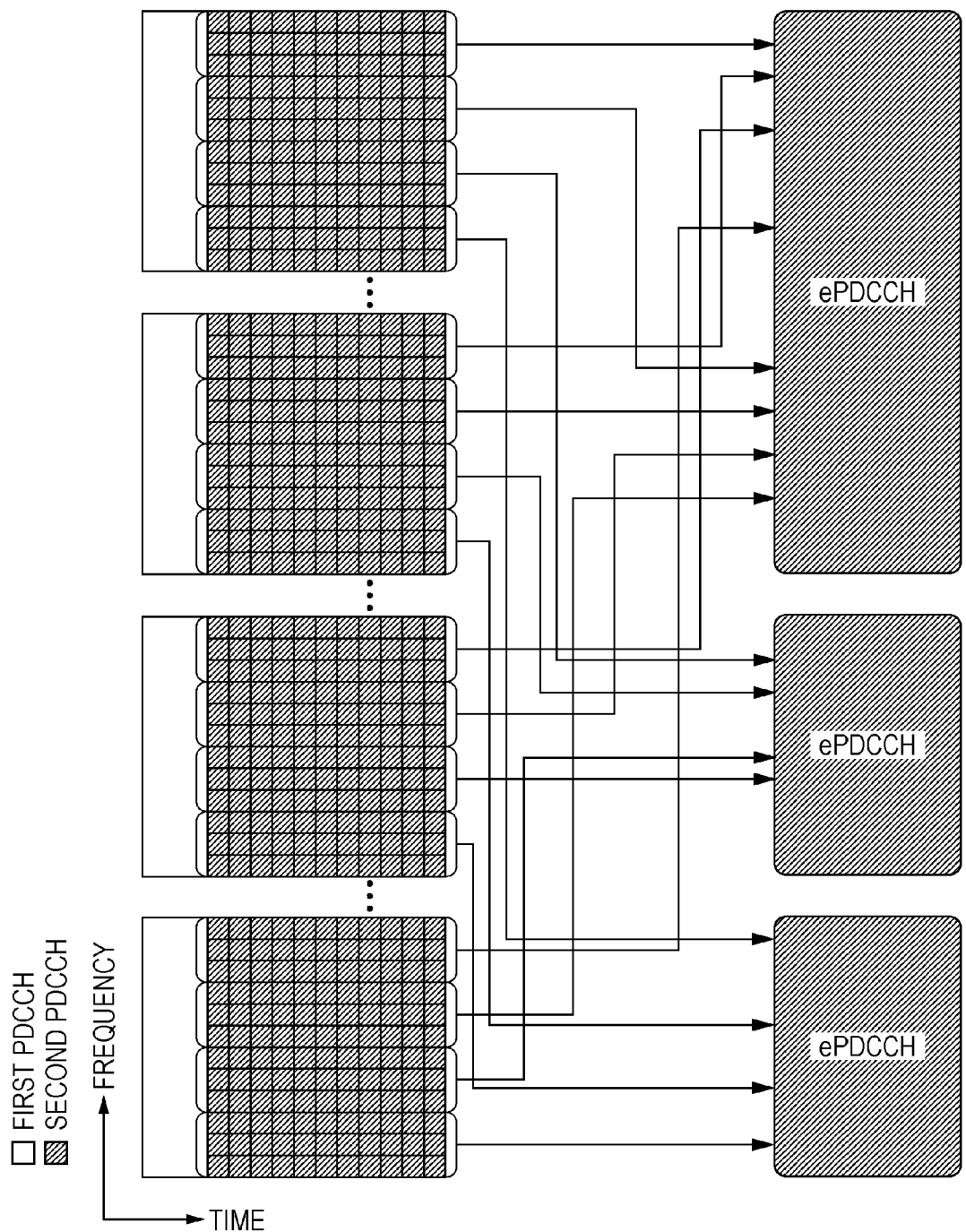
FIG. 23 is a diagram illustrating an example of the configurations of the eCCEs and distributed ePDCCHs.

FIG. 23 is a diagram illustrating an example of the configurations of the eCCEs and distributed ePDCCHs. Here, a case is indicated in which the second PDCCH is configured by the fourth to fourteenth OFDM symbols of the downlink subframe. In the drawing, the vertical axis represents the frequency domain and the horizontal axis represents the time domain. For example, for the distributed ePDCCH of the eCCE aggregation 4, four eCCEs are configured by the eCCEs in the mutually different DL PRB pairs. For example, the distributed ePDCCH of the eCCE aggregation 4 is configured by the eCCEs of which the eCCE numbers are the lowest (lowest in the frequency domain) in the respective DL PRB pairs. For example, the distributed ePDCCH of the eCCE aggregation 4 is configured by the eCCEs of which the eCCE numbers are the second lowest (second lowest in the frequency domain) in the respective DL PRB pairs. For example, the distributed ePDCCH of the eCCE aggregation 8 is configured by the plurality of eCCEs in four DL PRB pairs and is configured by two eCCEs in each DL PRB pair. For example, the distributed ePDCCH of the eCCE aggregation 8 is configured by the eCCEs of which the eCCE numbers are the highest (highest in the frequency domain) and the eCCE numbers are the second highest (second highest in the frequency domain) in the respective DL PRB pairs.

For the eCCEs configuring one distributed ePDCCH in the second physical resource mapping, the distributed ePDCCH may be configured using the eCCEs of which the eCCE numbers are different (frequency positions are different) in the respective DL PRB pairs. For example, one distributed ePDCCH may be configured by the eCCE of which the eCCE number is the lowest (lowest in the frequency domain) in a certain DL PRB pair, the eCCE of which the eCCE number is the second lowest (second lowest in the frequency domain) in a certain DL PRB pair, the eCCE of which the eCCE number is the third lowest (third lowest in the frequency domain) in a certain DL PRB pair, and the eCCE of which the eCCE number is the fourth lowest (fourth lowest in the frequency domain) (the eCCE number is the highest) (highest in the frequency domain) in a certain DL PRB pair.

The present invention can also be applied to a case in which one second PDCCH is configured by one or more DL PRBs. In other words, the present invention can also be applied to a case in which one second PDCCH region is configured by the plurality of DL PRBs of only the first slot of the downlink subframe or a case in which one second PDCCH region is configured by the plurality of DL PRBs of only the second slot of the downlink subframe. In the DL PRB pair configured in the second PDCCH region, all of the resources (the downlink resource elements) excluding the first PDCCH and the downlink reference signals may not be used for the second PDCCH, but signals are not mapped (null) to some of the resources (the downlink resource elements).

Basically, the first physical resource mapping can be applied in the second PDCCH region to which the precoding process is applied, and the second physical resource mapping can be applied in the second PDCCH region to which the precoding process is not applied. Since one ePDCCH is configured by the non-continuous resources in the frequency domain in the second physical resource mapping, advantageous effects of frequency diversity can be obtained.

For the mobile station device 5, one or more second PDCCH regions are configured by the base station device 3. For example, for the mobile station device 5, two second PDCCH regions, that is, the second PDCCH region to which the first physical resource mapping is applied and the precoding process is applied and the second PDCCH region to which the second physical resource mapping is applied and the precoding process is not applied, are configured. For example, for the mobile station device 5, only the second PDCCH region to which the second physical resource mapping is applied and the precoding process is not applied is configured. The mobile station device 5 is designated (set or configured) so as to perform a process (monitoring) of detecting the second PDCCH in the second PDCCH region configured by the base station device 3. By configuring the second PDCCH region in the mobile station device 5, the monitoring of the second PDCCH may be designated automatically (implicitly). Alternatively, the monitoring of the second PDCCH may be performed by signaling different from signaling indicating the configuration of the second PDCCH region. For the plurality of mobile station devices 5, the same second PDCCH region can be designated by the base station device 3.

Information indicating the configuration (designation or setting) of the second PDCCH region is exchanged between the base station device 3 and the mobile station device 5 before the communication using the second PDCCH starts. For example, the information is exchanged using Radio Resource Control (RRC) signaling. Specifically, the mobile station device 5 receives information indicating the position (assignment) of the DL PRB pair of the second PDCCH region from the base station device 3. For each of the second PDCCH regions, the base station device 3 notifies the mobile station device 5 of information indicating a type of physical resource mapping (the first physical resource mapping or the second physical resource mapping) of the second PDCCH. The base station device 3 may explicitly notify the mobile station device 5 of another piece of information rather than the information indicating the type of physical resource mapping of the second PDCCH, so that the mobile station device 5 implicitly recognizes the type of physical resource mapping of the second PDCCH on the basis of the information. For example, when the base station device 3 notifies the mobile station device 5 of information indicating a method of transmitting the second PDCCH in each second PDCCH region and a transmission method to which the precoding process is applied is indicated, the mobile station device 5 recognizes that the physical resource mapping of the second PDCCH region is the first physical resource mapping. When a transmission method to which the precoding process is not applied is indicated, the mobile station device 5 recognizes that the physical resource mapping of the second PDCCH region is the second physical resource mapping. Only when any of the physical resource mappings of the second PDCCH is set by default in the second PDCCH region in advance and the physical resource mapping different from the setting is used, the base station device 3 may notify the mobile station device 5 of information indicating this fact. The mobile station device 5 performs a process of demodulating the signal of the second PDCCH using the UE-specific RS received in the second PDCCH region set by the base station device 3 and detecting the second PDCCH destined for the self-mobile station device. For example, the mobile station device 5 performs the process of demodulating the signal of the second PDCCH using the UE-specific RS in the DL PRB pair to which the resources subjected to the demodulation belong.

In the mobile station device 5, candidates (a combination of candidates) (a set of candidates) of the eCCE aggregation number for the localized ePDCCH may be set (configured) in the second PDCCH region to which the first physical resource mapping is applied by the base station device 3. For example, in the mobile station device 5, the eCCE aggregation 1, the eCCE aggregation 2, and the eCCE aggregation 4 may be set as the candidates of the eCCE aggregation number for the localized ePDCCH in the second PDCCH region to which the first physical resource mapping is applied. For example, in the certain mobile station device 5, the eCCE aggregation 2 and the eCCE aggregation 4 may be set as the candidates of the eCCE aggregation number for the localized ePDCCH in the second PDCCH region to which the first physical resource mapping is applied.

Each eREG (or eCCE) in the DL PRB pair can be transmitted from each different antenna port on the basis of a correspondence relation between each eREG (or eCCE) in the DL PRB pair and the antenna port (transmit antenna) corresponding to each eREG (or eCCE). Hereinafter, a method of determining the correspondence relation between the eREG (or eCCE) and the antenna port (transmit antenna) corresponding to the eREG (or eCCE) will be described in detail.

Figure 21:
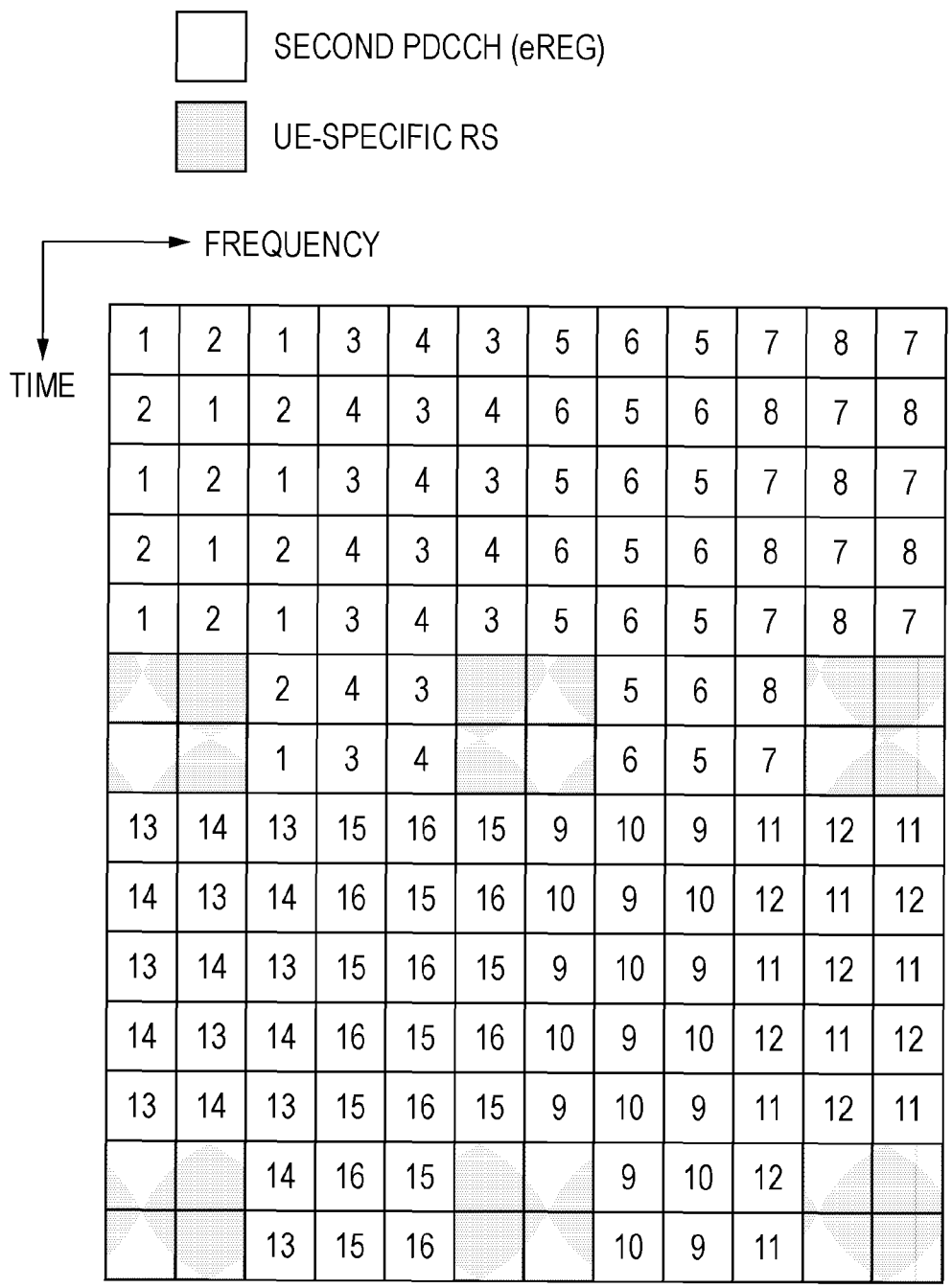
FIG. 21 is a diagram illustrating an example of configuration of eREGs according to the embodiment of the present invention.

In the second PDCCH (in other words, the ePDCCH) region wherein the localized ePDCCH is mapped, as illustrated in FIG. 20, the UE-specific RS (D1 and D2) for four transmit antennas (the antenna ports 107, 108, 109, and 110) can be mapped. A plurality of combinations are used in regard to a combination with the antenna ports corresponding to the eREGs (or the eCCEs) in the DL PRB pair. In each combination, the corresponding antenna port differs for each eREG (or eCCE) in the DL PRB pair. A signal of each eREG (or eCCE) in the DL PRB pair is transmitted from the corresponding antenna port. The antenna port used for the signal of eREG (or eCCE) and the antenna port used to transmit the UE-specific RS are common. For example, when the PRB pair is configured by sixteen eREGs (or eCCEs), one of the four antenna ports can correspond to each eREG. For example, numbers in FIG. 21 represent the eREG numbers. For example, a remainder when a quotient obtained by dividing an eREG number by 2 is divided by 4 (that is, a remainder of (FLOOR (n+2))÷4 or a remainder of (Ceil (n÷2))÷4) can be associated with the antenna port. For example, the eREGs with eREG numbers 1, 2, 9, and 10 can be associated with the antenna port 107, the eREGs with eREG numbers 3, 4, 11, and 12 can be associated with the antenna port 108, the eREGs with eREG numbers 5, 6, 13, and 14 can be associated with the antenna port 109, and the eREGs with eREG numbers 7, 8, 15, and 16 can be associated with the antenna port 110. For example, the eCCE can be considered to be configured by a total of four eREGs which are the eREGs included in the first and second slots. For example, an eCCE m can be configured by a total of four eREGs, the eREGs with eREG numbers 1 and 2 included in the first slot and the eREGs with eREG numbers 9 and 10 included in the second slot. Similarly, for example, an eCCE m+1 can be configured by a total of four eREGs, eREGs with eREG numbers 3 and 4, included in the first slot and the eREGs with eREG numbers 11 and 12 included in the second slot. Similarly, for example, an eCCE m+2 can be configured by a total of four eREGs, eREGs with eREG numbers 5 and 6, included in the first slot and the eREGs with eREG numbers 13 and 14 included in the second slot. Similarly, for example, an eCCE m+3 can be configured by a total of four eREGs, eREGs with eREG numbers 7 and 8, included in the first slot and the eREGs with eREG numbers 15 and 16 included in the second slot. In another example, for example, the eCCE m+1 can be configured by a total of four eREGs, the eREGs with the eREG numbers 3 and 4 included in the first slot and the eREGs with the eREG numbers 13 and 14 included in the second slot. In the foregoing case, for example, the antenna port corresponding to the eCCE may be the antenna port associated with the eREGs configuring the eCCE m, that is, the antenna port 108 corresponding to the eREGs with the eREG numbers 3, 4, 13, and 14. In another example, in the foregoing case, the antenna port corresponding to the eCCE may be the antenna port associated with the eREGs configuring the eCCE m+1, that is, one of the antenna ports 108 and 109 corresponding to the eREGs with the eREG numbers 3, 4, 13, and 14. In this case, the antenna port corresponding to the eCCE may be associated with, for example, the antenna port 108 corresponding to the eREG with the eREG number 3 which is a first small eREG number configuring the eCCE m+1 or may be associated with, for example, the antenna port 109 corresponding to the eREG with the eREG number 14 which is a first large eREG number configuring the eCCE m+1. When the eCCE aggregation n is 2, one antenna port may correspond to a set of two eCCEs. Further, when the eCCE aggregation n is 4, one antenna port may correspond to a set of four eCCEs. Furthermore, when the eCCE aggregation n is 8, one antenna port may correspond to a set (aggregation of eCCEs) of eight eCCEs. One antenna port corresponding to the set of the eCCE described above can be selected from the plurality of antenna ports (for example, the antenna ports 107 and 108 when the eCCE aggregation n is 2 and the eCCE m and the eCCE m+1 described above are included in the set of the eCCEs or the antenna ports 107, 108, 109, and 110 when not only the eCCE aggregation n is 4 in another example and the eCCE m and the eCCE m+1 described above but also the eCCE m+2 and the eCCE m+3 are included in the set of the eCCEs) to which the eCCEs included in the sets of the eCCEs (the aggregations of the eCCEs) correspond. At this time, which antenna port is selected from the plurality of antenna ports depends on a method to be described below. Here, the example in which the eREG numbers are values 1 to 16 in one PRB pair has been described, but values 0 to 15 may also be used. The eREG numbers may also be given throughout the plurality of PRB pairs. For example, in the foregoing example, the eREG numbers included in a certain PRB pair may be values from q to q+15. The configuration of the eREGs illustrated in FIG. 21 is merely an example and other configurations may be used. For example, of 4, 8, 12, and 36, one number of eREGs may be included in one PRB pair. The specific mapping of the eREGs may be different from that of FIG. 21. Here, the example in which four ports, that is, the antenna ports 107, 108, 109, and 110, are typically assigned to the downlink resource elements assigned to the ePDCCH has been described. However, the number of antenna ports assigned to the downlink resource elements assigned to the ePDCCH by the RRC signaling may be notified of and the above-described assignment method may be changed according to the number of antenna ports. For example, when the notified number of antenna ports assigned to the downlink resource elements assigned to the ePDCCH by the RRC signaling is 1, all of the eREG numbers may correspond to the antenna port 107. When the notified number of antenna ports is 2, all of the eREG numbers may correspond to the antenna ports 107 and 109. In another example, a remainder (that is a remainder of n+4) obtained by dividing the eREG number by 4 is associated with the antenna port. For example, the eREGs with eREG numbers 0, 4, 8, and 12 can be associated with the antenna port 107, the eREGs with eREG numbers 1, 5, 9, and 13 can be associated with the antenna port 108, the eREGs with eREG numbers 2, 6, 10, and 14 can be associated with the antenna port 109, and the eREGs with eREG numbers 3, 7, 11, and 15 can be associated with the antenna port 110. Unlike FIG. 21, the example in which the eREG numbers are 0 to 15 is given herein.

Here, it is described how one antenna port corresponding to the set of the eCCEs is selected from the plurality of antenna ports to which the eCCEs included in the set of the eCCEs correspond. For example, two types of combinations (first and second combinations) can be used for the combination of the antenna ports corresponding to the eCCEs in the DL PRB pair. For example, when the eCCE aggregation n is 2 and the eCCE m and the eCCE m+1 described above are included in the set of the eCCEs (aggregation of the eCCEs), the antenna port 107 corresponding to the eCCE m can be selected in the first combination and the antenna port 108 corresponding to the eCCE m+1 can be selected in the second combination. In another example, when the eCCE aggregation n is 4 and the eCCE m, the eCCE m+1, the eCCE m+2, and the eCCE m+3 described above are included in the set of the eCCEs (aggregation of the eCCEs), the antenna port 107 corresponding to the eCCE m can be selected in the first combination and the antenna port 108 corresponding to the eCCE m+1 can be selected in the second combination. In another example, when the eCCE aggregation n is 4 and the eCCE m, the eCCE m+1, the eCCE m+2, and the eCCE m+3 described above are included in the set of the eCCEs (aggregation of the eCCEs), the antenna port 107 corresponding to the eCCE m can be selected in the first combination and the antenna port 109 corresponding to the eCCE m+2 can be selected in the second combination. In another example, when the eCCE aggregation n is 4 and the eCCE m, the eCCE m+1, the eCCE m+2, and the eCCE m+3 described above are included in the set of the eCCEs (aggregation of the eCCEs), the antenna port 107 corresponding to the eCCE m can be selected in the first combination and the antenna port 110 corresponding to the eCCE m+3 can be selected in the second combination. In another example, when the eCCE aggregation n is 4 and the eCCE m, the eCCE m+1, the eCCE m+2, and the eCCE m+3 described above are included in the set of the eCCEs (aggregation of the eCCEs), the antenna port 107 corresponding to the eCCE m can be selected in the first combination and the antenna port 110 corresponding to the eCCE m+3 can be selected in the second combination. Here, the case in which there are the two types of combinations (the first and second combinations) has been described. However, when there are four types of combinations (first, second, third, and fourth combinations) and the eCCE m, the eCCE m+1, the eCCE m+2, and the eCCE m+3 described above are included in the set of the eCCEs (aggregation of the eCCEs), the antenna port 107 corresponding to the eCCE m can be selected in the first combination, the antenna port 108 corresponding to the eCCE m+2 can be selected in the second combination, the antenna port 109 corresponding to the eCCE m+3 can be selected in the third combination, and the antenna port 110 corresponding to the eCCE m+4 can be selected in the fourth combination. In this way, in both of the case in which the eCCE aggregation n is 2 and the case in which the eCCE aggregation n is 4, one antenna port corresponding to the set of the eCCE may be selected on the basis of two types of combinations. When the eCCE aggregation n is 2, one antenna port corresponding to the set of the eCCEs may be selected on the basis of two types of combinations. Further, when the eCCE aggregation n is 4, one antenna port corresponding to the set of the eCCEs may be selected on the basis of four types of combinations. In this way, the antenna port used to transmit the set of the eCCEs may be selected from the plurality of types of combinations.

Here, a method of determining a combination unique to the mobile station device implicitly for each mobile station device from the two types of combinations or the four types of combinations described above will be described. For example, there is a method of implicitly determining a combination unique to the mobile station device for each mobile station device from two types of combinations or four types of combinations according to a C-RNTI to be described. For example, there is a method of selecting two types of combinations according to a remainder (that is, $n_{RNTI}$ mod 2) obtained by dividing $n_{RNTI}$ which is a C-RNTI number assigned to the mobile station device by 2. For example, when $n_{RNTI}$ is 1, the remainder is 1. Thus, the first combination may be used. When $n_{RNTI}$ is 2, the remainder is 0. Thus, the second combination may be used. In another example, when the eCCE aggregation n is 2, the remainder obtained by dividing $n_{RNTI}$ by 2 may be used. When the eCCE aggregation n is 4, the remainder obtained by dividing $n_{RNTI}$ by 4 may be used. The example in which the remainder obtained by dividing $n_{RNTI}$ by 2 or 4 has been described herein, but a remainder obtained by dividing a value, which is obtained by adding a subframe number or a PRB index which is a number assigned to each PRB to $n_{RNTI}$, by 2 or 4 may be used. A remainder obtained by dividing a value, which is obtained by adding the subframe number and a PRB index which is a number assigned to each PRB to $n_{RNTI}$, by 2 or 4 may be used.

A search space in the first PDCCH region (or a search space in the second PDCCH region) is configured by regions in which the combinations of the eCCEs used for each first PDCCH candidate (or each second PDCCH candidate or each ePDCCH candidate) are collected. Expression (1) is an expression that determines the eCCE with the smallest number used for each first PDCCH candidate (or each second PDCCH candidate or each ePDCCH candidate) of each search space.

[Math. 1]

$$L\{(Y_k+m') \bmod \lfloor N_{CCE,k}L \rfloor\} \quad (1)$$

Here, $Y_k$ indicates a natural number generated by a hash function using an identifier (RNTI) assigned to the self-device and/or a subframe number k (which is a natural number taking a value of 0 to 9, k=floor ($n_s/2$)) (and $n_s$ is a slot number (which is a natural number taking a value of 0 to 19 in the radio frame) as an input parameter, and floor is a function rounding up a number of digits after decimal point of $n_s/2$) and m' indicates a first PDCCH candidate number (or a second PDCCH candidate number or an ePDCCH candidate number). Each first PDCCH candidate (or each second PDCCH candidate or each ePDCCH candidate) is subjected to blind decoding using the CCEs (or the eCCEs) continuing by the value of the CCE aggregation n (or the eCCE aggregation n) from the CCE (or the eCCE) with the number determined in Equation (1). Here, L indicates the CCE aggregation n (or the eCCE aggregation n) and $N_{CCE}$ indicates the number of CCEs (or eCCEs) of the first PDCCH (or the second PDCCH). The variable $Y_k$ in the subframe k is defined in Expression (2).

[Math. 2]

$$Y_k = (A \cdot Y_{k-1}) \bmod D \quad (2)$$

Here, for example, $Y_{-1} = n_{RNTI}$, A=39827, and D=65537, and $n_{RNTI}$ indicates a C-RNTI number assigned to the mobile station device. Here, the example in which $Y_k$ is a natural number generated by the hash function using the identifier (RNTI) assigned to the self-device and/or the subframe number k as the input parameters has been described. However, the PRB index which is a number assigned to each PRB may be used instead of the subframe number k.

[Math. 3]

$$L\{(Y_k + m') \bmod \lfloor N_{CCE,k}/L \rfloor\} \bmod 2 \quad (3)$$

As in Expression (3), there is a method of implicitly determining the combination unique to the mobile station device for each mobile station device from the two types of combinations or the four types of combinations described above according to a remainder obtained by dividing Equation (1) by 2. In one example, there is a method of selecting two types of combinations according to the remainder obtained by dividing Equation (1) assigned to the mobile station device by 2. For example, when the answer of Equation (3) is 1, the remainder is 1. Thus the first combination may be used. When the answer of Equation (3) is 2, the remainder is 0. Thus, the second combination may be used. In another example, when the eCCE aggregation n is 2, the remainder obtained by dividing Equation (1) by 2 may be used. When the eCCE aggregation n is 4, the remainder obtained by dividing Equation (1) by 4 may be used. Here, natural numbers different from "A=39827" and "D=65537" may be used. The example in which $Y_k$ indicates a natural number generated by the hash function using the identifier (RNTI) assigned to the self-device and/or the subframe number k as the input parameter has been described. However, the PRB index which is the number assigned to each PRB may be used instead of the subframe number k.

[Math. 4]

$$\lfloor \{(Y_k + m') / \lfloor N_{CCE,k}/L \rfloor\} \rfloor \bmod 2 \quad (4)$$

In another example, as in Expression (4), there is a method of implicitly determining the combination unique to the mobile station device for each mobile station device from the two types of combination or the four types of combinations described above according to a remainder obtained by dividing a value (that is, a value obtained by rounding up a number of digits after the decimal point) generated by taking the floor of a value, which is obtained by dividing an expression ($Y_k + m'$) by a value (that is, a value obtained by rounding up a number of digits after the decimal point) generated by taking the floor of $N_{CCE,k}/L$, by 2. For example, when the answer of Expression (4) is 1, the remainder is 1. Thus, the first combination may be used. When the answer of Expression (4) is 2, the remainder is 0. Thus, the second combination may be used. In another example, when the eCCE aggregation n is 2, a remainder obtained by dividing Equation (4) by 2 may be used. When the eCCE aggregation n is 4, a remainder (that is, mod 4 is used) obtained by dividing Expression (4) by 4 instead may be used. Here, in the example in which the expression ($Y_k + m'$) is divided by the value generated by taking the floor of $N_{CCE,k}/L$ has been described. However, the expression may be divided by a value other than by the value generated by taking the floor of $N_{CCE,k}/L$.

The example in which $n_{RNTI}$ which is the C-RNTI number assigned to the mobile station device is used has been described above. However, $N_1$ which is a parameter unique to a terminal may be used instead of $n_{RNTI}$ in the foregoing example. Here, it is assumed that the PUCCH resource having an index nPUCCH identical to a value obtained by adding $N_1$ which is the parameter unique to a terminal (unique to each second PDCCH when the plurality of second PDCCHs are set) to the eCCE number nePDCCHCCE of the first eCCE among the eCCEs configuring the ePDCCH (second PDCCH) including the downlink grant is the PUCCH resource assigned in regard to HARQ response information to downlink transmission data corresponding to the downlink grant. Further, $N_1$ which is the parameter unique to a terminal is notified of by the RRC signaling.

The example in which $n_{RNTI}$ which is the C-RNTI number assigned to the mobile station device is used has been described above. However, $n_{ID}^{(nSCID)}$ may be used instead of $n_{RNTI}$. Further, $n_{ID}^{(nSCID)}$ is a parameter that determines an initial value $C_{init}$ of a sequence of the UE-specific RS used for the second PDCCH and is used as follows. Here, nSCID is fixed to 0 or 1. Alternatively, one of 0 and 1 is notified of as by the RRC signaling or nSCID is considered to be implicitly designated using another parameter by the base station device. The initial value $C_{init}$ it is calculated by Expression (5) below.

[Math. 5]

$$c_{init} = (\lfloor n_s/2 \rfloor + 1) \cdot (2 n_{ID}^{(nSCID)} + 1) \cdot 2^{16} + n_{SCID} \quad (5)$$

As described above, each terminal can use a unique reference signal of other terminals even when the same CCEs (or eCCEs) of each search space are assigned to the other terminals by implicitly determining a combination unique to the mobile station device for each mobile station device using one of $n_{RNTI}$, $N_1$ which is the parameter unique to the terminal, and $n_{ID}^{(nSCID)}$ from the two types of combinations or the four types of combinations. Thus, interference between the antenna ports (or the reference signals) disappears, and thus a channel estimation system using the reference signal in each terminal can be improved. More specifically, for example, interference between the same antenna ports can be reduced by performing transmission with the resource of D1 in FIG. 12 using the UE-specific RS through the antenna port 107 in the first combination or by performing transmission with the resource of D2 in FIG. 12 using the UE-specific RS through the antenna port 109 in the second combination. For example, when the first combination or the second combination is used using a remainder obtained by dividing one of $n_{RNTI}$, $N_1$ which is the parameter unique to the terminal, and $n_{ID}^{(nSCID)}$ by a constant, terminals can be separated in advance into a set using the first combination and a set using the second combination. By selecting the appropriate set of the terminals using this remainder, scheduling of the same radio network resource can be performed. In another example, for example, a different set (that is, the first combination or the second combination) can be assigned for each subframe number or PRB index using one hash function one of $n_{RNTI}$, $N_1$ which is the parameter unique to the terminal, and $n_{ID}^{(nSCID)}$. In this case, since the first combination or the second combination differs for each subframe, restrictions on a scheduler decrease. Thus, when an appropriate subframe (or PRB) is selected using this fact, scheduling of the same radio network resource to any set of the terminals can be performed. When MU-MIMO is applied at the time of transmission of the second PDCCH, assignment of the same CCE (or eCCE) to different terminals may occur, as described above.

Hereinafter, an example of the case in which MU-MIMO is applied will be described. For example, when the base station device 3 determines that a current situation is a situation appropriate for the application of MU-MIMO, different combinations are set in the second PDCCH regions for the different mobile station devices 5 in regard to the combinations of the eCCEs in the DL PRB pair and the corresponding antenna ports. For example, the situation appropriate for the application of MU-MIMO refers to a situation in which the base station device 3 can apply beamforming (precoding process) in which large interference is not likely to occur to signals in regard to the different mobile station devices 5 and refers to a case in which there is a request for transmitting the signals of the second PDCCH for the plurality of mobile station devices 5 separated geographically to the respective mobile station devices 5. For example, since it is difficult to apply the beamforming in which large interference is not likely to occur between the signals for the respective mobile station devices 5 to the plurality of mobile station devices 5 present at geographically close positions, the base station device 3 does not apply MU-MIMO to the signals of the second PDCCH for the mobile station devices 5. The beamforming (precoding) optimum to the characteristics of transmitted and received signals is common to the plurality of mobile station devices 5 present at the geographically close positions. For example, when the base station device 3 determines that the current situation is not the situation appropriate for the application of MU-MIMO, the same (common) combination is set in the second PDCCH regions for the different mobile station devices 5 in regard to the combinations of the eCCEs in the DL PRB pair and the corresponding antenna ports (that is, for example, one of $n_{RNTI}$, $N_1$ which is the parameter unique to the terminal, and $N_{ID}^{(nSCID)}$ is appropriately set such that the plurality of terminals select the first combination).

A process of a case in which the base station device 3 determines that the current situation is the situation appropriate for the application of MU-MIMO will be described. For example, a case in which two mobile station devices 5 are present at different positions (for example, an area A and an area B) in an area of the base station device 3 will be described. To facilitate the description, the mobile station device 5 located in the area A is referred to as a mobile station device 5A-1 and the mobile station device 5 located in the area B is referred to as a mobile station device 5B-1. The base station device 3 sets the first combination in the second PDCCH region of the mobile station device 5A-1 in regard to the combinations of the eCCEs in the DL PRB pair and the corresponding antenna ports. The base station device 3 sets the second combination in the second PDCCH region of the mobile station device 5B-1 in regard to the combinations of the eCCEs in the DL PRB pair and the corresponding antenna ports.

For example, the base station device 3 transmits the signal of the second PDCCH for the mobile station device 5A-1 from the antenna port 107 using the resources of the eCCEs n and n+1 and transmits the signal of the second PDCCH for the mobile station device 5B-1 from the antenna port 108 using the resources of the eCCEs n and n+1. Here, the base station device 3 performs a precoding process appropriate for the mobile station device 5A-1 on the UE-specific RS and the signal of the second PDCCH transmitted from the antenna port 107 and performs a precoding process appropriate for the mobile station device 5B-1 on the UE-specific RS and the signal of the second PDCCH transmitted from the antenna port 109. The mobile station device 5A-1 demodulates the signal of the second PDCCH of the resource of the eCCE n using the UE-specific RS corresponding to the antenna port 107. The mobile station device 5B-1 demodulates the signal of the second PDCCH of the resources of the eCCEs n and n+1 using the UE-specific RS corresponding to the antenna port 109. Here, since the mobile station device 5A-1 and the mobile station device 5B-1 are located at sufficiently geographically different positions, the base station device 3 can apply the same beamforming (precoding process) in which large interference is not likely to occur to the signals of the second PDCCH for both of the mobile station devices 5. MU-MIMO is realized in this way.

Hereinafter, a control signal mapped to the second PDCCH will be described. The control signal mapped to the second PDCCH is processed for each piece of control information for one mobile station device 5. A scramble process, a modulation process, a layer mapping process, a precoding process, or the like can be performed as in the data signal. Here, the layer mapping process means a part of MIMO signal processing performed when transmission of a plurality of antennas is applied to the second PDCCH. For example, the layer mapping process is performed on the second PDCCH to which the precoding process is applied and the second PDCCH to which the precoding process is not applied but transmission diversity is applied. The control signal mapped to the second PDCCH can be subjected along with the UE-specific RS to the common precoding process. At this time, the precoding process is preferably performed by precoding weight very suitable for units of the mobile station devices 5.

The base station device 3 multiplexes UE-specific RS to the DL PRB pair in which the second PDCCH is mapped. The mobile station device 5 performs a demodulation process on the signal of the second PDCCH using the UE-specific RS. For the UE-specific RS used to demodulate the second PDCCH, a different combination can be set for each second PDCCH region in regard to the combinations of the eCCEs in the DL PRB pair and the corresponding antenna ports. That is, a different combination can be set for each mobile station device 5 in regard to the combinations of the eCCEs in the DL PRB pair of the second PDCCH region and the corresponding antenna ports. In the second PDCCHS regions to which the first physical resource mapping is applied, the UE-specific RSs of the plurality of transmit antennas (the antenna ports 107, 108, 109, and 110) are mapped. In the second PDCCHS regions to which the second physical resource mapping is applied, the UE-specific RSs of one or two transmit antennas (for example, one or both of the antenna ports 107 and 109) are mapped. For example, the base station device 3 may transmit the eREGs included in the second PDCCH region to which the second physical resource mapping is applied, typically with one transmit antenna (for example, the antenna port 107). Alternatively, the base station device 3 may transmit the eREGs included in the second PDCCH region to which the second physical resource mapping is applied, typically with two transmit antennas (for example, the antenna ports 107 and 108). Alternatively, the base station device 3 may transmit some of the eREGs included in the second PDCCH region to which the second physical resource mapping is applied, with the antenna port 107 between two transmit antennas (for example, the antenna ports 107 and 108) and may transmit the other eREGs with the antenna port 108. For example, the eREGs (for example, the eREGs included in the first slot) with the eREG numbers 1 to 8 in FIG. 21 may be transmitted using the antenna port 107 and the eREGs (for example, the eREGs included in the second slot) with the eREG numbers 9 to 16 may be transmitted using the antenna port 107. In this case, at the time of the second physical resource mapping, the antenna ports determined in a static manner to transmit the eREGs configuring the second PDCCH can be otherwise said to be used. In another example, according to a parameter set by the RRC signaling in the mobile station device 5, the base station device 3 may switch a case in which the eREGs included in the second PDCCH region to which the second physical resource mapping is applied are transmitted with one transmit antenna (for example, the antenna port 107) and a case in which the eREGs included in the second PDCCH region to which the second physical resource mapping is applied are transmitted with two transmit antennas (for example, the antenna ports 107 and 109) (in another example, the antenna ports 107 and the 108). When the transmission is performed with two transmit antennas, the base station device 3 may transmit the eREGs with two transmit antennas (for example, the antenna ports 107 and 109) (in another example, of the transmit antennas of the antenna ports 107 and 108, some of the eREGs included in the second PDCCH region to which the second physical resource mapping is applied may be transmitted with the antenna port 107 and the other eREGs may be transmitted with the antenna port 109) (in another example, the antenna port 108). For example, the eREGs (for example, the eREGs included in the first slot) with the eREG numbers 1 to 8 in FIG. 21 may be transmitted using the antenna port 107 and the eREGs (for example, the eREGs included in the second slot) with the eREG numbers 9 to 16 may be transmitted using the antenna port 109 (in another example, the antenna port 108). In another example, the eREGs (for example, the odd eREGs) with the eREG numbers 1, 3, 5, 7, 9, 11, 13, and 15 in FIG. 21 may be transmitted using the antenna port 107 and the eREGs (for example, the even eREGs) with the eREG numbers 2, 4, 6, 8, 10, 12, 14, and 16 may be transmitted using the antenna port 109 (in another example, the antenna port 108). Further, the eREGs may be transmitted vice versa (that is, the even eREGs may be transmitted using the antenna port 107 and the odd eREGs may be transmitted using the antenna port 109). In this case, at the time of the second physical resource mapping, the antenna ports determined in a semistatic manner to transmit the eREGs configuring the second PDCCH can be otherwise said to be used. In another example, the base station device 3 may transmit each eREG using the antenna port corresponding to each eREG to the mobile station device 5 at the time of the above-described first physical resource mapping. For example, in the example of FIG. 21, the eREGs with the eREG numbers 1, 2, 9, and 10 are associated with the antenna port 107, the eREGs with the eREG numbers 3, 4, 11, and 12 are associated with the antenna port 108, the eREGs with the eREG numbers 5, 6, 13, and 14 are associated with the antenna port 109, and the eREGs with the eREG numbers 7, 8, 15, and 16 are associated with the antenna port 110. Of course, this association is an example of association of the eREGs with the antenna ports and other association may be realized. Even in this case, at the time of the second physical resource mapping, the antenna ports determined in a static manner to transmit the eREGs configuring the second PDCCH can be otherwise said to be used. In another example, when the second PDCCH (eCCE aggregation 2) is configured by the eREG numbers 1, 2, 9, and 10 and the eREG numbers 3, 4, 11, and 12, the antenna port 107 may be used in a static manner. For example, when the second PDCCH (eCCE aggregation 2) is configured by the eREG numbers 5, 6, 13, and 14 and the eREG numbers 7, 8, 15, and 16, the antenna port 109 may be used in a static manner. For example, when the second PDCCH (eCCE aggregation 4) is configured by the eREG numbers 1, 2, 9, and 10 and the eREG numbers 3, 4, 11, and 12 and is configured by the eREG numbers 5, 6, 13, and 14 and the eREG numbers 7, 8, 15, and 16, the antenna port 107 may be used in a static manner. In other words, the antenna port corresponding to the minimum eREG number among the eREGs configuring the second PDCCH transmitted to the certain mobile station device 5 may be used to transmit each eREG. Of course, this association is an example of association of the eREGs with the antenna ports and other association may be realized. Even in this case, at the time of the second physical resource mapping, the antenna ports determined in a static manner to transmit the eREGs configuring the second PDCCH can be otherwise said to be used. As described above, the different antenna ports from those at the time of the first physical resource mapping are associated at the second physical resource mapping. However, at the time of the second physical resource mapping including these antenna ports, the antenna ports determined in a static manner to transmit the eREGs configuring the second PDCCH can be otherwise said to be used. The configuration of the eREGs in which the PRB pair is divided into 16, as illustrated in FIG. 21, has been used herein, but is merely an example. Another configuration may also be used. For example, of 4, 8, 12, and 36 eREGs, any number of eREGs may be included in one PRB pair and the specific mapping of the eREGs may be different from that of FIG. 21.

In the second PDCCH regions to which the first physical resource mapping (for example, the localized ePDCCH) is applied, the eCCEs in the DL PRB pair correspond to different transmit antennas and the signals are transmitted from the corresponding transmit antennas. In the second PDCCH regions to which the second physical resource mapping (for example, the distributed ePDCCH) is applied, the eCCEs in the DL PRB pair correspond to the same (common) transmit antenna and the signals are transmitted from the corresponding transmit antenna. The above-described (common) antenna port may be fixed to the antenna ports 107 and 109.

For example, in the second PDCCH regions to which the first physical resource mapping is applied, a first combination, a second combination, a third combination, or a fourth combination can be used in regard to the combinations of the eCCEs in the DL PRB pair and the corresponding antenna ports. The association of the eCCEs and the antenna ports in the case of the foregoing combination has been described above.

A predefined scramble ID may be used in the generation of the UE-specific RS mapped to the second PDCCH region. For example, one value of 0 to 3 may be defined as the scramble ID used for the UE-specific RS.

Figure 24:
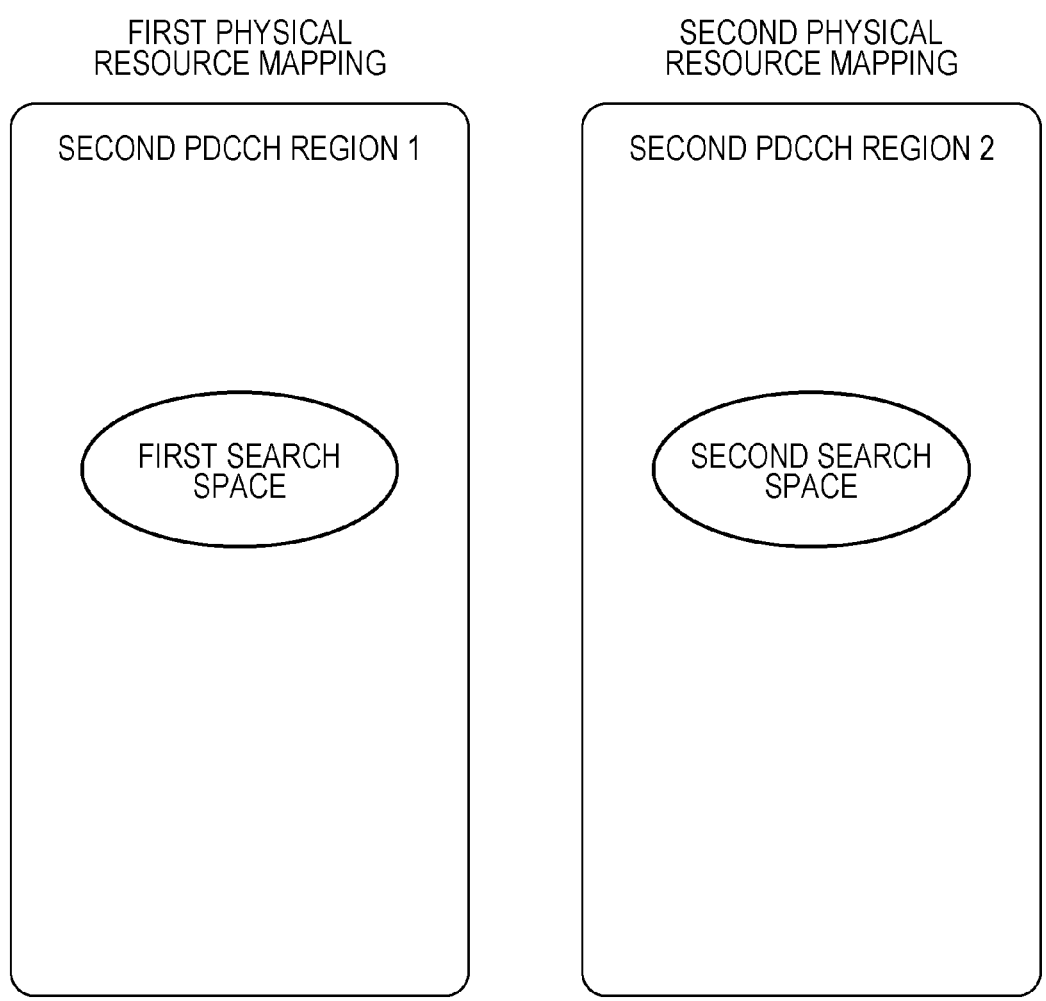
FIG. 24 is a diagram for describing monitoring the second PDCCH of the mobile station device 5 according to the embodiment of the present invention.

FIG. 24 is a diagram for describing monitoring the second PDCCH of the mobile station device 5 according to the embodiment of the present invention. For the mobile station device 5, the plurality of second PDCCH regions (second PDCCH region 1 and second PDCCH region 2) are configured. For the mobile station device 5, the search space is set in each second PDCCH region. The search space means a logical region in which the mobile station device 5 performs decoding and detection of the second PDCCH in the second PDCCH region. The search space is configured by a plurality of second PDCCH candidates. The second PDCCH candidate is a target on which the mobile station device 5 performs the decoding and detection of the second PDCCH. The second PDCCH candidate different for each eCCE aggregation number is configured by different eCCEs (including one eCCE or the plurality of eCCEs). The eCCEs configuring the plurality of second PDCCH candidates of the search space set in the second PDCCH regions to which the first physical resource mapping is applied are the plurality of eCCEs of which eCCE numbers continue. The eCCEs configuring the plurality of second PDCCH candidates of the search space set in the second PDCCH regions to which the second physical resource mapping is applied are the plurality of eCCEs of which eCCE numbers do not continue. The first eCCE number used for the search space in the second PDCCH region is set in each mobile station device 5. For example, the first eCCE number used for the search space is set by a hash function using an identifier (a mobile station identifier or a radio network temporary identifier: RNTI) assigned to the mobile station device 5 as one of the input parameters. For example, the base station device 3 notifies the mobile station device 5 of the first eCCE number used for the search space using the RRC signaling. As the RNTI, there is a cell-radio network temporary identifier (C-RNTI) effective only in a cell, a temporary cell-radio network temporary identifier (temporary C-RNTI) used in a random access sequence, or the like.

The plurality of search spaces (a first search space and a second search space) are set in the mobile station device 5 in which the plurality of second PDCCH regions are configured. The first physical resource mapping is applied to some second PDCCH regions (second PDCCH regions 1) among the plurality of second PDCCH regions configured in the mobile station device 5 and the second physical resource mapping is applied to the other second PDCCH regions (second PDCCH regions 2).

The number of second PDCCH candidates of the first search space can be different from the number of second PDCCH candidates of the second search space. For example, in order to perform control such that the second PDCCH having the frequency diversity effect is used without applying the precoding process when the second PDCCH to which the precoding process is basically applied is used and it is difficult for the base station device 3 to realize the precoding process appropriate for a certain situation, the number of second PDCCH candidates of the first search space may be set to be greater than the number of second PDCCH candidates the second search space.

In a certain eCCE aggregation number, the number of second PDCCH candidates of the first search space can be the same as the number of second PDCCH candidates of the second search space. In a different eCCE aggregation number, the number of second PDCCH candidates of the first search space can be different from the number of second PDCCH candidates of the second search space. Further, in the certain eCCE aggregation number, the number of second PDCCH candidates of the first search space can also be greater than the number of second PDCCH candidates of the second search space. In the different eCCE aggregation number, the number of second PDCCH candidates of the first search space can also be less than the number of second PDCCH candidates of the second search space.

The second PDCCH candidates of the certain eCCE aggregation number can also be set in the search space of one-side second PDCCH regions and may not be set in the search space of the other-side different second PDCCH regions either.

The number of second PDCCH candidates of the search space in one second PDCCH region can vary according to the number of second PDCCH regions configured in the mobile station device 5. For example, as the number of second PDCCH regions configured in the mobile station device 5 increases, the number of second PDCCH candidates of the search space in one second PDCCH region is reduced.

<Overall Configuration of Base Station Device 3>

Figure 1:
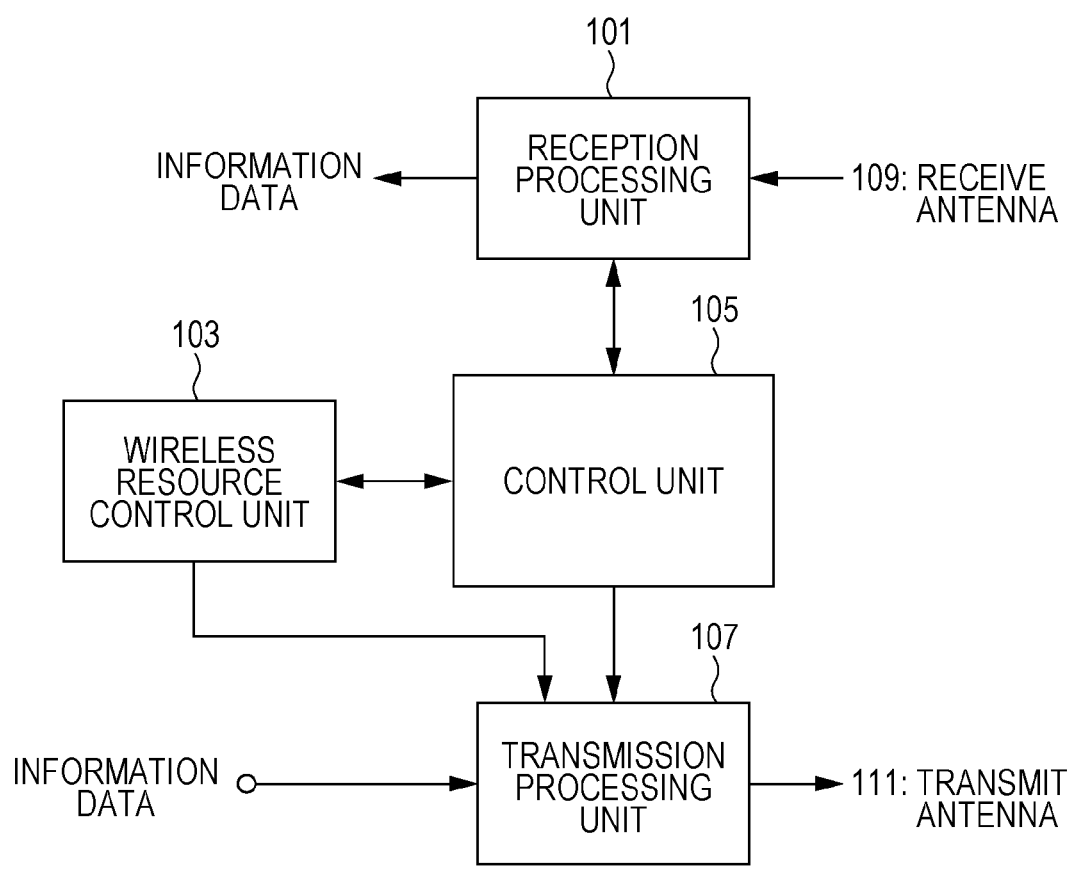
FIG. 1 is a schematic block diagram illustrating the configuration of a base station device 3 according to an embodiment of the present invention.
Figure 2:
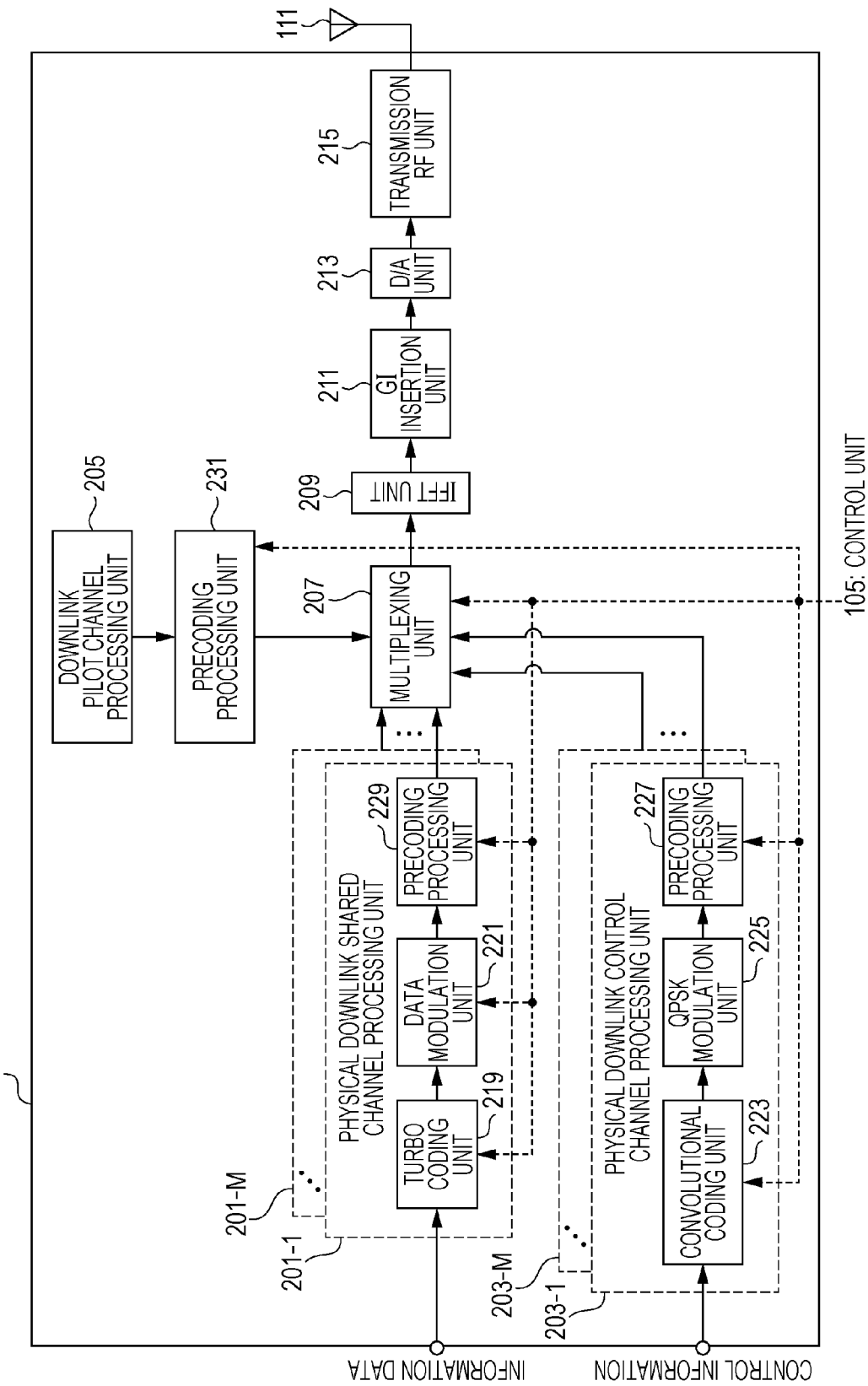
FIG. 2 is a schematic block diagram illustrating the configuration of a transmission processing unit 107 of the base station device 3 according to the embodiment of the present invention.
Figure 3:
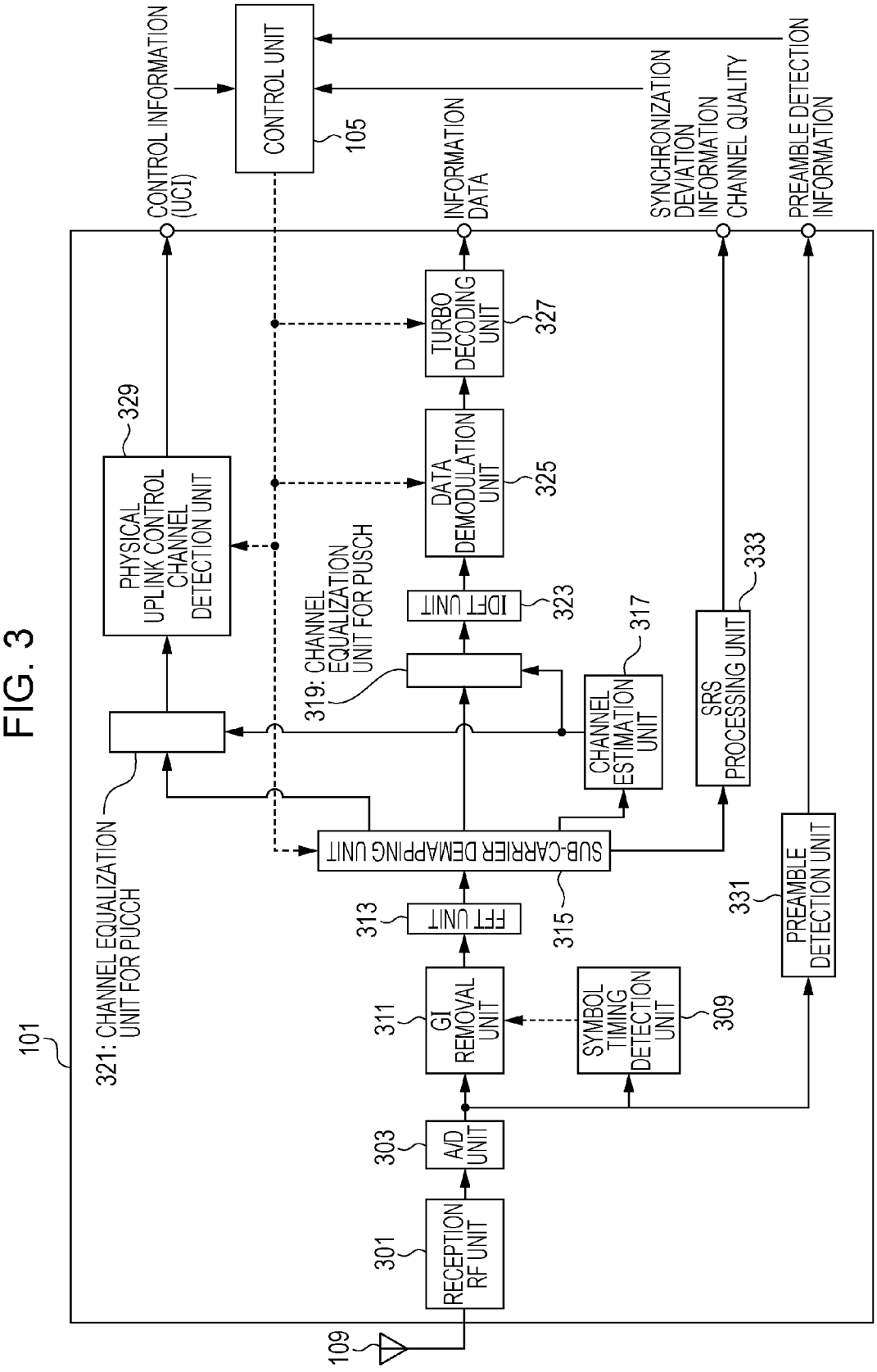
FIG. 3 is a schematic block diagram illustrating the configuration of a reception processing unit 101 of the base station device 3 according to the embodiment of the present invention.

Hereinafter, the configuration of the base station device 3 according to the embodiment will be described with reference to FIGS. 1, 2, and 3. FIG. 1 is a schematic block diagram illustrating the configuration of the base station device 3 according to the embodiment of the present invention. As illustrated in the drawing, the base station device 3 is configured to include a reception processing unit (second reception processing unit) 101, a radio resource control unit (second radio resource control unit) 103, a control unit (second control unit) 105, and a transmission processing unit (second transmission processing unit) 107.

The reception processing unit 101 demodulates and decodes received signals of the PDCCH and the PUSCH received from the mobile station device 5 through a receive antenna 109 on the basis of the UL RS according to an instruction from the control unit 105 to extract the control information and the information data. The reception processing unit 101 performs a process of extracting the UCI from the uplink subframe and the UL PRB for which the self-device assigns the resource of the PUCCH to the mobile station device 5. The reception processing unit 101 receives an instruction regarding which process is performed on which uplink subframe and which UL PRB from the control unit 105. For example, the control unit 105 instructs the reception processing unit 101 to perform a detection process of performing multiplying and combining of a code sequence in the time domain and multiplying and combining of a code sequence in the frequency domain on the signals of the PUCCHs (the PUCCH format 1a and the PUCCH format 1b) for the ACK/NACK. The control unit 105 instructs the reception processing unit 101 of the code sequence of the frequency domain and the code sequence of the time domain used for a process of detecting the UCI from the PUCCH. The reception processing unit 101 outputs the extracted UCI to the control unit 105 and outputs the information data to a higher layer. The details of the reception processing unit 101 will be described below.

The reception processing unit 101 detects (receives) a preamble sequence from the received signal of the PRACH received from the mobile station device 5 through the receive antenna 109 according to an instruction from the control unit 105. The reception processing unit 101 also estimates an arrival timing (reception timing) in addition to the detection of the preamble sequence. The reception processing unit 101 performs a process of detecting the preamble sequences of the UL PRB pair and the uplink subframe to which the resource of the PRACH is assigned by the self-device. The reception processing unit 101 outputs information regarding the estimated arrival timing to the control unit 105.

The reception processing unit 101 measures the channel quality of one or more UL PRBs (UL PRB pairs) using the SRS received from the mobile station device 5. The reception processing unit 101 detects (calculates or measures) the synchronization deviation of the uplink using the SRS received from the mobile station device 5. The reception processing unit 101 receives an instruction regarding which process is performed on which uplink subframe and which UL PRB (UL PRB pair) from the control unit 105. The reception processing unit 101 outputs information regarding the measured channel quality and the detected synchronization deviation of the uplink to the control unit 105. The details of the reception processing unit 101 will be described below.

The radio resource control unit 103 sets the assignment of the resources to the PDCCHs (the first PDCCH and the second PDCCH), the assignment of the resources to the PUCCH, the assignment of the DL PRB pair to the PDSCH, the assignment of the UL PRB pair to the PUSCH, the assignment of the resources to the PRACH, the assignment of the resource to the SRS, a phase rotation amount (weighting value) used for modulation schemes of various channels, a coding rate, a transmission power control value, or the precoding process, and a phase rotation amount (weighting value) used for the precoding process of the UE-specific RS. The radio resource control unit 103 also sets the code sequence of the frequency domain, the code sequence of the time domain, and the like for the PUCCH. The radio resource control unit 103 sets the plurality of second PDCCH regions and sets the DL PRB pair used for each second PDCCH region. The radio resource control unit 103 sets the physical resource mapping of each second PDCCH region. The radio resource control unit 103 sets the combinations of the eCCEs in the DL PRB pair and the corresponding antenna ports in regard to the second PDCCH region. Specifically, the radio resource control unit 103 sets the transmit antenna transmitting the signal of each eCCE in the DL PRB pair. The mobile station device 5 is notified of a part of the information set by the radio resource control unit 103 through the transmission processing unit 107. For example, the mobile station device 5 is notified of the information indicating the DL PRB pair of the second PDCCH region and the information indicating the physical resource mapping of the second PDCCH region (the information indicating the first physical resource mapping or the second physical resource mapping), the $N_1$ which is the parameter unique to the terminal, and $n_{ID}^{(nSCID)}$.

The radio resource control unit 103 sets, for example, the assignment of the radio resource of the PDSCH on the basis of the UCI acquired using the PUCCH in the reception processing unit 101 and input through the control unit 105. For example, when the ACK/NACK acquired using the PUCCH is input, the radio resource control unit 103 assigns the resource of the PDSCH for which the NACK is indicated with the ACK/NACK to the mobile station device 5.

The radio resource control unit 103 outputs various control signals to the control unit 105. Examples of the control signals include a control signal indicating the physical resource mapping of the second PDCCH region, a control signal indicating the transmit antenna transmitting the signal of each eCCE in the DL PRB pair of the second PDCCH region, a control signal indicating the assignment of the resource of the second PDCCH, and a control signal indicating the phase rotation amount used for the precoding process.

On the basis of the control signals input from the radio resource control unit 103, the control unit 105 controls the transmission processing unit 107 such that, for example, the DL PRB pair is assigned to the PDSCH, the resource is assigned to the PDCCH, the modulation scheme is set for the PDSCH, the coding rate (the eCCE aggregation number of the second PDCCH) is set for the PDSCH and the PDCCH, the UE-specific RS of the second PDCCH region is set, the transmit antenna transmitting the signal of the eCCE is set, and the precoding process on the PDSCH, the PDCCH, and the UE-specific RS is set. On the basis of the control signals input from the radio resource control unit 103, the control unit 105 generates the DCI transmitted using the PDCCH and outputs the DCI to the transmission processing unit 107. The DCI transmitted using the PDCCH is the downlink assignment, the uplink grant, or the like. The control unit 105 performs control such that the transmission processing unit 107 transmits the information indicating the second PDCCH region, the information indicating the physical resource mapping of the second PDCCH region, the information (the first combination, the second combination, the third combination, or the fourth combination) indicating the combination of each eCCE in the DL PRB pair and the corresponding antenna port to the mobile station device 5 using the PDSCH.

On the basis of the control signals input from the radio resource control unit 103, the control unit 105 controls the reception processing unit 101 such that, for example, the UL PRB pair is assigned to the PUSCH, the resource is assigned to the PUCCH, the modulation scheme of the PUSCH and the PUCCH is set, the coding rate of the PUSCH is set, the detection process of the PUCCH is set, the code sequence is set in the PUCCH, the resource is assigned to the PRACH, and the resource is assigned to the SRS. The UCI transmitted using the PUCCH by the mobile station device 5 is input from the reception processing unit 101 and the control unit 105 outputs the input UCI to the radio resource control unit 103.

The information indicating the arrival timing of the detected preamble sequence and the information indicating the synchronization deviation of the uplink detected from the received SRS are input from the reception processing unit 101 and the control unit 105 calculates an adjustment value (TA: Timing Advance, Timing Adjustment, Timing Alignment) (TA value) of a transmission timing of an uplink. The mobile station device 5 is notified of information (TA command) indicating the calculated adjustment value of the transmission timing of the uplink through the transmission processing unit 107.

The transmission processing unit 107 generates signals to be transmitted using the PDCCH and the PDSCH on the basis of the control signals input from the control unit 105 and transmits the signals through the transmit antenna 111. The transmission processing unit 107 transmits the information indicating the second PDCCH region, the information indicating the physical resource mapping of the second PDCCH region, the information (the first combination, the second combination, the third combination, or the fourth combination) indicating the combination of each eCCE in the DL PRB pair and the corresponding antenna port, the information data input from a higher layer, and the like, which are input from the radio resource control unit 103, to the mobile station device 5 using the PDSCH. The transmission processing unit 107 transmits the DCI input from the control unit 105 to the mobile station device 5 using the PDCCH (the first PDCCH or the second PDCCH). The transmission processing unit 107 transmits the CRS, the UE-specific RS, and the CSI-RS. To simplify the description, the information data is assumed below to include the information regarding the various types of control. The details of the transmission processing unit 107 will be described below.

<Configuration of Transmission Processing Unit 107 of Base Station Device 3>

Hereinafter, the details of the transmission processing unit 107 of the base station device 3 will be described. FIG. 2 is a schematic block diagram illustrating the configuration of the transmission processing unit 107 of the base station device 3 according to the embodiment of the present invention. As illustrated in the drawing, the transmission processing unit 107 is configured to include a plurality of physical downlink shared channel processing units 201-1 to 201-M (hereinafter, the physical downlink shared channel processing units 201-1 to 201-M are collectively referred to as the physical downlink shared channel processing units 201), a plurality of physical downlink control channel processing units 203-1 to 203-M (hereinafter, the physical downlink control channel processing units 203-1 to 203-M are collectively referred to as the physical downlink control channel processing units 203), a downlink pilot channel processing unit 205, a precoding processing unit 231, a multiplexing unit 207, an Inverse Fast Fourier Transform (IFFT) unit 209, a Guard Interval (GI) insertion unit 211, a Digital/Analog (D/A converter) unit 213, a transmission Radio Frequency (RF) unit 215, and a transmit antenna 111. Since the physical downlink shared channel processing units 201 and the physical downlink control channel processing units 203 have the same configuration and function, single units represents the physical downlink shared channel processing units 201 and physical downlink control channel processing units 203 for description. To simplify the description, the transmit antenna 111 is a collection of a plurality of antenna ports (antenna ports 0 to 22 and antenna ports 107 to 110).

As illustrated in the drawing, the physical downlink shared channel processing units 201 each include a turbo coding unit 219, a data modulation unit 221, and a precoding processing unit 229. As illustrated in the drawing, the physical downlink control channel processing units 203 each include a convolutional coding unit 223, a QPSK modulation unit 225, and a precoding processing unit 227. The physical downlink shared channel processing units 201 perform baseband signal processing to transmit the information data to the mobile station device 5 according to the OFDM scheme. The turbo coding unit 219 performs turbo coding on the input information data to improve data error tolerance at the coding rate input from the control unit 105 and outputs the coded information data to the data modulation unit 221. The data modulation unit 221 modulates the data coded by the turbo coding unit 219 according to the modulation scheme input from the control unit 105, for example, a modulation scheme such as Quadrature Phase Shift Keying (QPSK), 16 Quadrature Amplitude Modulation (16 QAM), or 64 Quadrature Amplitude Modulation (64 QAM), and generates a signal sequence of modulation symbols. The data modulation unit 221 outputs the generated signal sequence to the precoding processing unit 229. The precoding processing unit 229 performs the precoding process (beamforming process) on the signal input from the data modulation unit 221 and outputs the processed signal to the multiplexing unit 207. Here, in the precoding process, phase rotation or the like is preferably performed on the generated signal so that the mobile station device 5 can efficiently receive the signal (for example, the reception power is the maximum or interference is the minimum). When the precoding processing unit 229 does not perform the precoding process on the signal input from the data modulation unit 221, the precoding processing unit 229 outputs the signal input from the data modulation unit 221 to the multiplexing unit 207 without processing the signal.

The physical downlink control channel processing units 203 perform baseband signal processing on the DCI input from the control unit 105 to transmit the DCI according to the OFDM scheme. The convolutional coding unit 223 performs convolutional coding on the basis of the coding rate input from the control unit 105 to improve error tolerance of the DCI. Here, the DCI is controlled in units of bits. The coding rate of the DCI transmitted with the second PDCCH is associated with the set eCCE aggregation number. The convolutional coding unit 223 performs rate matching on the bits subjected to the convolutional coding process on the basis of the coding rate input from the control unit 105 to adjust the number of output bits. The convolutional coding unit 223 outputs the coded DCI to the QPSK modulation unit 225. The QPSK modulation unit 225 modulates the DCI subjected to the coding by the convolutional coding unit 223 according to the QPSK modulation scheme and outputs the signal sequence of the modulated modulation symbols to the precoding processing unit 227. The precoding processing unit 227 performs the precoding process on the signal input from the QPSK modulation unit 225 and outputs the processed signal to the multiplexing unit 207. The precoding processing unit 227 can output the signal input from the QPSK modulation unit 225 to the multiplexing unit 207 without performing the precoding process.

The downlink pilot channel processing unit 205 generates the downlink reference signals (the CRSs, the UE-specific RSs, and the CSI-RSs) which are known signals in the mobile station device 5 and outputs the downlink reference signals to the precoding processing unit 231. The precoding processing unit 231 outputs the CRSs, the CSI-RSs, some of the UE-specific RSs input from the downlink pilot channel processing unit 205 to the multiplexing unit 207 without performing the precoding process. For example, the UE-specific RS not subjected to the precoding process by the precoding processing unit 231 is the UE-specific RS in the DL PRB pair used in the second PDCCH in the second PDCCH region of the second physical resource mapping. The precoding processing unit 231 performs the precoding process on some of the UE-specific RSs input from the downlink pilot channel processing unit 205 and outputs the processed UE-specific RSs to the multiplexing unit 207. For example, the UE-specific RS subjected to the precoding process by the precoding processing unit 231 is the UE-specific RS in the DL PRB pair used for the second PDCCH in the second PDCCH region of the first physical resource mapping. The precoding processing unit 231 performs the same process as the process performed on the PDCCH by the precoding processing unit 229 and/or the process performed on the second PDCCH by the precoding processing unit 227 on some of the UE-specific RSs. More specifically, the precoding processing unit 231 performs the precoding process on the signal of the certain eCCE and also perform the same precoding process on the UE-specific RS corresponding to the antenna port and the eCCE. Therefore, when the signal of the second PDCCH to which the precoding process is applied in the mobile station device 5 is demodulated, the UE-specific RS can be used to estimate a change in the channel (transmission path) in the downlink and an equalization channel with which a phase rotation is combined by the precoding processing unit 227. That is, the base station device 3 does not need to notify the mobile station device 5 of information (phase rotation amount) regarding the precoding process by the precoding processing unit 227 and the mobile station device 5 can demodulate the signal subjected to the precoding process.

For example, when the precoding process is not used for the second PDCCH and the PDSCH subjected to a demodulation process such as channel compensation using the UE-specific RS, the precoding processing unit 231 does not perform the precoding process on the UE-specific RS and outputs the UE-specific RS to the multiplexing unit 207.

The multiplexing unit 207 multiplexes the signal input from the downlink pilot channel processing unit 205, the signal input from each of the physical downlink shared channel processing units 201, and the signal input from each of the physical downlink control channel processing units 203 to the downlink subframe according to an instruction from the control unit 105. The control signals regarding the assignment of the DL PRB pair to the PDSCH set by the radio resource control unit 103, the assignment of the resources to the PDCCHs (the first PDCCH and the second PDCCH), and the physical resource mapping of the second PDCCH region are input to the control unit 105 and the control unit 105 controls the process of the multiplexing unit 207 on the basis of the control signals. For example, the multiplexing unit 207 multiplexes the signal of the second PDCCH to the resource of the downlink with the eCCE aggregation number set by the radio resource control unit 103. The multiplexing unit 207 outputs the multiplexed signal to the IFFT unit 209.

The IFFT unit 209 performs inverse fast Fourier transform on the signal multiplexed by the multiplexing unit 207 to modulate the signal according to the OFDM scheme and outputs the signal to the GI insertion unit 211. The GI insertion unit 211 generates a baseband digital signal formed by symbols in the OFDM scheme by adding a guard interval to the signal subjected to the modulation of the OFDM scheme by the IFFT unit 209. As well known, the guard interval is generated by copying a part of the beginning or ending of the transmitted OFDM symbols. The GI insertion unit 211 outputs the generated baseband digital signal to the D/A unit 213. The D/A unit 213 converts the baseband digital signal input from the GI insertion unit 211 into an analog signal and outputs the analog signal to the transmission RF unit 215. The transmission RF unit 215 generates an in-phase component and an orthogonal component of an intermediate frequency from the analog signal input from the D/A unit 213 and removes an excessive frequency component of an intermediate frequency band. Next, the transmission RF unit 215 converts (converts up) the signal of the intermediate frequency to a signal with a high frequency, removes the excessive frequency component, amplifies its power, and transmits the signal to the mobile station device 5 through the transmit antenna 111.

<Configuration of Reception Processing Unit 101 of Base Station Device 3>

Hereinafter, the details of the reception processing unit 101 of the base station device 3 will be described. FIG. 3 is a schematic block diagram illustrating the configuration of the reception processing unit 101 of the base station device 3 according to the embodiment of the present invention. As illustrated in the drawing, the reception processing unit 101 is configured to include a reception RF unit 301, an Analog/Digital (A/D converter) unit 303, a symbol timing detection unit 309, a GI removal unit 311, an FFT unit 313, a subcarrier demapping unit 315, a channel estimation unit 317, a channel equalization unit 319 for the PUSCH, a channel equalization unit 321 for the PUCCH, an IDFT unit 323, a data demodulation unit 325, a turbo decoding unit 327, a physical uplink control channel detection unit 329, a preamble detection unit 331, and an SRS processing unit 333.

The reception RF unit 301 appropriately amplifies the signal received through the receive antenna 109, converts (converts down) the frequency into an intermediate frequency, removes an unnecessary frequency component, controls an amplification level so that a signal level is appropriately maintained, and performs orthogonal demodulation on the basis of the in-phase component and the orthogonal component of the received signal. The reception RF unit 301 outputs the analog signal subjected to the orthogonal demodulation to the A/D unit 303. The A/D unit 303 converts the analog signal subjected to the orthogonal demodulation by the reception RF unit 301 into a digital signal and outputs the converted digital signal to the symbol timing detection unit 309 and the GI removal unit 311.

The symbol timing detection unit 309 detects timings of the symbols on the basis of the signal input from the A/D unit 303 and outputs a control signal indicating the detected timing of a symbol boundary to the GI removal unit 311. The GI removal unit 311 removes a portion corresponding to the guard interval from the signal input from the A/D unit 303 on the basis of the control signal from the symbol timing detection unit 309 and outputs a signal of the remaining portion to the FFT unit 313. The FFT unit 313 performs fast Fourier transform on the signal input from the GI removal unit 311, performs demodulation according to a DFT-Spread-OFDM scheme, and outputs the signal to the subcarrier demapping unit 315. The number of points of the FFT unit 313 is the same as the number of points of the IFFT unit of the mobile station device 5 to be described below.

The subcarrier demapping unit 315 separates the signal demodulated by the FFT unit 313 into the DM RS, the SRS, the signal of the PUSCH, and the signal of the PUCCH on the basis of the control signals input from the control unit 105. The subcarrier demapping unit 315 outputs the separated DM RS to the channel estimation unit 317, outputs the separated SRS to the SRS processing unit 333, outputs the separated signal of the PUSCH to the channel equalization unit 319 for the PUSCH, and outputs the separated signal of the PUCCH to the channel equalization unit 321 for the PUCCH.

The channel estimation unit 317 estimates the change in the channel using the DM RS separated by the subcarrier demapping unit 315 and the known signal. The channel estimation unit 317 outputs estimated channel estimation values to the channel equalization unit 319 for the PUSCH and the channel equalization unit 321 for the PUCCH. The channel equalization unit 319 for the PUSCH equalizes the amplitude and phase of the signal of the PUSCH separated by the subcarrier demapping unit 315 on the basis of the channel estimation values input from the channel estimation unit 317. Here, the equalization refers to a process of returning the change in the channel through which a signal is received during radio communication to the origin. The channel equalization unit 319 for the PUSCH outputs the adjusted signal to the IDFT unit 323.

The IDFT unit 323 performs inverse discrete Fourier transform on the signal input from the channel equalization unit 319 for the PUSCH and outputs the signal to the data demodulation unit 325. The data demodulation unit 325 demodulates the signal of the PUSCH transformed by the IDFT unit 323 and outputs the demodulated signal of the PUSCH to the turbo decoding unit 327. The demodulation is demodulation corresponding to a demodulation scheme used in a data modulation unit of the mobile station device 5 and the demodulation scheme is input from the control unit 105. The turbo decoding unit 327 decodes the information data from the signal of the PUSCH input and demodulated by the data demodulation unit 325. The coding rate is input from the control unit 105.

The channel equalization unit 321 for the PUCCH equalizes the amplitude and phase of the signal of the PUCCH separated by the subcarrier demapping unit 315 on the basis of the channel estimation values input from the channel estimation unit 317. The channel equalization unit 321 for the PUCCH outputs the equalized signal to the physical uplink control channel detection unit 329.

The physical uplink control channel detection unit 329 demodulates and decodes the signal input from the channel equalization unit 321 for the PUCCH to detect the UCI. The physical uplink control channel detection unit 329 performs a process of separating the signal subjected to the coding and multiplexing in the frequency domain and/or the time domain. The physical uplink control channel detection unit 329 performs a process of detecting the ACK/NACK, the SR, and the CQI from the signal of the PUCCH coded and multiplexed in the frequency domain and/or the time domain using the code sequence used on the transmission side. Specifically, the physical uplink control channel detection unit 329 multiplies the signal for each subcarrier of the PUCCH by each code of the code sequence, and then combines the signals multiplied by the codes as the detection process using the code sequence in the frequency domain, that is, the process of separating the signal coded and multiplexed in the frequency domain. Specifically, the physical uplink control channel detection unit 329 multiplies the signal for each SC-FDMA symbol of the PUCCH by each code of the code sequence, and then combines the signals multiplied by the codes as the detection process using the code sequence in the time domain, that is, the process of separating the signal coded and multiplexed in the time domain. The physical uplink control channel detection unit 329 sets the detection process for the signal of the PUCCH on the basis of the control signal from the control unit 105.

The SRS processing unit 333 measures channel quality using the SRS input from the subcarrier demapping unit 315 and outputs a measurement result of the channel quality of the UL PRB (the UL PRB pair) to the control unit 105. The SRS processing unit 333 is instructed whether to measure the channel quality of the mobile station device 5 in regard to the signal of the certain UL PRB (the UL PRB pair) from the control unit 105. The SRS processing unit 333 detects the synchronization deviation of the uplink using the SRS input from the subcarrier demapping unit 315 and outputs information (synchronization deviation information) indicating the synchronization deviation of the uplink to the control unit 105. The SRS processing unit 333 may perform a process of detecting the synchronization deviation of the uplink from the received signal of the time domain. As a specific process, the same process as a process performed by the preamble detection unit 331 to be described below may be performed.

The preamble detection unit 331 performs a process of detecting (receiving) a preamble transmitted in regard to the received signal corresponding to the PRACH on the basis of the signal input from the A/D unit 303. Specifically, the preamble detection unit 331 performs a correlation process on the received signals of various timings within a guard time with a signal of a replica for which there is a probability of transmission and which is generated using each preamble sequence. For example, when a correlation value is greater than a threshold value set in advance, the preamble detection unit 331 determines that the same signal as the preamble sequence used to generate the signal of the replica used for the correlation process is transmitted from the mobile station device 5. The preamble detection unit 331 determines that the timing with the highest correlation value is an arrival timing of the preamble sequence. Then, the preamble detection unit 331 generates preamble detection information including at least information indicating the detected preamble sequence and information indicating the arrival timing and outputs the preamble detection information to the control unit 105.

The control unit 105 controls the subcarrier demapping unit 315, the data demodulation unit 325, the turbo decoding unit 327, the channel estimation unit 317, and the physical uplink control channel detection unit 329 on the basis of the control information (DCI) transmitted using the PDCCH and the control information (RRC signaling) transmitted using the PDSCH to the mobile station device 5 by the base station device 3. On the basis of the control information transmitted to the mobile station device 5 by the base station device 3, the control unit 105 comprehends which resources (the uplink subframe and UL PRB (UL PRB pair), the code sequence of the frequency domain, and the code sequence of the time domain) configure the PRACH, the PUSCH, the PDCCH, and the SRS transmitted (likely to be transmitted) by each mobile station device 5.

<Overall Configuration of Mobile Station Device 5>

Figure 4:
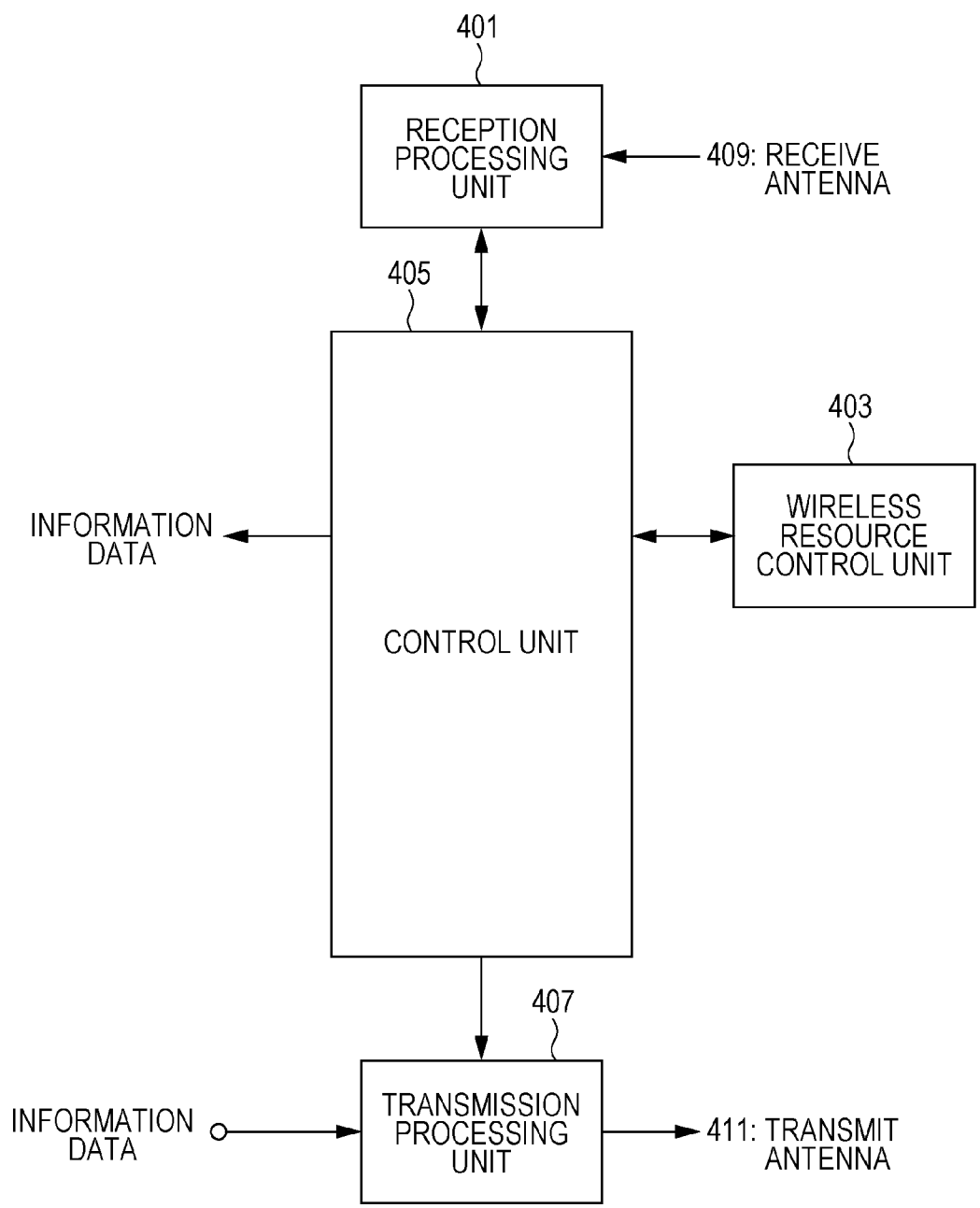
FIG. 4 is a schematic block diagram illustrating the configuration of a mobile station device 5 according to the embodiment of the present invention.
Figure 5:
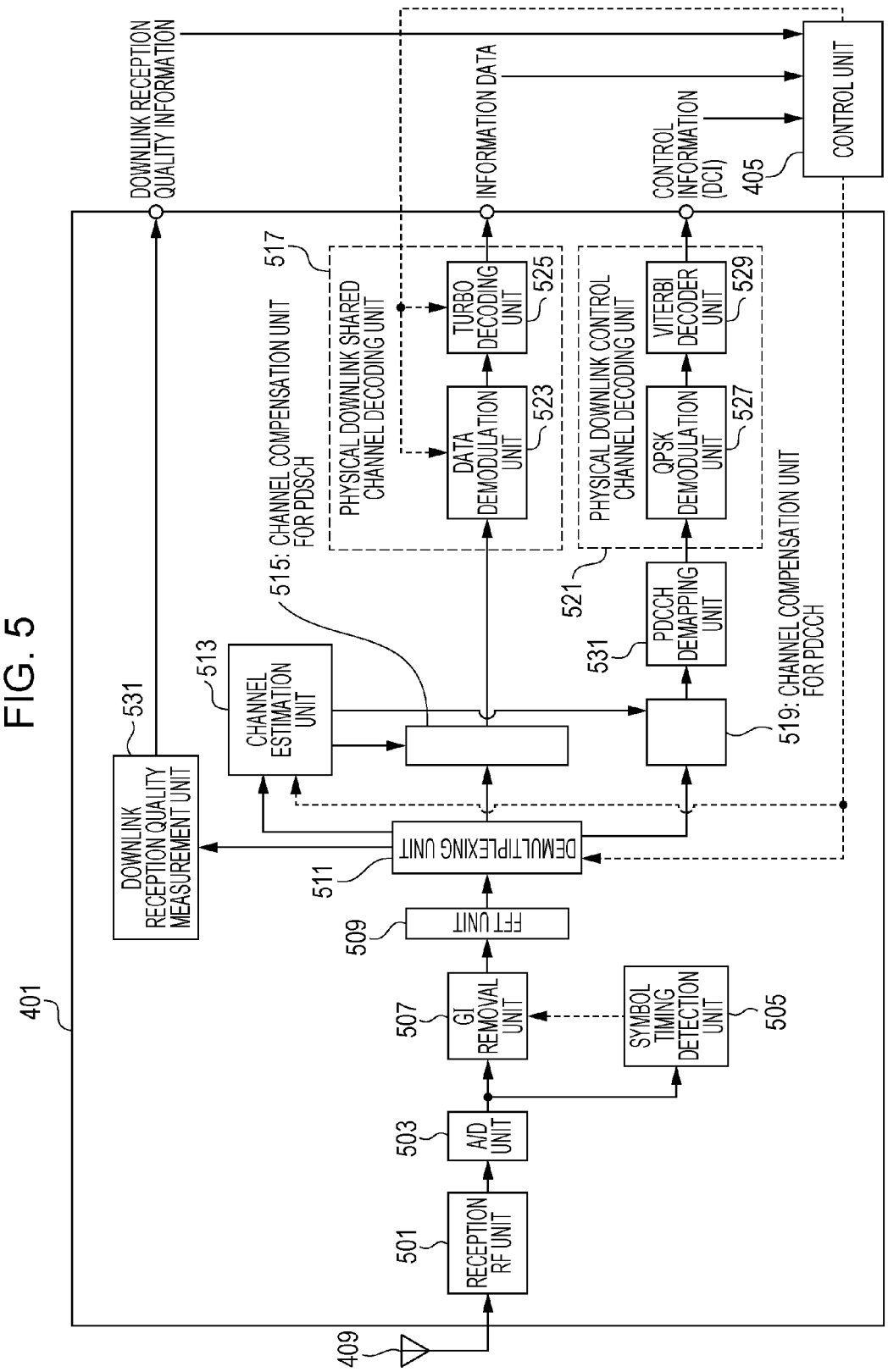
FIG. 5 is a schematic block diagram illustrating the configuration of a reception processing unit 401 of the mobile station device 5 according to the embodiment of the present invention.

Hereinafter, the configuration of the mobile station device 5 according to the embodiment will be described with reference to FIGS. 4, 5, and 6. FIG. 4 is a schematic block diagram illustrating the configuration of the mobile station device 5 according to the embodiment of the present invention. As illustrated in the drawing, the mobile station device 5 is configured to include a reception processing unit (first reception processing unit) 401, a radio resource control unit (first radio resource control unit) 403, a control unit (first control unit) 405, and a transmission processing unit (first transmission processing unit) 407.

The reception processing unit 401 receives the signal from the base station device 3, and demodulates and decodes the received signal according to an instruction from the control unit 405. When the reception processing unit 401 detects the signal of the PDCCH (the first PDCCH or the second PDCCH) destined for the self-device, the reception processing unit 401 decodes the signal of the PDCCH and outputs the acquired DCI to the control unit 405. For example, the reception processing unit 401 performs a process of detecting the second PDCCH destined for the self-device in the search space in the second PDCCH region designated from the base station device 3. For example, the reception processing unit 401 sets the search space in candidates of the eCCE aggregation number and performs the process of detecting the second PDCCH destined for the self-device. For example, the reception processing unit 401 performs a process of estimating a channel using the UE-specific RS in the second PDCCH region designated from the base station device 3, demodulating the signal of the second PDCCH, and detecting a signal including the control information destined for the self-device. For example, the reception processing unit 401 performs a process of recognizing the transmit antenna (antenna port) corresponding to the UE-specific RS used to demodulate the signal of each eCCE in the DL PRB pair of the second PDCCH region according to the combination of each eCCE in the DL PRB pair of the second PDCCH region and the corresponding antenna port, which is reported from the base station device 3, and detecting the signal including the control information destined for the self-device.

The reception processing unit 401 outputs the information data obtained by decoding the PDSCH destined for the self-device to a higher layer through the control unit 405 on the basis of an instruction from the control unit 405 after the DCI included in the PDCCH is output to the control unit 405. The downlink assignment in the DCI included in the PDCCH includes information indicating the assignment of the resource of the PDSCH. The reception processing unit 401 outputs the control information generated by the radio resource control unit 103 of the base station device 3 and obtained by decoding the PDSCH to the control unit 405 and outputs the control information to the radio resource control unit 403 of the self-device through the control unit 405. For example, the control information generated by the radio resource control unit 103 of the base station device 3 includes the information indicating the DL PRB pair of the second PDCCH region, the information (the information indicating the first physical resource mapping or the second physical resource mapping) indicating the physical resource mapping of the second PDCCH region, and the information indicating the combination of each eCCE in the DL PRB pair and the corresponding antenna port (the first combination, the second combination, the third combination, or the fourth combination).

The reception processing unit 401 outputs a Cyclic Redundancy Check (CRC) code included in the PDSCH to the control unit 405. While omitted in the description of the base station device 3, the transmission processing unit 107 of the base station device 3 generates the CRC code from the information data and transmits the information data and the CRC code with the PDSCH. The CRC code is used to determine whether there is an error in the data included in the PDSCH. For example, when information generated from data using a generation polynomial determined in advance in the mobile station device 5 is the same as the CRC code generated in the base station device 3 and transmitted with the PDSCH, it is determined that there is no error in the data. Conversely, when the information generated from data using the generation polynomial determined in advance in the mobile station device 5 is different from the CRC code generated in the base station device 3 and transmitted with the PDSCH, it is determined that there is an error in the data.

The reception processing unit 401 measures reception quality (RSRP: Reference Signal Received Power) of the downlink and outputs a measurement result to the control unit 405. The reception processing unit 401 measures (calculates) the RSRP from the CRS or the CSI-RS on the basis of an instruction from the control unit 405. The details of the reception processing unit 401 will be described below.

The control unit 405 confirms the data transmitted using the PDSCH from the base station device 3 and input from the reception processing unit 401, outputs the information data in the data to a higher layer, and controls the reception processing unit 401 and the transmission processing unit 407 on the basis of the control information generated by the radio resource control unit 103 of the base station device 3 in the data. The control unit 405 controls the reception processing unit 401 and the transmission processing unit 407 on the basis of an instruction from the radio resource control unit 403. For example, the control unit 405 performs control such that the reception processing unit 401 performs a process of detecting the second PDCCH on the signal in the DL PRB pair of the second PDCCH region instructed from the radio resource control unit 403. For example, the control unit 405 performs the control such that the reception processing unit 401 demaps the physical resource of the second PDCCH region on the basis of the information indicating the physical resource mapping of the second PDCCH region instructed from the radio resource control unit 403. Here, the demapping of the physical resource of the second PDCCH region means a process of configuring (forming, constructing, or generating) the second PDCCH candidates on which the detection process is performed from the signal in the second PDCCH region, for example, as illustrated in FIGS. 22 and 23. The control unit 405 controls the region on which the process of detecting the second PDCCH in the second PDCCH region in regard to the reception processing unit 401. Specifically, the control unit 405 gives (sets) an instruction of the eCCE aggregation number for setting the search space, the first eCCE number on which the process of detecting the second PDCCH in the second PDCCH region is performed, and the number of second PDCCH candidates in each second PDCCH region for each eCCE aggregation number to the reception processing unit 401. The control unit 405 performs control such that the reception processing unit 401 uses the UE-specific RS of the transmit antenna (antenna port) corresponding to the demodulation of the signal of each eCCE on the basis of the combination of each eCCE in the DL PRB pair and the corresponding antenna port (a correspondence relation between each eCCE in the DL PRB pair and the transmit antenna of the corresponding UE-specific RS), which is instructed from the radio resource control unit 403.

The control unit 405 controls the reception processing unit 401 and the transmission processing unit 407 on the basis of the DCI transmitted using the PDCCH from the base station device 3 and input from the reception processing unit 401. Specifically, the control unit 405 controls the reception processing unit 401 mainly on the basis of the detected downlink assignment and controls the transmission processing unit 407 on the basis of the detected uplink grant. The control unit 405 controls the transmission processing unit 407 on the basis of control information indicating a transmission power control command of the PUCCH included in the downlink assignment. The control unit 405 compares the information generated using the generation polynomial determined in advance from the data input from the reception processing unit 401 to the CRC code input from the reception processing unit 401, determines whether there is an error in the data, and generates the ACK/NACK. The control unit 405 generates the SR and the CQI on the basis of an instruction from the radio resource control unit 403. The control unit 405 controls a transmission timing of a signal of the transmission processing unit 407 on the basis of an adjustment value or the like of a transmission timing of the uplink reported from the base station device 3. The control unit 405 performs control such that the transmission processing unit 407 transmits information indicating the reception quality (RSRP) of the downlink input from the reception processing unit 401. While omitted in the description of the base station device 3, the base station device 3 may set candidates of the eCCE aggregation number in the reception quality (RSRP) of the downlink reported from the mobile station device 5 in the mobile station device 5. For example, the base station device 3 may set the eCCE aggregation 1, the eCCE aggregation 2, and the eCCE aggregation 4 as the candidates of the eCCE aggregation number of the localized ePDCCH in the mobile station device 5 (the mobile station device near the center of the cell) with good reception quality of the downlink. For example, the base station device 3 may set the eCCE aggregation 2 and the eCCE aggregation 4 as the candidates of the eCCE aggregation number of the localized ePDCCH in the mobile station device 5 (the mobile station device near an edge of the cell) of which the reception quality of the downlink is not good.

The radio resource control unit 403 stores and retains the control information generated by the radio resource control unit 103 of the base station device 3 and reported from the base station device 3 and controls the reception processing unit 401 and the transmission processing unit 407 through the control unit 405. That is, the radio resource control unit 403 has a function of a memory retaining various parameters or the like. For example, the radio resource control unit 403 retains the information regarding the DL PRB pair of the second PDCCH region, the information regarding the physical resource mapping of the second PDCCH region, and the information regarding the combination (the first combination, the second combination, the third combination, or the fourth combination) of each eCCE in the DL PRB pair of the second PDCCH region and the corresponding antenna port and outputs various control signals to the control unit 405. The radio resource control unit 403 retains parameters associated with the transmission power of the PUSCH, the PUCCH, the SRS, and the PRACH and outputs a control signal to the control unit 405 so that the parameters reported from the base station device 3 can be used.

The radio resource control unit 403 sets the values of the parameters associated with the transmission power of the PUCCH, the PUSCH, the SRS, the PRACH, and the like. The values of the transmission power set in the radio resource control unit 403 are output to the transmission processing unit 407 by the control unit 405. The DM RS configured by the resources in the same UL PRB as the PUCCH is subjected to the same transmission power control as the PUCCH. The DM RS configured by the resources in the same UL PRB as the PUSCH is subjected to the same transmission power control as the PUSCH. The radio resource control unit 403 sets, in the PUSCH, the values of a parameter based on the number of UL PRB pairs assigned to the PUSCH, parameters unique to the cell reported in advance from the base station device 3 and unique to the mobile station device, a parameter based on the modulation scheme used for the PUSCH, a parameter based on the value of an estimated path loss, a parameter based on the transmission power control command reported from the base station device 3, and the like. The radio resource control unit 403 sets, in the PUCCH, the values of a parameter based on the signal configuration of the PUCCH, parameters unique to the cell reported in advance from the base station device 3 and unique to the mobile station device, a parameter based on an estimated path loss, a parameter based on the reported transmission power control command, and the like.

The parameters unique to the cell and unique to the mobile station device are reported as the parameters associated with the transmission power using the PUSCH from the base station device 3 and the transmission power control command is reported using the PUCCH from the base station device 3. The transmission power control command for the PUSCH is included in the uplink grant and the transmission power control command for the PUCCH is included in the downlink assignment. The various parameters associated with the transmission power and reported from the base station device 3 are appropriately stored in the radio resource control unit 403 and the stored values are input to the control unit 405.

The transmission processing unit 407 transmits the information data and the signal coded and modulated from the UCI using the resources of the PUSCH and the PUCCH to the base station device 3 through the transmit antenna 411 according to an instruction from the control unit 405. The transmission processing unit 407 sets the transmission power of the PUSCH, the PUCCH, the SRS, the DM RS, and the PRACH according to an instruction from the control unit 405. The details of the transmission processing unit 407 will be described below.

<Reception Processing Unit 401 of Mobile Station Device 5>

Hereinafter, the details of the reception processing unit 401 of the mobile station device 5 will be described. FIG. 5 is a schematic block diagram illustrating the configuration of the reception processing unit 401 of the mobile station device 5 according to the embodiment of the present invention. As illustrated in the drawing, the reception processing unit 401 is configured to include a reception RF unit 501, an A/D unit 503, a symbol timing detection unit 505, a GI removal unit 507, an FFT unit 509, a demultiplexing unit 511, a channel estimation unit 513, a channel compensation unit 515 for the PDSCH, a physical downlink shared channel decoding unit 517, a channel compensation unit 519 for the PDCCH, a physical downlink control channel decoding unit 521, a downlink reception quality estimation unit 531, and a PDCCH demapping unit 533. As illustrated in the drawing, the physical downlink shared channel decoding unit 517 includes a data demodulation unit 523 and a turbo decoding unit 525. As illustrated in the drawing, the physical downlink control channel decoding unit 521 includes a QPSK demodulation unit 527 and a viterbi decoder unit 529.

The reception RF unit 501 appropriately amplifies the signal received through the receive antenna 409, converts (converts down) the frequency into an intermediate frequency, removes an unnecessary frequency component, controls an amplification level so that a signal level is appropriately maintained, and performs orthogonal demodulation on the basis of the in-phase component and the orthogonal component of the received signal. The reception RF unit 501 outputs the analog signal subjected to the orthogonal demodulation to the A/D unit 503.

The A/D unit 503 converts the analog signal subjected to the orthogonal demodulation by the reception RF unit 501 into a digital signal and outputs the converted digital signal to the symbol timing detection unit 505 and the GI removal unit 507. The symbol timing detection unit 505 detects timings of the symbols on the basis of the digital signal converted by the A/D unit 503 and outputs a control signal indicating the detected timing of a symbol boundary to the GI removal unit 507. The GI removal unit 507 removes a portion corresponding to the guard interval from the digital signal output from the A/D unit 503 on the basis of the control signal from the symbol timing detection unit 505 and outputs a signal of the remaining portion to the FFT unit 509. The FFT unit 509 performs fast Fourier transform on the signal input from the GI removal unit 507, performs demodulation according to an OFDM scheme, and outputs the signal to the demultiplexing unit 511.

The demultiplexing unit 511 separates the signal demodulated by the FFT unit 509 into the signals of the PDCCH (the first PDCCH or the second PDCCH) and the signal of the PDSCH on the basis of the control signal input from the control unit 405. The demultiplexing unit 511 outputs the separated signal of the PDSCH to the channel compensation unit 515 for the PDSCH and outputs the separated signal of the PDCCH to the channel compensation unit 519 for the PDCCH. For example, the demultiplexing unit 511 outputs the signal of the second PDCCH of the second PDCCH region designated in the self-device to the channel compensation unit 519 for the PDCCH. The demultiplexing unit 511 separates the downlink resource elements in which the downlink reference signals are disposed and outputs the downlink reference signals (the CRS and the UE-specific RS) to the channel estimation unit 513. For example, the demultiplexing unit 511 outputs the UE-specific RS of the second PDCCH region designated in the self-device to the channel estimation unit 513. The demultiplexing unit 511 outputs the downlink reference signals (the CRS and the CSI-RS) to the downlink reception quality estimation unit 531.

The channel estimation unit 513 estimates the change in the channel using the downlink reference signals separated by the demultiplexing unit 511 and the known signals and outputs channel compensation values for adjusting the amplitude and the phase so that the change in the channel is compensated to the channel compensation unit 515 for the PDSCH and the channel compensation unit 519 for the PDCCH. The channel estimation unit 513 estimates the change in the channel independently using each of the CRS and the UE-specific RS and outputs the channel compensation value. For example, the channel estimation unit 513 generates the channel compensation values from the channel estimation values estimated using the UE-specific RSs disposed in the plurality of DL PRB pairs in the second PDCCH region designated in the self-device and outputs the channel compensation values to the channel compensation unit 519 for the PDCCH. The channel estimation unit 513 generates the channel estimation values and the channel compensation values using the UE-specific RSs of each transmit antenna (antenna port) designated from the control unit 405. For example, the channel estimation unit 513 generates the channel compensation values from the channel estimation paths estimated using the UE-specific RSs disposed in the plurality of DL PRB pairs assigned in the self-device and assigned in the PDSCHs and outputs the channel compensation values to the channel compensation unit 515 for the PDSCH. For example, the channel estimation unit 513 generates the channel compensation values from the channel estimation values estimated using the CRS and outputs the channel compensation values to the channel compensation unit 519 for the PDCCH. For example, the channel estimation unit 513 generates the channel compensation values from the channel estimation values estimated using the CRS and outputs the channel compensation values to the channel compensation unit 515 for the PDSCH.

The channel compensation unit 515 for the PDSCH adjusts the amplitude and the phase of the signal of the PDSCH separated by the demultiplexing unit 511 according to the channel compensation values input from the channel estimation unit 513. For example, the channel compensation unit 515 for the PDSCH adjusts the signal of the certain PDSCH according to the channel compensation values generated on the basis of the UE-specific RS by the channel estimation unit 513 and adjust the signal of another PDSCH according to the channel compensation values generated on the basis of the CRS by the channel estimation unit 513. The channel compensation unit 515 for the PDSCH outputs the signal for which the channel is adjusted to the data demodulation unit 523 of the physical downlink shared channel decoding unit 517.

The physical downlink shared channel decoding unit 517 demodulates and decodes the PDSCH on the basis of an instruction from the control unit 405 to detect the information data. The data demodulation unit 523 demodulates the signal of the PDSCH input from the channel compensation unit 515 and outputs the demodulated signal of the PDSCH to the turbo decoding unit 525. The demodulation is demodulation corresponding to a modulation scheme used in the data modulation unit 221 of the base station device 3. The turbo decoding unit 525 decodes the information data from the signal of the PDSCH input and demodulated from the data demodulation unit 523 and outputs the information data to a higher layer through the control unit 405. The control information or the like transmitted using the PDSCH and generated by the radio resource control unit 103 of the base station device 3 is also output to the control unit 405 and is also output to the radio resource control unit 403 through the control unit 405. The CRC code included in the PDSCH is also output to the control unit 405.

The channel compensation unit 519 for the PDCCH adjusts the amplitude and the phase of the signal of the PDCCH separated by the demultiplexing unit 511 according to the channel compensation values input from the channel estimation unit 513. For example, the channel compensation unit 519 for the PDCCH adjusts the signal of the second PDCCH according to the channel compensation values generated on the basis of the UE-specific RS by the channel estimation unit 513 and adjusts the signal of the first PDCCH according to the channel compensation values generated on the basis of the CRS by the channel estimation unit 513. For example, the channel compensation unit 519 for the PDCCH adjusts the signal of each eCCE in the DL PRB pair of the second PDCCH region according to the channel compensation values designated from the control unit 405 and generated on the basis of the UE-specific RS of the transmit antenna (antenna port) corresponding to each eCCE. The channel compensation unit 519 for the PDCCH outputs the adjusted signal to the PDCCH demapping unit 533.

The PDCCH demapping unit 533 performs demapping for the first PDCCH or demapping for the second PDCCH on the signal input from the channel compensation unit 519 for the PDCCH. Further, the PDCCH demapping unit 533 performs demapping for the first physical resource mapping or demapping for the second physical resource mapping on the signal of the second PDCCH input from the channel compensation unit 519 for the PDCCH. The PDCCH demapping unit 533 converts the input signal of the first PDCCH into the signal in CCE units, as described with reference to FIG. 16, so that the input signal of the first PDCCH is processed in CCE units illustrated in FIG. 15 by the physical downlink control channel decoding unit 521. The PDCCH demapping unit 533 converts the input signal of the second PDCCH into the signal in eCCE units so that the input signal of the second PDCCH is processed in eCCE units illustrated in FIG. 18 by the physical downlink control channel decoding unit 521. The PDCCH demapping unit 533 converts the input signal of the second PDCCH of the second PDCCH region, to which the first physical resource mapping is applied, into the signal in eCCE units, as described with reference to FIG. 22. The PDCCH demapping unit 533 converts the input signal of the second PDCCH of the second PDCCH region, to which the second physical resource mapping is applied, into the signal in eCCE units, as described with reference to FIG. 23. The PDCCH demapping unit 533 outputs the converted signal to the QPSK demodulation unit 527 of the physical downlink control channel decoding unit 521.

The physical downlink control channel decoding unit 521 demodulates and decodes the signal input from the channel compensation unit 519 for the PDCCH to detect the control data in the following way. The QPSK demodulation unit 527 performs the QPSK demodulation on the signal of the PDCCH and outputs the signal to the viterbi decoder unit 529. The viterbi decoder unit 529 decodes the signal demodulated by the QPSK demodulation unit 527 and outputs the decoded DCI to the control unit 405. Here, this signal is expressed in units of bits and the viterbi decoder unit 529 also performs rate dematching on the input bits to adjust the number of bits to be subjected to a viterbi decoding process.

First, the process of detecting the first PDCCH will be described. The mobile station device 5 performs a process of detecting the DCI destined for the self-device assuming the plurality of CCE aggregation numbers. The mobile station device 5 performs a decoding process different for each of the assumed CCE aggregation numbers (coding rates) on the signal of the first PDCCH to acquire the DCI included in the first PDCCH in which an error is not detected in the CRC code added to the first PDCCH along with the DCI. This process is referred to as blind decoding. The mobile station device 5 does not perform the blind decoding assuming the first PDCCH on the signals (received signals) of all the CCEs (REGs) of the downlink system band, but performs the blind decoding only some of the CCEs. Some of the CCEs subjected to the blind decoding are referred to as search spaces (search spaces for the first PDCCH or search spaces in the first PDCCH region). The search space (the search space for the first PDCCH or the search space in the first PDCCH region) different for each CCE aggregation number is defined. In the communication system 1 according to the embodiment of the present invention, each different search space (the search space for the first PDCCH or the search space in the first PDCCH region) is set for the first PDCCH in the mobile station device 5. Here, the search space (the search space for the first PDCCH or the search space in the first PDCCH region) for the first PDCCH of each mobile station device 5 may be configured by completely different CCEs, may be configured by the completely identical CCEs, or may be configured by the CCEs of which some overlap.

Next, a process of detecting the second PDCCH will be described. The mobile station device 5 performs a process of detecting the DCI destined for the self-device assuming the plurality of eCCE aggregation numbers. The mobile station device 5 performs a different decoding process for each of the assumed eCCE aggregation numbers (coding rates) on the signal of the second PDCCH to acquire the DCI included in the second PDCCH in which an error is not detected in the CRC code added to the second PDCCH along with the DCI. This process is referred to as blind decoding. The mobile station device 5 does not perform the blind decoding assuming the second PDCCH on the signals (received signals) of all the eCCEs of the second PDCCH regions configured from the base station device 3, but may perform the blind decoding on only some of the eCCEs. Some of the eCCEs subjected to the blind decoding are referred to as search spaces (search spaces for the second PDCCH). The search space (the search space for the second PDCCH) different for each eCCE aggregation number is defined. In the mobile station device 5 for which the plurality of second PDCCH regions are configured, the search space is set (configured or defined) in each of the configured second PDCCH regions. In the mobile station device 5, the search space is set in each of the second PDCCH region to which the first physical resource mapping is applied and the second PDCCH region to which the second physical resource mapping is applied. In the mobile station device 5 for which the plurality of second PDCCH regions are configured, the plurality of search spaces are set simultaneously in the certain downlink subframe.

In the communication system 1 according to the embodiment of the present invention, each different search space (the search space for the second PDCCH) is set in the second PDCCH in the mobile station device 5. Here, the search space (the search space for the second PDCCH) for the second PDCCH of each mobile station device 5 in which the same second PDCCH region is configured may be configured by completely different eCCEs, may be configured by the completely identical eCCEs, or may be configured by the eCCEs of which some overlap.

In the mobile station device 5 for which the plurality of second PDCCH regions are configured, the search space (the search space of the second PDCCH) is set in each of the second PDCCH regions. The search space (the search space for the second PDCCH) means a logical region in which the mobile station device 5 performs the decoding and detection of the second PDCCH in the second PDCCH region. The search space (the search space for the second PDCCH) is configured by the plurality of second PDCCH candidates. The second PDCCH candidate is a target on which the mobile station device 5 performs the decoding detection of the second PDCCH. The second PDCCH candidate different for each eCCE aggregation number is configured by different eCCEs (including one eCCE and the plurality of eCCEs). The eCCEs configuring the plurality of second PDCCH candidates of the search spaces (the search spaces for the second PDCCH) of the second PDCCH regions to which the first physical resource mapping is applied are configured by the plurality of eCCEs of which the eCCE numbers continue. The first eCCE number used for the search space (the search space for the second PDCCH) in the second PDCCH region is set for each mobile station device 5. The eCCEs configuring the plurality of second PDCCH candidates of the search spaces (the search spaces for the second PDCCH) of the second PDCCH regions to which the second physical resource mapping is applied are configured by the plurality of eCCEs of which the eCCE numbers do not continue. The first eCCE number used for the search space (the search space for the second PDCCH) in the second PDCCH region is set for each mobile station device 5 or each second PDCCH region. For example, the first eCCE number used for the search space (the search space for the second PDCCH) is set by a random function using an identifier (mobile station identifier) assigned to the mobile station device 5. For example, the base station device 3 notifies the mobile station device 5 of the first eCCE number used for the search space (the search space for the second PDCCH) using the RRC signaling.

In the search spaces (the search spaces for the second PDCCH) of the plurality of second PDCCH regions, the number of second PDCCH candidates may be different. The number of second PDCCH candidates of the search spaces (the search spaces for the second PDCCH) of the second PDCCH regions to which the first physical resource mapping is applied may be greater than the number of second PDCCH candidates of the search spaces (the search spaces for the second PDCCH) of the second PDCCH regions to which the second physical resource mapping is applied.

In a certain eCCE aggregation number, the number of second PDCCH candidates of the search spaces (the search spaces for the second PDCCH) of the second PDCCH regions to which the first physical resource mapping is applied may be the same as the number of second PDCCH candidates of the search spaces (the search spaces for the second PDCCH) of the second PDCCH regions to which the second physical resource mapping is applied. In another eCCE aggregation number, the number of second PDCCH candidates of the search spaces (the search spaces for the second PDCCH) of the second PDCCH regions to which the first physical resource mapping is applied may be different from the number of second PDCCH candidates of the search spaces (the search spaces for the second PDCCH) of the second PDCCH regions to which the second physical resource mapping is applied.

The second PDCCH candidates of a certain eCCE aggregation number may be set in the search spaces (the search spaces for the second PDCCH) of one-side second PDCCH region and may not be set in the search spaces (the search spaces for the second PDCCH) of the other-side second PDCCH regions.

The number of the second PDCCH candidates of the search space (the search space for the second PDCCH) in one second PDCCH region may be varied according to the number of second PDCCH regions configured in the mobile station device 5. For example, as the number of second PDCCH regions configured in the mobile station device 5 increases, the number of second PDCCH candidates of the search space (the search space for the second PDCCH) in one second PDCCH region decreases.

The mobile station device 5 sets the search spaces corresponding to the candidates of the eCCE aggregation number in the second PDCCH regions to which the first physical resource mapping is applied. The mobile station device 5 recognizes the transmit antenna (antenna port) used to transmit the signal of each eCCE in the DL PRB pair of the second PDCCH region according to the combination (the correspondence relation between each eCCE in the DL PRB pair of the second PDCCH region and the antenna port (transmit antenna) corresponding to each eCCE) of each eCCE in the DL PRB pair and the corresponding antenna port, which is reported from the base station device 3.

The control unit 405 determines whether there is no error in the DCI input from the viterbi decoder unit 529 and the DCI is the DCI destined for the self-device. When the control unit 405 determines that there is no error and the DCI is the DCI destined for the self-device, the control unit 405 controls the demultiplexing unit 511, the data demodulation unit 523, the turbo decoding unit 525, and the transmission processing unit 407 on the basis of the DCI. For example, when the DCI is the downlink assignment, the control unit 405 performs control such that the signal of the PDSCH is decoded in the reception processing unit 401. The PDCCH also includes the CRC code as in the PDSCH, and the control unit 405 determines whether there is no error in the DCI of the PDCCH using the CRC code.

The downlink reception quality estimation unit 531 measures the reception quality (RSRP) of the downlink of the cell using the downlink reference signals (the CRS and the CSI-RS) and outputs information regarding the measured reception quality of the downlink to the control unit 405. The downlink reception quality estimation unit 531 measures instantaneous channel quality to generate the CQI of which the mobile station device 5 notifies the base station device 3. The downlink reception quality estimation unit 531 outputs information regarding the measured RSRP or the like to the control unit 405.

<Transmission Processing Unit 407 of Mobile Station Device 5>

Figure 6:
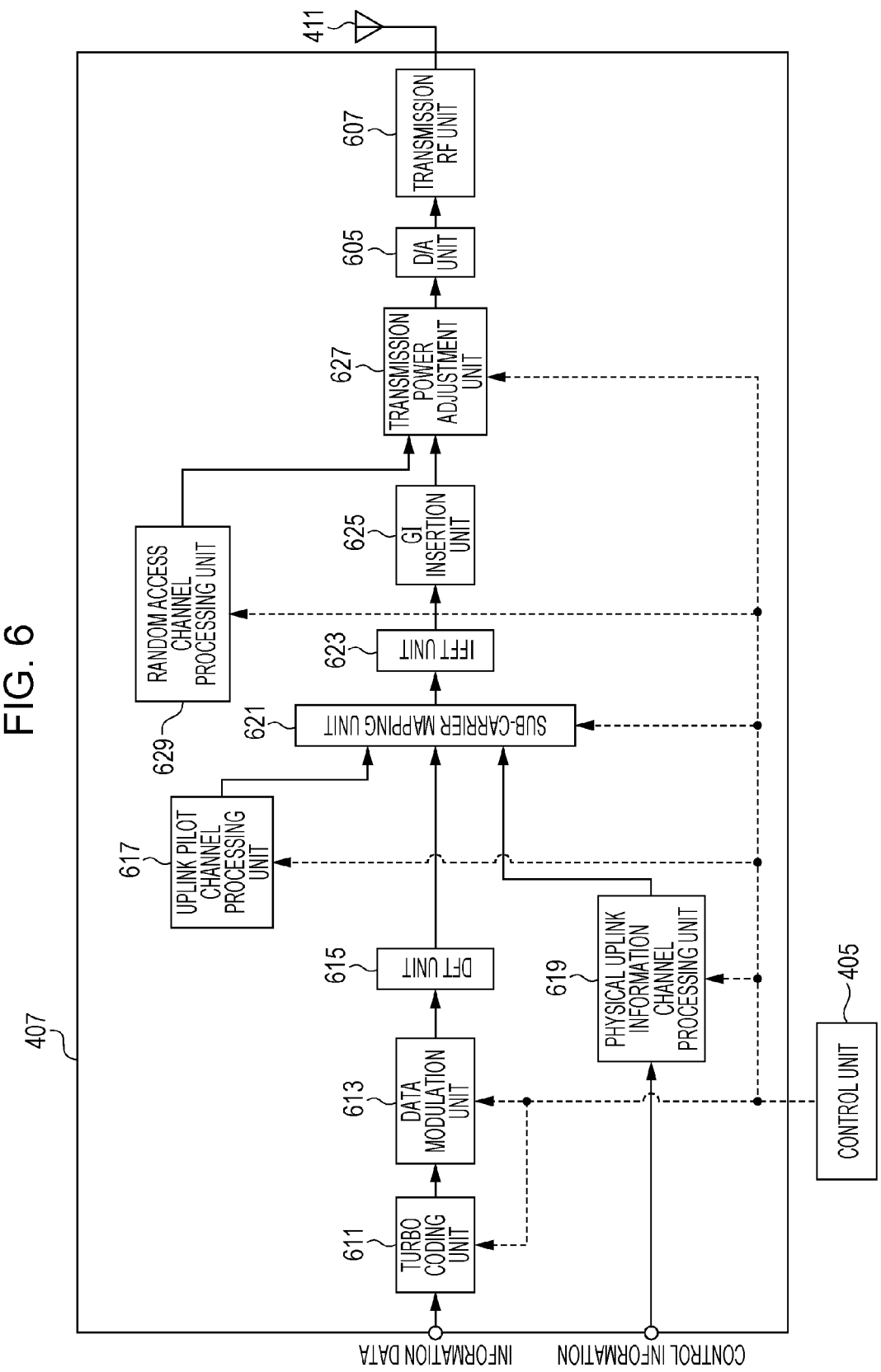
FIG. 6 is a schematic block diagram illustrating the configuration of a transmission processing unit 407 of the mobile station device 5 according to the embodiment of the present invention.

FIG. 6 is a schematic block diagram illustrating the configuration of the transmission processing unit 407 of the mobile station device 5 according to the embodiment of the present invention. As illustrated in the drawing, the transmission processing unit 407 is configured to include a turbo coding unit 611, a data modulation unit 613, a DFT unit 615, an uplink pilot channel processing unit 617, a physical uplink control channel processing unit 619, a subcarrier mapping unit 621, an IFFT unit 623, a GI inversion unit 625, a transmission power adjustment unit 627, a random access channel processing unit 629, a D/A unit 605, a transmission RF unit 607, and a transmit antenna 411. The transmission processing unit 407 codes and modulates the information data and the UCI, generates signals to be transmitted using the PUSCH and the PUCCH, and adjusts the transmission power of the PUSCH and the PUCCH. The transmission processing unit 407 generates a signal to be transmitted using the PRACH and adjusts the transmission power of the PRACH. The transmission processing unit 407 generates the DM RS and the SRS and adjusts the transmission power of the DM RS and the SRS.

The turbo coding unit 611 performs turbo coding on the input information data to improve data error tolerance at the coding rate instructed from the control unit 405 and outputs the coded information data to the data modulation unit 613. The data modulation unit 613 modulates the data coded by the turbo coding unit 611 according to the modulation scheme instructed from the control unit 405, for example, QPSK, 16 QAM, or 64 QAM, and generates a code sequence of the modulation symbols. The data modulation unit 613 outputs the generated code sequence of the modulation symbols to the DFT unit 615. The DFT unit 615 performs discrete Fourier transform on the signal output by the data modulation unit 613 and outputs the signal to the subcarrier mapping unit 621.

The physical uplink control channel processing unit 619 performs baseband signal processing to transmit the UCI input from the control unit 405. The UCI input to the physical uplink control channel processing unit 619 is the ACK/NACK, the SR, and the CQI. The physical uplink control channel processing unit 619 performs the baseband signal processing and outputs the generated signal to the subcarrier mapping unit 621. The physical uplink control channel processing unit 619 codes information bits of the UCI to generate a signal.

The physical uplink control channel processing unit 619 performs signal processing related to the code multiplexing of the frequency domain and/or the code multiplexing of the time domain on the signal generated from the UCI. The physical uplink control channel processing unit 619 multiples the signal of the PUCCH generated from information bits of the ACK/NACK, information bits of the SR, or information bits of the CQI by a code sequence instructed from the control unit 405 to realize the code multiplexing of the frequency domain. The physical uplink control channel processing unit 619 multiples the signal of the PUCCH generated from the information bits of the ACK/NACK or the information bits of the SR by the code sequence instructed from the control unit 405 to realize the code multiplexing of the time domain.

The uplink pilot channel processing unit 617 generates the SRS and the DM RS which are known signals in the base station device 3 on the basis of an instruction from the control unit 405 and outputs the signals to the subcarrier mapping unit 621.

The subcarrier mapping unit 621 maps the signal input from the uplink pilot channel processing unit 617, the signal input from the DFT unit 615, and the signal input from the physical uplink control channel processing unit 619 to the subcarriers according to an instruction from the control unit 405 and outputs the signals to the IFFT unit 623.

The IFFT unit 623 performs inverse fast Fourier transform on the signal output from the subcarrier mapping unit 621 and outputs the signal to the GI inversion unit 625. Here, the number of points of the IFFT unit 623 is greater than the number of points of the DFT unit 615. The mobile station device 5 uses the DFT unit 615, the subcarrier mapping unit 621, and the IFFT unit 623 to modulate the signal transmitted using the PUSCH according to a DFT spread-OFDM scheme. The GI inversion unit 625 adds a guard interval to the signal input from the IFFT unit 623 and outputs the signal to the transmission power adjustment unit 627.

The random access channel processing unit 629 generates a signal transmitted with the PRACH using a preamble sequence instructed from the control unit 405 and outputs the generated signal to the transmission power adjustment unit 627.

The transmission power adjustment unit 627 adjusts the transmission power in regard to the signal input from the GI inversion unit 625 or the signal input from the random access channel processing unit 629 on the basis of the control signal from the control unit 405 and outputs the signal to the D/A unit 605. In the transmission power adjustment unit 627, average transmission power of the PUSCH, the PUCCH, the DM RS, the SRS, the PRACH is controlled for each uplink subframe.

The D/A unit 605 converts the baseband digital signal input from the transmission power adjustment unit 627 into an analog signal and outputs the analog signal to the transmission RF unit 607. The transmission RF unit 607 generates an in-phase component and an orthogonal component of an intermediate frequency from the analog signal input from the D/A unit 605 and removes an excessive frequency component of an intermediate frequency band. Next, the transmission RF unit 607 converts (converts up) the signal of the intermediate frequency to a signal with a high frequency, removes the excessive frequency component, amplifies its power, and outputs the signal to the base station device 3 through the transmit antenna 411.

Figure 7:
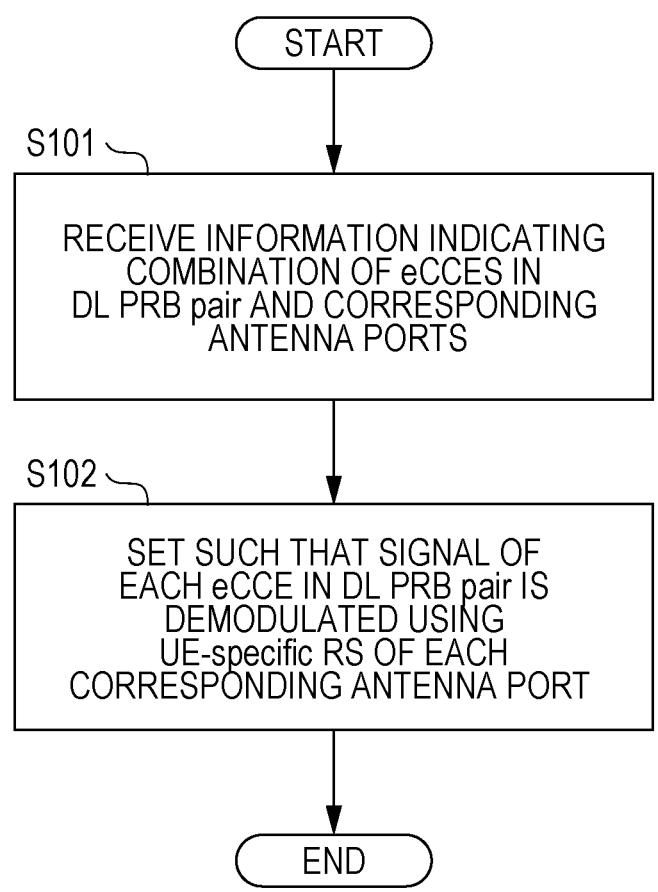
FIG. 7 is a flowchart illustrating an example of a process related to setting of a UE-specific RS used for demodulation of each eCCE in a DLPRB pair of a second PDCCH region of the mobile station device 5 according to the embodiment of the present invention.

FIG. 7 is a flowchart illustrating an example of a process related to setting of a UE-specific RS used for demodulation of each eCCE in a DL PRB pair of a second PDCCH region of the mobile station device 5 according to the embodiment of the present invention. Here, an example of a process in the second PDCCH region to which the first physical resource mapping is applied will be described.

The mobile station device 5 selects the combination of each eCCE in the DL PRB pair and the corresponding antenna port on the basis of at least one of the C-RNTI number assigned to the mobile station device 5, $N_1$ which is the parameter unique to the terminal, and the parameter determining the initial value $C_{init}$ it of the sequence of the UE-specific RSs used to transmit the second PDCCH (step S101). Next, the mobile station device 5 performs setting on the basis of the determined combination such that the signal of each eCCE in the DL PRB pair is demodulated using the UE-specific RS of each corresponding antenna port (step S102).

Figure 8:
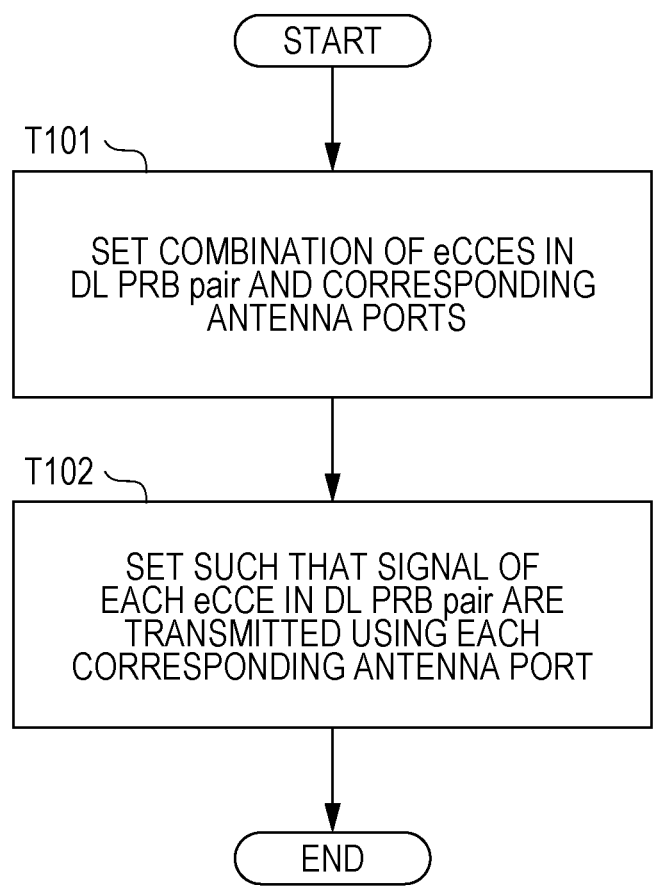
FIG. 8 is a flowchart illustrating an example of a process related to setting of a transmit antenna (antenna port) used for transmission of each eCCE in a DLPRB pair of the second PDCCH region of the base station device 3 according to the embodiment of the present invention.

FIG. 8 is a flowchart illustrating an example of a process related to setting of the transmit antenna (antenna port) used to transmit each eCCE in a DL PRB pair of the second PDCCH region of the base station device 3 according to the embodiment of the present invention. Here, an example of a process in the second PDCCH region to which the first physical resource mapping is applied will be described.

The base station device 3 performs selection on the basis of at least one of the C-RNTI number assigned to the mobile station device 5, $N_1$ which is the parameter unique to the terminal, and the parameter determining the initial value $C_{init}$ of the sequence of the UE-specific RSs used to transmit the second PDCCH (step T101). Next, the base station device 3 performs setting such that the signal of each eCCE in the DL PRB pair is transmitted using each corresponding antenna port (step T102).

In the embodiment of the present invention, as described above, in the communication system 1, the plurality of physical resource block pairs (PRB pairs) are configured as the control channel regions (the second PDCCH regions) (the second PDCCH regions to which the first physical resource mapping is applied) which are the regions in which there is a probability of the control channel (the second PDCCH) being mapped. The first components (the eCCEs) are configured from the resources divided from one physical resource block pair (PRB pair). The control channel (the second PDCCH) (the localized ePDCCH) is configured by the aggregation (eCCE aggregation) of one or more first components (the eCCEs). The plurality of mobile station devices 5 and the base station device 3 communicating with the plurality of mobile station devices 5 using the control channels (the second PDCCCHs) are configured. In regard to the correspondence of the plurality of first components (the eCCEs) in the physical resource block pair (PRB pair) and the plurality of antenna ports used to transmit the signals of the respective first components (the eCCEs), the base station device 3 implicitly sets one of the plurality of combinations in the mobile station device 5. The mobile station device 5 sets the antenna port corresponding to the reference signal (the UE-specific RS) used to demodulate the signal of each first component (eCCE) in the physical resource block pair (PRB pair) on the basis of the combination set by the base station device 3. Thus, the base station device 3 can efficiently control an improvement in the capacity of all of the control channels through the spatial multiplexing on the second PDCCH with application of the MU-MIMO and an improvement in the capacity of all of the control channels by applying the beamforming without application of the MU-MIMO and achieving an improvement in the characteristics of the second PDCCH.

In the embodiment of the present invention, the region of the resource in which there is a probability of the second PDCCH being mapped has been defined as the second PDCCH region to simplify the description. However, even when the region of the resource may be defined to have another meaning, the present invention can be applied as long as the region has a similar meaning.

The mobile station device 5 is not limited to a moving terminal. The present invention may be realized by mounting the function of the mobile station device 5 on a fixed terminal.

The characteristic means of the present invention described above can also be realized by mounting the function on an integrated circuit and controlling the integrated circuit. That is, in an integrated circuit according to the present invention, the plurality of physical resource block pairs are configured as the control channel regions which are the regions in which there is a probability of the control channel being mapped. The first components are configured from the resources divided from one physical resource block pair. The control channel is configured by the aggregation of one or more first components. The integrated circuit is mounted on the mobile station device communicating with the base station device using the control channel. The integrated circuit includes a first radio resource control unit that selects the antenna port corresponding to the reference signal used to demodulate the signal of the first component from the plurality of types of combinations and selects the combination on the basis of at least one of the C-RNTI number assigned to the mobile station device, $N_1$ which is the parameter unique to the terminal, and the parameter determining the initial value $C_{init}$ of the sequence of the UE-specific RSs used to transmit the second PDCCH when the first radio resource control unit selects one combination from the plurality of types of combinations.

In an integrated circuit according to the present invention, the plurality of physical resource block pairs are configured as the control channel regions which are the regions in which there is a probability of the control channel being mapped. The first components are configured from the resources divided from one physical resource block pair. The control channel is configured by the aggregation of one or more first components. The integrated circuit is mounted on the base station device communicating with the plurality of mobile station devices using the control channels. The integrated circuit includes a second radio resource control unit that selects the antenna port used to transmit the first component from the plurality of types of combinations and selects the combination on the basis of at least one of the C-RNTI number assigned to the mobile station device, $N_1$ which is the parameter unique to the terminal, and the parameter determining the initial value $C_{init}$ it of the sequence of the UE-specific RSs used to transmit the second PDCCH when the second radio resource control unit selects one combination from the plurality of types of combinations.

The operation described in the embodiment of the present invention may be realized by a program. A program operating in the mobile station device 5 and the base station device 3 according to the present invention is a program (which is a program functioning a computer) controlling a CPU and the like so that the functions of the foregoing embodiment of the present invention are realized. Information handled by these devices is temporarily accumulated in a RAM when the information is processed. Thereafter, the information is stored in various ROMs or HDDs and is read to be corrected and written by the CPU, as necessary. A recording medium storing a program may be one of a semiconductor medium (for example, a ROM or a nonvolatile memory card), an optical recording medium (for example, a DVD, an MO, an MD, a CD, or a BD), a magnetic recording medium (for example, a magnetic tape or a flexible disk), and the like. The functions of the above-described embodiment are realized by executing a loaded program, and the functions of the present invention are realized in some cases by performing the functions in cooperation with an operating system, another application program, or the like on the basis of an instruction of the program.

When the program is distributed in markets, the program can be stored in a portable recording medium to be distributed or can be transmitted to a connected server computer via a network such as the Internet. In this case, a storage device of the server computer is also included in the present invention. Parts or the entirety of the mobile station device 5 and the base station device 3 according to the above-described embodiment may be realized as an LSI which is typically an integrated circuit. Each of the functional blocks of the mobile station device 5 and the base station device 3 may be individually chipped or some or all of the functional blocks may be integrated to be chipped. A method of forming an integrated circuit is not limited to the LSI, but may be realized with a dedicated circuit or a general processor. When a technology for an integrated circuit substituting the LSI with the advance in the semiconductor technologies appears, an integrated circuit formed by the technology can also be used. Each of the functional blocks of the mobile station device 5 and the base station device 3 may be realized by a plurality of circuits.

Information and signals can be expressed using all of the various other technologies and methods. For example, chips, symbols, bits, signals, information, commands, instructions, and data which can be referred to through the foregoing description can be expressed by voltage, current, electromagnetic waves, magnetic field or magnetic particles, optical field or optical particles, or combinations thereof.

The various exemplary logical blocks, processing units, algorithm steps described in the disclosure of the present invention can be mounted as electronic hardware, computer software, or a combination of both of the electronic hardware and the computer software. To clarify the synonymity of the hardware and software, the functionality of the various exemplary components, blocks, modules, circuits, and steps has been described. Whether the functionality is mounted on hardware or mounted on software depends on design restrictions imposed on an individual application and the entire system. Those skilled in the art can mount the described functionality according to various methods of the respective specific applications, but the determination of the mounting should not be construed to depart from the scope of the present disclosure.

The various exemplary logical blocks and processing units described in the disclosure of the present specification can be mounted or realized by a general-purpose processor, a digital signal processor (DSP), an application-specific integrated circuit (ASIC), a field programmable gate array (FPGA), other programmable logic devices, a discrete gate, a transistor logic, or a discrete hardware component designed to perform the functions described in the present specification or combinations thereof. The general-purpose processor may be a microprocessor. Instead, the processor may also be a processor, a controller, a microcontroller, or a state machine of the related art. The processor may be mounted combining with a computing device. For example, a DSP and a microprocessor, a plurality of microprocessors, a one or more microprocessors connected to DSP core, or other configurations can be combined.

The methods or algorithm steps described in the disclosure of the present specification can be directly embodied by hardware, a software module executed by a processor, or a combination of both of hardware and software module. The software module can be present in a RAM memory, a flash memory, a ROM memory, an EPROM memory, an EEPROM memory, a register, a hard disk, a removable disk, a CD-ROM, or recording media of all the known forms in the present field. A typical recording medium can be combined with a processor so that a processor can read information from the recording medium and writes information on the recording medium. As another method, the recording medium may be integrated with a processor. The processor and the recording medium may be present in an ASIC. The ASIC can be present in the mobile station device (user terminal). Alternatively, the processor and the recoding medium may be present as discrete components in the mobile station device 5.

In one or more typical designs, the described functions can be combined to be mounted on hardware, software, firmware, or a combination thereof. When the functions are mounted on software, the functions can be retained as one or more commands or codes on a computer-readable medium or can be delivered. The computer-readable medium includes both of communication medium or computer recording medium including a medium that assists to carry a computer program from a certain location to another location. The recording medium may be any commercially available medium which can be accessed by a general-purpose or special-purpose computer. For example, the recording medium is not limited thereto. The computer-readable medium can include a RAM, a ROM, an EEPROM, a CDROM or other optical disc media, a magnetic disc medium or other magnetic recording media, and a medium which can be accessed by a general-purpose or special-purpose computer or a general-purpose or special-purpose processor and can be used to carry or retain desired program code means in the form of a command or a data structure. Every connection is appropriately referred to as a computer-readable medium. For example, when software is transmitted from a web site, a server, or other remote sources using a coaxial cable, an optical fiber cable, a twisted pair, a digital subscriber line (DSL), or a radio technology of an infrared ray, a radio wave, a microwave, or the like, the coaxial cable, the optical fiber cable, the twisted pair, the DSL, or the radio technology of the infrared ray, the radio wave, the microwave, or the like is included in the definition of the medium. Disks or discs in the present specification include a compact disc (CD), a laser disc (registered trademark), an optical disc, a digital versatile disc (DVD), a floppy (registered trademark) disk, and a Blu-ray disc. The disk generally reproduces data magnetically and the disc generally reproduces data optically through a laser. The combinations of the foregoing can also be included in the computer-readable medium.

<Supplements>

(1) In order to achieve the foregoing object, the following means has been finalized in the present invention. That is, in a radio signal transmission scheme according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The radio signal transmission scheme is used in a base station device communicating with a plurality of mobile station devices using the control channels. An antenna port used to transmit the first component is selected from a plurality of types of combinations. The combination is selected on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

(2) In the radio signal transmission scheme according to the present invention, the combination is selected from the plurality of combinations only when the second PDCCH is configured by two or four first components (eCCE aggregation n 2 or 4). The antenna port corresponding to the first component is used when the second PDCCH is configured by one first component (eCCE aggregation 1).

(3) In the radio signal transmission scheme according to the present invention, the combination is selected from the plurality of types of combinations only at the time of first physical resource mapping. At the time of second physical resource mapping, the antenna port determined in a static manner to transmit the eREGs configuring the second PDCCH is used.

(4) In the radio signal transmission scheme according to the present invention, a remainder obtained by dividing the C-RNTI number assigned to the mobile station device by 2 or 4 is used to select the combination.

(5) In the radio signal transmission scheme according to the present invention, a remainder obtained by dividing the $N_1$ which is the parameter unique to the terminal by 2 or 4 is used to select the combination.

(6) In the radio signal transmission scheme according to the present invention, a remainder obtained by dividing the parameter determining the initial value $C_{init}$ of the sequence of UE-specific RSs used to transmit the second PDCCH by 2 or 4 is used to select the combination.

(7) In the radio signal transmission scheme according to the present invention, a remainder obtained by dividing at least one of the C-RNTI number, the $N_1$ which is the parameter unique to the terminal, and the parameter determining the initial value $C_{init}$ of the sequence of UE-specific RSs used to transmit the second PDCCH by 2 or 4 and a remainder obtained by dividing a remainder, which is obtained by dividing a function inputting a slot number by a number obtained from the number of first components included in the second PDCCH regions and the number (eCCE aggregation n) of the first components configuring the second PDCCH, by 2 or 4 is used to select the combination.

(8) In the radio signal transmission scheme according to the present invention, a remainder obtained by dividing at least one of the C-RNTI number, the $N_1$ which is the parameter unique to the terminal, and the parameter determining the initial value $C_{init}$ of the sequence of UE-specific RSs used to transmit the second PDCCH by 2 or 4 and a remainder obtained by dividing a number, which rounds up a quotient obtained by dividing a function inputting a slot number by the number of first components included in the second PDCCH regions and the number (eCCE aggregation n) of the first components configuring the second PDCCH, by 2 or 4 is used to select the combination.

(9) In a radio signal reception scheme according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The radio signal reception scheme is used in a mobile station device communicating with a base station device using the control channel. An antenna port corresponding to a reference signal used to demodulate the signal of the first component is selected from a plurality of types of combinations. The combination is selected on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

(10) In the radio signal reception scheme according to the present invention, the combination is selected from the plurality of types of combinations only when the second PDCCH is configured by two or four first components (eCCE aggregation 2 or 4). The antenna port corresponding to the first component is used when the second PDCCH is configured by one first component (eCCE aggregation 1).

(11) In the radio signal reception scheme according to the present invention, the combination is selected from the plurality of types of combinations only at the time of first physical resource mapping. At the time of second physical resource mapping, the antenna port determined in a static manner in the reference signal used to demodulate the eREGs configuring the second PDCCH is used.

(12) In the radio signal reception scheme according to the present invention, a remainder obtained by dividing the C-RNTI number assigned to the mobile station device by 2 or 4 is used to select the combination.

(13) In the radio signal reception scheme according to the present invention, a remainder obtained by dividing the $N_1$ which is the parameter unique to the terminal by 2 or 4 is used to select the combination.

(14) In the radio signal reception scheme according to the present invention, a remainder obtained by dividing the parameter determining the initial value $C_{init}$ of the sequence of UE-specific RSs used to transmit the second PDCCH by 2 or 4 is used to select the combination.

(15) In the radio signal reception scheme according to the present invention, a remainder obtained by dividing at least one of the C-RNTI number, the $N_1$ which is the parameter unique to the terminal, and the parameter determining the initial value $C_{init}$ of the sequence of UE-specific RSs used to transmit the second PDCCH by 2 or 4 and a remainder obtained by dividing a remainder, which is obtained by dividing a function inputting a slot number by a number obtained from the number of first components included in the second PDCCH regions and the number (eCCE aggregation n) of the first components configuring the second PDCCH, by 2 or 4 is used to select the combination.

(16) In the radio signal reception scheme according to the present invention, a remainder obtained by dividing at least one of the C-RNTI number, the $N_1$ which is the parameter unique to the terminal, and the parameter determining the initial value $C_{init}$ of the sequence of UE-specific RSs used to transmit the second PDCCH by 2 or 4 and a remainder obtained by dividing a number, which rounds up a quotient obtained by dividing a function inputting a slot number by the number of first components included in the second PDCCH regions and the number (eCCE aggregation n) of the first components configuring the second PDCCH, by 2 or 4 is used to select the combination.

(17) In a base station device according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The base station device communicates with a plurality of mobile station devices using the control channels. The base station device includes a second radio resource control unit that selects an antenna port used to transmit the first component from a plurality of types of combinations and selects the combination on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

(18) In a mobile station device according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The mobile station device communicates with a base station device using the control channel. The mobile station device includes a first radio resource control unit that selects an antenna port corresponding to a reference signal used to demodulate the signal of the first component from a plurality of types of combinations and selects the combination on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

(19) In an integrated circuit according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The integrated circuit is mounted on the base station device communicating with a plurality of mobile station devices using the control channels. The integrated circuit includes a second radio resource control unit that selects an antenna port used to transmit the first component from a plurality of types of combinations and selects the combination on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

(20) In an integrated circuit device according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The integrated circuit is mounted on a mobile station device communicating with a base station device using the control channel. The integrated circuit includes a first radio resource control unit that selects an antenna port corresponding to a reference signal used to demodulate the signal of the first component from a plurality of types of combinations and selects the combination on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

(21) In a communication system according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The communication system includes a base station device communicating with a plurality of mobile station devices using the control channels. The base station device includes a second radio resource control unit that selects an antenna port used to transmit the first component from a plurality of types of combinations and selects the combination on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations. The mobile station device includes a first radio resource control unit that selects an antenna port corresponding to a reference signal used to demodulate the first component from the plurality of types of combinations and selects the combination on the basis of at least one of the C-RNTI number assigned to the mobile station device, $N_1$ which is the parameter unique to the terminal, and the parameter determining the initial value $C_{init}$ of the sequence of UE-specific RSs used to transmit the second PDCCH when one combination is selected from the plurality of types of combinations.

(22) In a communication method according to the present invention, a plurality of physical resource block pairs are configured as control channel regions which are regions in which there is a probability of a control channel being mapped. First components are configured by resources divided from one physical resource block pair. The control channel is configured by an aggregation of one or more first components. The communication method is used in a base station device communicating with a plurality of mobile station devices using the control channels. The communication method includes a step of selecting an antenna port used to transmit the first component from a plurality of types of combinations and selecting the combination on the basis of at least one of a C-RNTI number assigned to the mobile station device, $N_1$ which is a parameter unique to the terminal, and a parameter determining an initial value $C_{init}$ of a sequence of UE-specific RSs used to transmit a second PDCCH when one combination is selected from the plurality of types of combinations.

The embodiment of the present invention has been described in detail with reference to the drawings, but the specific configurations are not limited to the embodiment. Designs or the like of the scope of the present invention without departing from the gist of the present invention are also included in the claims.

REFERENCE SIGNS LIST

3 BASE STATION DEVICE
4 (A to C) RRH
5 (A to C) MOBILE STATION DEVICE
101 RECEPTION PROCESSING UNIT
103 RADIO NETWORK RESOURCE CONTROL UNIT
105 CONTROL UNIT
107 TRANSMISSION PROCESSING UNIT
109 RECEIVE ANTENNA
111 TRANSMIT ANTENNA
201 PHYSICAL DOWNLINK SHARED CHANNEL PROCESSING UNIT
203 PHYSICAL DOWNLINK CONTROL CHANNEL PROCESSING UNIT
205 DOWNLINK PILOT CHANNEL PROCESSING UNIT
207 MULTIPLEXING UNIT
209 IFFT UNIT
211 GI INSERTION UNIT
213 D/A UNIT
215 TRANSMISSION RF UNIT
219 TURBO CODING UNIT
221 DATA MODULATION UNIT
223 CONVOLUTIONAL CODING UNIT
225 QPSK MODULATION UNIT
227 PRECODING PROCESSING UNIT (FOR PDCCH)
229 PRECODING PROCESSING UNIT (FOR PDSCH)
231 PRECODING PROCESSING UNIT (FOR DOWNLINK PILOT CHANNEL)
301 RECEPTION RF UNIT
303 A/D UNIT
309 SYMBOL TIMING DETECTION UNIT
311 GI REMOVAL UNIT
313 FFT UNIT
315 SUBCARRIER DEMAPPING UNIT
317 CHANNEL ESTIMATION UNIT
319 CHANNEL EQUALIZATION UNIT (FOR PUSCH)
321 CHANNEL EQUALIZATION UNIT (FOR PUCCH)
323 IDFT UNIT
325 DATA DEMODULATION UNIT
327 TURBO DECODING UNIT
329 PHYSICAL UPLINK CONTROL CHANNEL DETECTION UNIT
331 PREAMBLE DETECTION UNIT
333 SRS PROCESSING UNIT
401 RECEPTION PROCESSING UNIT
403 RADIO NETWORK RESOURCE CONTROL UNIT
405 CONTROL UNIT
407 TRANSMISSION PROCESSING UNIT
409 RECEIVE ANTENNA
411 TRANSMIT ANTENNA
501 RECEPTION RF UNIT
503 A/D UNIT
505 SYMBOL TIMING DETECTION UNIT
507 GI REMOVAL UNIT
509 FFT UNIT
511 DEMULTIPLEXING UNIT
513 CHANNEL ESTIMATION UNIT
515 CHANNEL COMPENSATION UNIT (FOR PDSCH)
517 PHYSICAL DOWNLINK SHARED CHANNEL DECODING UNIT
519 CHANNEL COMPENSATION UNIT (FOR PDCCH)
521 PHYSICAL DOWNLINK CONTROL CHANNEL DECODING UNIT
523 DATA DEMODULATION UNIT
525 TURBO DECODING UNIT
527 QPSK DEMODULATION UNIT
529 VITERBI DECODER UNIT
531 DOWNLINK RECEPTION QUALITY ESTIMATION UNIT
533 PDCCH DEMAPPING UNIT
605 D/A UNIT
607 TRANSMISSION RF UNIT
611 TURBO CODING UNIT
613 DATA MODULATION UNIT
615 DFT UNIT
617 UPLINK PILOT CHANNEL PROCESSING UNIT
619 PHYSICAL UPLINK INFORMATION CHANNEL PROCESSING UNIT
621 SUBCARRIER MAPPING UNIT
623 IFFT UNIT
625 GI INSERTION UNIT
627 TRANSMISSION POWER ADJUSTMENT UNIT
629 RANDOM ACCESS CHANNEL PROCESSING UNIT

The invention claimed is:

1. A communication method of a terminal apparatus that is configured to and/or programmed to communicate with a base station apparatus, the communication method comprising:

determining one antenna port on the basis of at least a remainder obtained by dividing C-RNTI of the terminal apparatus by a number of one or a plurality of ECCEs used for a first EPDCCH, determining two antenna ports for a second EPDCCH, receiving, using the one antenna port, the EPDCCH using the one or the plurality of ECCEs, the first EPDCCH being a localized EPDCCH, and receiving, using the two antenna ports, the second EPDCCH using a plurality of resources, the second EPDCCH being a distributed EPDCCH, wherein in a case where the number of ECCE(s) used for the first EPDCCH is 2, the one antenna port used to transmit the first EPDCCH is determined from a combination of two antenna ports on the basis of at least a remainder obtained by dividing the C-RNTI of the terminal apparatus by 2, in a case where the number of ECCE(s) used for the first EPDCCH is 4, the one antenna port used to transmit the first EPDCCH is determined from a combination of four antenna ports on the basis of at least a remainder obtained by dividing the C-RNTI of the terminal apparatus by 4, and each of the plurality of resources used for the second EPDCCH is received using one out of the two antenna ports in an alternating manner, starting with a predetermined antenna port.

2. The communication method according to claim 1, wherein
the predetermined antenna port is antenna port 107.

3. A terminal apparatus configured to and/or programmed to communicate with a base station apparatus, the terminal apparatus comprising:

control circuitry that (i) determines one antenna port on the basis of at least a remainder obtained by dividing C-RNTI of the terminal apparatus by a number of one or a plurality of ECCEs used for a first EPDCCH, and (ii) determines two antenna ports for a second EPDCCH; and reception processing circuitry that (i) receives, using the one antenna port, the first EPDCCH using the one or the plurality of ECCEs, the first EPDCCH being a localized EPDCCH, and (ii) receives, using the two antenna ports, the second EPDCCH using a plurality of resources, the second EPDCCH being a distributed EPDCCH; wherein in a case where the number of ECCE(s) used for the first EPDCCH is 2, the control circuitry determines the one antenna port used to receive the first EPDCCH from a combination of two antenna ports on the basis of at least a remainder obtained by dividing the C-RNTI of the terminal apparatus by 2, in a case where the number of ECCE(s) used for the first EPDCCH is 4, the control circuitry determines the one antenna port used to receive the first EPDCCH from a combination of four antenna ports on the basis of at least a remainder obtained by dividing the C-RNTI of the terminal apparatus by 4, and each of the plurality of resources used for the second EPDCCH is received using one out of the two antenna ports in an alternating manner, starting with a predetermined antenna port.

4. The terminal apparatus according to claim 3, wherein the predetermined antenna port is antenna port 107.

5. A communication method of a base station apparatus that is configured to and/or programmed to communicate with a terminal apparatus, the communication method comprising:

determining one antenna port on the basis of at least a remainder obtained by dividing C-RNTI of the terminal apparatus by a number of one or a plurality of ECCEs used for a first EPDCCH, determining two antenna ports for a second EPDCCH, transmitting, using localized transmission and using the one antenna port, the first EPDCCH using the one or the plurality of ECCEs, and transmitting, using distributed transmission and using the two antenna ports, the second EPDCCH using a plurality of resources, wherein in a case where the number of ECCE(s) used for the first EPDCCH is 2, the one antenna port used to transmit the first EPDCCH is determined from a combination of two antenna ports on the basis of at least a remainder obtained by dividing the C-RNTI of the terminal apparatus by 2, in a case where the number of ECCE(s) used for the first EPDCCH is 4, the one antenna port used to transmit the first EPDCCH is determined from a combination of four antenna ports on the basis of at least a remainder obtained by dividing the C-RNTI of the terminal apparatus by 4, and each of the plurality of resources used for the second EPDCCH is transmitted using one out of the two antenna ports in an alternating manner, starting with a predetermined antenna port.

6. The communication method according to claim 5, wherein
the predetermined antenna port is antenna port 107.

7. A base station apparatus configured to and/or programmed to communicate with a terminal apparatus, the base station apparatus comprising:

control circuitry that (i) determines one antenna port on the basis of at least a remainder obtained by dividing C-RNTI of the terminal apparatus by a number of one or a plurality of ECCEs used for a first EPDCCH, and (ii) determines two antenna ports for a second EPDCCH; and transmission processing circuitry that (i) transmits, using localized transmission and using the one antenna port, the first EPDCCH using the one or the plurality of ECCEs, and (ii) transmits, using distributed transmission and using the two antenna ports, the second EPDCDH using a plurality of resources; wherein in a case where the number of ECCE(s) used for the first EPDCCH is 2, the control circuitry determines the one antenna port used to transmit the first EPDCCH from a combination of two antenna ports on the basis of at least a remainder obtained by dividing the C-RNTI of the terminal apparatus by 2, in a case where the number of ECCE(s) used for the first EPDCCH is 4, the control circuitry determines the one antenna port used to transmit the first EPDCCH from a combination of four antenna ports on the basis of at least a remainder obtained by dividing the C-RNTI of the terminal apparatus by 4, and each of the plurality of resources used for the second EPDCCH is transmitted using one out of the two antenna ports in an alternating manner, starting with a predetermined antenna port.

8. The base station apparatus according to claim 7, wherein
the predetermined antenna port is antenna port 107.

* * * * *